United States Patent
Yamamoto

[19]

[11] Patent Number: 6,069,716
[45] Date of Patent: May 30, 2000

[54] COLOR-IMAGE READER

[75] Inventor: Yasuhiro Yamamoto, Tokyo, Japan

[73] Assignee: Asahi Kogyo Kabushiki Kaisha, Tokyo, Japan

[21] Appl. No.: 09/097,706

[22] Filed: Jun. 16, 1998

[30] Foreign Application Priority Data

Jun. 17, 1997 [JP] Japan ................................. 9-176474

[51] Int. Cl.[7] ................................. H04N 1/46; G03F 3/08
[52] U.S. Cl. ........................ 358/518; 358/529; 358/522; 358/509
[58] Field of Search ................................. 358/518, 529, 358/522, 574, 475, 509

[56] References Cited

U.S. PATENT DOCUMENTS

| | | | |
|---|---|---|---|
| 4,827,109 | 5/1989 | Matsumoto et al. | 235/375 |
| 4,951,134 | 8/1990 | Nakashima et al. | 348/71 |
| 5,122,831 | 6/1992 | Suzuki | 355/37 |
| 5,132,825 | 7/1992 | Miyadera | 348/227 |
| 5,488,492 | 1/1996 | Abe | 358/518 |
| 5,751,451 | 5/1998 | Ogoshi et al. | 358/518 |

OTHER PUBLICATIONS

U.S. Application No. 08/762,943, filed Dec. 10, 1996.
U.S. Application No. 08/878,551, filed Jun. 19, 1997.
U.S. Application No. 08/892,026, filed on Jul. 14, 1997.
U.S. Application No. 08/982,642, filed Dec. 2, 1997.
U.S. Application No. 09/083,035, filed May 22, 1998.
U.S. Application No. 09/097,703, filed on Jun. 16, 1998.
U.S. Application No. 09/097,704, filed on Jun. 16, 1998.
U.S. Application No. 09/103,815, filed Jun. 24, 1998.
U.S. Application No. 09/114,897, filed Jul. 14, 1998.
U.S. Application No. 08/761,903, filed Dec. 9, 1989.
U.S. Application No. 09/095,839, filed Jun. 11, 1998.

*Primary Examiner*—Kimberly A. Williams
*Attorney, Agent, or Firm*—Greenblum & Bernstein, P.L.C.

[57] ABSTRACT

A color-image reader reads a recorded color image from a recording medium, and has an image sensor for sensing the color image as at least a first and second regular series of monochromatic image signals during a regular reading operation. A first optimal exposure period is determined regarding the first regular series of image signals, and a second optimal exposure period is determined regarding the second regular series of image signals. A first set of color-correction parameters is determined based on a first provisional series of image signals, sensed from the color image by the image sensor over the first optimal exposure period. A second set of color-correction parameters is determined based on a second provisional series of image signals, sensed from the color image by the image sensor over the second optimal exposure period. A color balance is performed among the first and second regular series of image signals by using the first and second sets of color-correction parameters.

44 Claims, 32 Drawing Sheets

FIG.13

| ADDRESS | NUMBER OF SIGNALS | |
|---|---|---|
| 0000 | $R_1K[0000]$ | ⎫ |
| ⋮ | ⋮ | ⎬ $H_{1(R)}$ |
| 1023 | $R_1K[1023]$ | ⎭ |
| 1024 | $G_1K[0000]$ | ⎫ |
| ⋮ | ⋮ | ⎬ $H_{1(G)}$ |
| 2047 | $G_1K[1023]$ | ⎭ |
| 2048 | $B_1K[0000]$ | ⎫ |
| ⋮ | ⋮ | ⎬ $H_{1(B)}$ |
| 3071 | $B_1K[1023]$ | ⎭ |
| 3072 | $R_2K[0000]$ | ⎫ |
| ⋮ | ⋮ | ⎬ $H_{2(R)}$ |
| 4095 | $R_2K[1023]$ | ⎭ |
| 4096 | $G_2K[0000]$ | ⎫ |
| ⋮ | ⋮ | ⎬ $H_{2(G)}$ |
| 5119 | $G_2K[1023]$ | ⎭ |
| 5120 | $B_2K[0000]$ | ⎫ |
| ⋮ | ⋮ | ⎬ $H_{2(B)}$ |
| 6143 | $B_2K[1023]$ | ⎭ |

FIG.25

| ADDRESS | NUMBER OF SIGNALS | |
|---|---|---|
| 0000 | RK[0000] | ⎫ |
| ⋮ | ⋮ | ⎬ Hc1(R) |
| 1023 | RK[1023] | ⎭ |
| 1024 | GK[0000] | ⎫ |
| ⋮ | ⋮ | ⎬ Hc1(G) |
| 2047 | GK[1023] | ⎭ |
| 2048 | BK[0000] | ⎫ |
| ⋮ | ⋮ | ⎬ Hc1(B) |
| 3071 | BK[1023] | ⎭ |

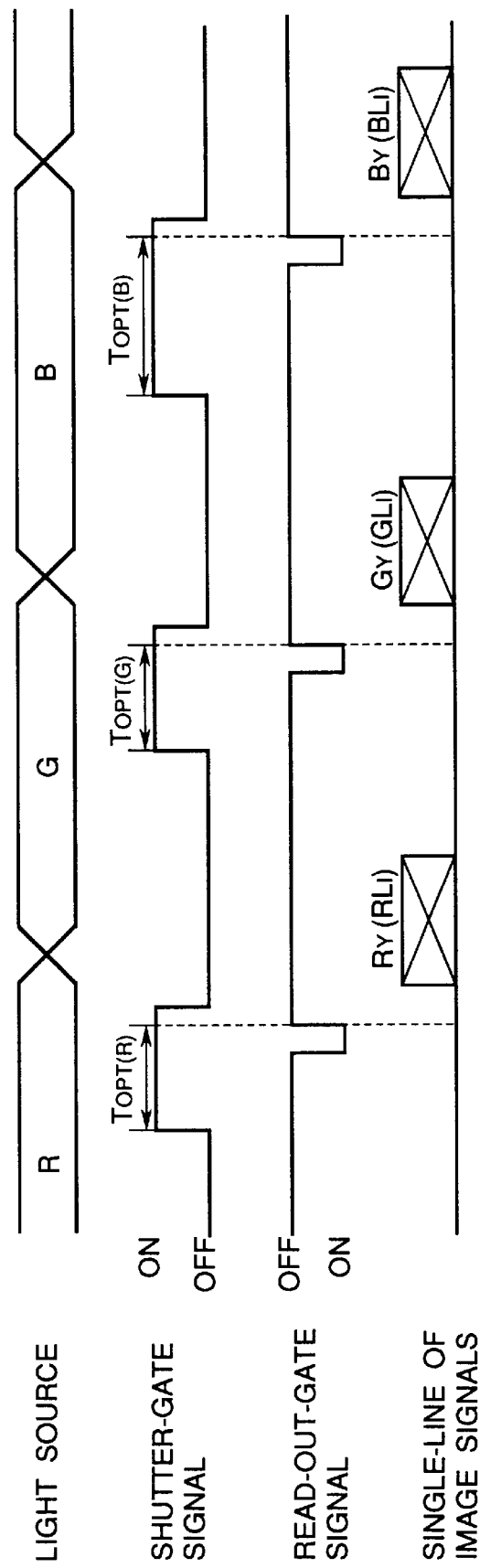

COLOR-IMAGE READER

BACKGROUND OF THE INVENTION

1. Field of the Invention

The present invention relates to a color-image reader for optically and electronically sensing and reading a color image, which is recorded on a suitable recording medium, such as a transparency, a sheet of paper or the like.

2. Description of the Related Art

Such a color-image reader per se is well known, and is used, for example, in peripheral equipment associated with an image-processing computer for retrieving a color image. As a general representation, a color-image reader includes a solid-state line image sensor, such as a CCD (charge-coupled device) image sensor, a suitable light source for cyclically and successively illuminating the recording medium with primary color light rays: red-light rays, green-light rays and blue-light rays.

The CCD line image sensor includes a plurality of CCD elements aligned with each other, and each of the CCD elements generates and accumulates an electric charge in accordance with a received amount of monochromatic light rays (red, green, blue). As is well known, the CCD line image sensor possesses an electronic shutter function, and a time of electric-charge-accumulation or a time of exposure may be suitably controlled and regulated by using the electronic shutter function. As long as the CCD line image sensor is exposed to the monochromatic light rays, a degree of electric charge in each of the CCD elements is gradually increased, and the CCD elements finally reach saturation with the accumulated electric charges.

In operation, the recording medium is intermittently moved with respect to the CCD line image sensor such that the recording medium is scanned in a step-by-step manner with the CCD line image sensor. During each stoppage of the recording medium when being intermittently moved, the recording medium is subjected to one cycle of the successive emissions of the primary colors of light from the light source during each standstill of the transparent object, and the CCD line image sensor is successively exposed to the primary color light rays, passing through or reflected by the recording medium.

During the exposure of the CCD line image sensor to the primary color light rays, three single-lines of monochromatic image-pixel signals are successively outputted from the CCD line image sensor. After the outputting of the three single-lines of monochromatic image-signals from the CCD line image sensor, the recording medium is moved with respect to the CCD line image sensor by one scan-pitch. Thus, when the above-mentioned scanning operation is completed, three frames of monochromatic image-pixel signals, corresponding to the primary colors, can be obtained and used to reproduce the recorded color image of the recording medium, for example, on a TV monitor.

During the reading of the recorded color image from the recording medium, the exposure period, over which the CCD line image sensor is exposed to the monochromatic light rays, must be optimally regulated before the read color image can be obtained with the best contrast. Also, in order to reproduce the read color image with the best color balance, the three-frames of monochromatic image-pixel signals must be subjected to optimal color correction. Especially, as is well known when the recording medium is a transparency film, the color correction is critical, because a film material per se of the transparency film is colored.

An optimal exposure period is varied in accordance with a change in transparency of a recorded color image due to the reading of another recording medium. Accordingly, the optimal exposure period must be determined in accordance with the transparency of the recording medium. Conventionally, prior to a regular scanning operation for sensing and reading the recorded color image from the recording medium, a pre-scanning operation is carried out in order to determine an optimal exposure period with respect to the recorded color image of the recording medium concerned.

Nevertheless, conventionally, it is impossible to accurately determine the optimum exposure period, because a method for determining the optimum exposure period is based on an inaccurate assumption that there is a directly linear relationship between a time of exposure and a degree of electric charge accumulation in the CCD line image sensor, as discussed hereinafter in detail.

On the other hand, conventionally, color-correction parameters necessary for the color correction are determined on the basis of the three frames of monochromatic image-pixel signals obtained by the above-mentioned pre-scanning operation. Nevertheless, the determination of the color-correction parameters also cannot be accurately performed, because the three-frames of monochromatic image-pixel signals, obtained by the pre-scanning operation, do not properly represent color characteristics of the recorded color image of the recording medium. Also, an accurate determination of the color-correction parameter for a negative color transparency film is especially difficult, because the negative color transparency exhibits a wider exposure latitude than that of a positive color transparency.

Before accurate color-correction parameters can be obtained, the determination of the color-correction parameters should be based on three respective frames of monochromatic image-pixel signals derived from optimum exposure periods. Nevertheless, it is impossible to accurately determine the optimum exposure period with the conventional method as previously mentioned.

SUMMARY OF THE INVENTION

Therefore, an object of the present invention is to provide a color-image reader, using a solid-state image sensor for optically and electronically sensing a recorded color image of a recording medium, wherein not only an exposure period but also color-correction parameters can be optimally and accurately determined, so that a recorded color image can be sensed and read from a recording medium with the best contrast and the best color balance.

In accordance with the invention, there is provided a color-image reader for optically and electronically reading a recorded color image from a recording medium. The image reader comprises: an image sensor for sensing the color image as at least a first regular series of monochromatic image-pixel signals and as a second regular series of monochromatic image-pixel signals during a regular reading operation; a first optimal-exposure-period determiner for determining a first optimal exposure period with respect to the first regular series of monochromatic image-pixel signals; a second optimal-exposure-period determiner for determining a second optimal exposure period with respect to the second regular series of monochromatic image-pixel signals; a first color-correction-parameter determiner for determining a first set of color-correction parameters on the basis of a first provisional series of monochromatic image-pixel signals, which is sensed from the recorded color image by the image sensor over the first optimal exposure period determined by the first optimal-exposure-period determiner; and a second color-correction-parameter determiner for determining a second set of color-correction parameters on the basis of a second provisional series of monochromatic image-pixel signals, which is sensed from the recorded color image by the image sensor over the second optimal exposure period determined by the second optimal-exposure-period determiner. The first regular series of monochromatic image-pixel signals is processed by the first set of color-correction parameters, such that a first regular histogram, which is produced on the basis of the first regular series of monochromatic image-pixel signals, is generated over a first predetermined level-value range, and the second regular series of monochromatic image-pixel signals is processed by the second set of color-correction parameters, such that a second regular histogram, which is produced on the basis of the second regular series of monochromatic image-pixel signals, is generated over a second predetermined level-value range.

The first predetermined level-value range and the second predetermined level-value range may substantially coincide with each other. Also, the first predetermined level-value range may be defined by an input range of a first image-signal processor for processing the first regular series of monochromatic image-pixel signals, and the second predetermined level-value range may be defined by an input range of a second image-signal processor for processing the second regular series of monochromatic image-pixel signals.

Preferably, the first color-correction-parameter determiner comprises a first histogram-producer for producing a first histogram from the first provisional series of monochromatic image-pixel signals, a first effective minimum level-value calculator for calculating an effective minimum level-value from the first histogram, and a first effective maximum level-value calculator for calculating an effective maximum level value from the first histogram. The first regular series of monochromatic image-pixel signals is processed by the first set of color-correction parameters such that a range, defined by the first effective minimum level-value and the first effective maximum level-value, substantially coincides with the first predetermined level-value range.

The first effective minimum level-value may be defined as a boundary-level-value of a predetermined area, which includes an actual minimum level-value, of the first histogram, and the first effective maximum level-value may be defined as a boundary-level-value of a predetermined area, which includes an actual maximum level-value, of the first histogram.

Similarly, preferably, the second color-correction-parameter determiner comprises a second histogram-producer for producing a second histogram from the second provisional series of monochromatic image-pixel signals, a second effective minimum level-value calculator for calculating an effective minimum level-value from the second histogram, and a second effective maximum level-value calculator for calculating an effective maximum level value from the second histogram. The second regular series of monochromatic image-pixel signals is processed by the second set of color-correction parameters such that a range, defined by the second effective minimum level-value and the second effective maximum level-value, substantially coincides with the second predetermined level-value range.

The second effective minimum level-value may be defined as a boundary-level-value of a predetermined area, which includes an actual minimum level-value, of the second histogram, and the second effective maximum level-value may be defined as a boundary-level-value of a predetermined area, which includes an actual maximum level-value, of the second histogram.

The recording medium may be either a negative transparency film carrying a negative color image or a positive transparency film carrying a positive color image. In this case, the first regular series of monochromatic image-pixel signals and the second regular series of monochromatic image-pixel signals are derived from either the negative color image or the positive color image. When the recording medium is the negative transparency film, the color-image reader may further comprise a negative-to-positive converter for converting the first regular series of monochromatic image-pixel signals and the second regular series of monochromatic image-pixel signals into a first regular series of positive monochromatic image-pixel signals and a second regular series of positive monochromatic image-pixel signals, respectively. Also, when the recording medium is the positive transparency film, the color-image reader may further comprise a positive-to-negative converter for converting the first regular series of monochromatic image-pixel signals and the second regular series of monochromatic image-pixel signals into a first regular series of negative monochromatic image-pixel signals and a second regular series of negative monochromatic image-pixel signals, respectively.

The image sensor may exhibit a characteristic curve, having at least a partial linear section, describing a relationship between a level-value of an image-pixel signal and an exposure period over which the image sensor is exposed to each of first monochromatic light rays and second monochromatic light rays, which correspond to the first regular series of monochromatic image-pixel signals and the second regular series of monochromatic image-pixel signals, respectively.

The first optimal-exposure-period determiner may comprise: a first sub-determiner for determining a first effective maximum level value from a first further-provisional series of monochromatic image-pixel signals, which is further provisionally sensed from the recorded color image, with the image-sensor, by exposing the image sensor to the first monochromatic light rays over a first exposure period; and a second sub-determiner for determining a second effective maximum level-value from a second further-provisional series of monochromatic image-pixel signals, which is further provisionally sensed from the recorded color image, with the image-sensor, by exposing the image sensor to the first monochromatic light rays over a second exposure period, which is longer than the first exposure period. In this case, the first exposure period and the second exposure period are encompassed within the partial linear section of the characteristic curve, thereby determining the first optimal exposure period from a proportional calculation based on the first effective maximum level-value corresponding to the first exposure period, the second effective maximum level-value corresponding to the second exposure period, and an effective maximum level-value corresponding to the first optimal exposure period.

The second optimal-exposure-period determiner may comprise: a first sub-determiner for determining a first effective maximum level value from a first further-provisional series of monochromatic image-pixel signals, which is sensed from the recorded color image, with the image-sensor, by exposing the image sensor to the second monochromatic light rays over a first exposure period; and a second sub-determiner for determining a second effective maximum level-value from a second further-provisional series of monochromatic image-pixel signals, which is sensed from the recorded color image, with the image-sensor, by exposing the image sensor to the second monochromatic light rays over a second exposure period, which is longer than the first exposure period. In this case, the first exposure period and the second exposure period are encompassed within the partial linear section of the characteristic curve, thereby determining the second optimal exposure period from a proportional calculation based on the first effective maximum level-value corresponding to the first exposure period, the second effective maximum level-value corresponding to the second exposure period, and an effective maximum level-value corresponding to the second optimal exposure period.

BRIEF DESCRIPTION OF THE DRAWINGS

The object and other objects of the present invention will be better understood from the following description, with reference to the accompanying drawings in which:

FIG. 13 is a conceptual view showing histograms developed in a memory of the color-image reader by the execution of the histogram-production routine shown in FIG. 12;

FIG. 25 is another conceptual view showing histograms developed in the memory of the color-image reader by the execution of the histogram-production routine shown in FIG. 12;

FIG. 34 is a timing chart for assisting in an explanation of the flowchart shown in FIGS. 30 to 33.

DESCRIPTION OF THE PREFERRED EMBODIMENTS

Figure 1:
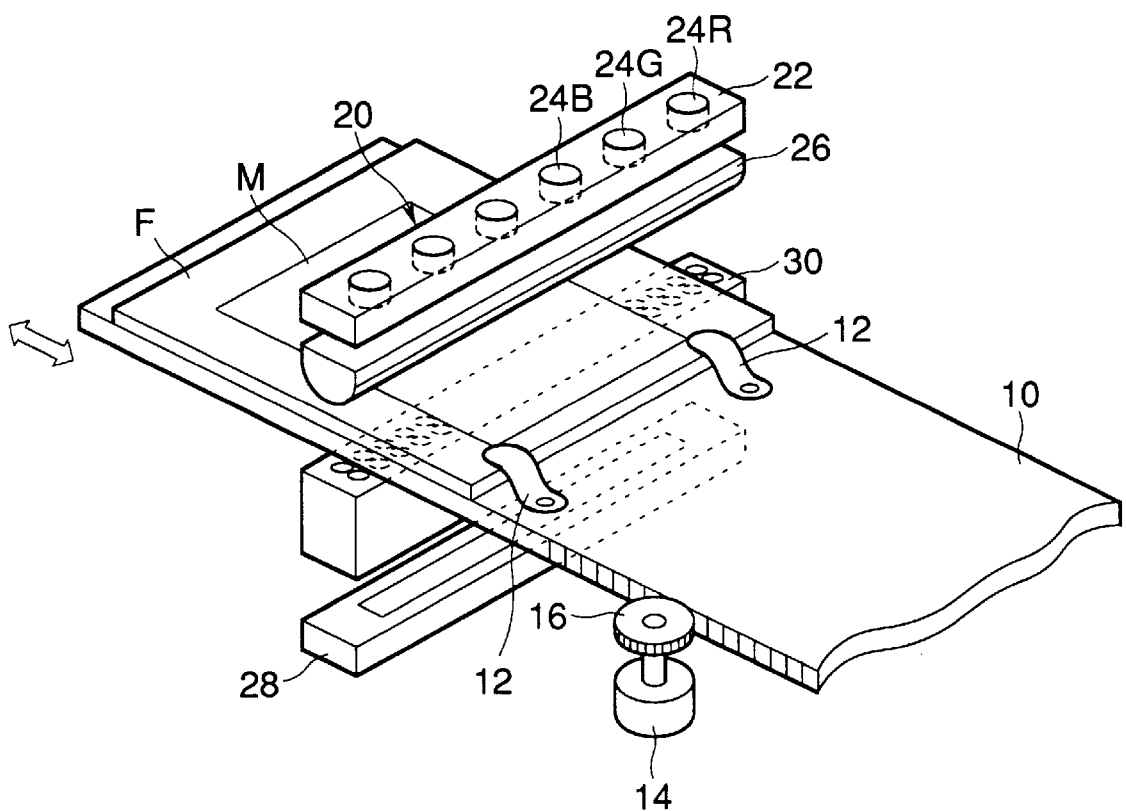
FIG. 1 is a schematic perspective view of an embodiment of a color-image reader according to the present invention.

FIG. 1 schematically shows an embodiment of a color-image reader according to the present invention, which is constituted so as to read a recorded negative color image from a transparency film. Note, in FIG. 1, the transparency film is indicated by reference M, and the transparency film M is held by a frame holder F.

The color-image reader comprises a plate-like carriage 10 on which the frame holder F is detachably mounted. Namely, the carriage 10 is provided with a pair of spring fasteners 12 attached thereto, by which the frame holder F is releasably fastened onto the carriage 10. Although not visible in FIG. 1, a rectangular opening is formed in the carriage 10, the opening being large enough to encompass the transparency film M.

The plate-like carriage 10 is movable in the directions indicated by an open arrow shown in FIG. 1, and the movement of the carriage 10 is carried out by a suitable drive motor 14, such as a stepping motor, a servo motor or the like. Namely, the drive motor 14 has a pinion 16, fixedly mounted on an output shaft thereof, which is meshed with a rack 18 formed on a longer side of the carriage 10.

The color-image reader also comprises a light source 20, which includes an elongated frame member 22 having red-light emitters 24R, green-light emitters 24G and blue-light emitters 24B supported thereby. Although only six light emitters (24R, 24G, 24B) are representatively shown in FIG. 1, in actuality, a plurality of red-light emitters 24R, a plurality of green-light emitters 24G and a plurality of blue-light emitters 24B are held in the elongated frame member 22 and are alternately arranged uniformly therealong. Each of the light emitters may comprise a light emitting diode (LED) emitting a predetermined monochromatic light (red, green or blue).

As shown in FIG. 1, the light source 20 is arranged transversely above a path along which the carriage 10, and therefore the transparency film M, is moved. The plurality of red-light emitters 24R, the plurality of green-light emitters 24G, and the plurality of blue-light emitters 24B are cyclically turned ON in a predetermined order. For example, in succession, the red-light emitters 24R are turned ON, emitting red-light rays, then the green-light emitters 24G are turned ON, emitting green-light rays, and finally the blue-light emitters 24B are turned ON, emitting blue-light rays. Namely, the emissions of the three-primary colors of light from the light source 20 are cyclically repeated in the order of: the red-light emission, the green-light emission and the blue-light emission.

The color-image reader further comprises a cylindrical condenser lens 26, interposed between the light source 20 and the path of the transparency film M. The monochromatic light rays (red, green or blue), emitted from the light source 20, are condensed by the cylindrical condenser lens 26 and are directed in parallel toward the transparency film M.

Furthermore, the color-image reader comprises a one-dimensional CCD line image sensor 28, and a focusing lens system 30 associated therewith. The CCD line image sensor 28 is arranged transversely below the path of the transparency film M, and is aligned with the optical axes of the elongated light source 20. In this embodiment, the focusing lens system 30 is formed as a rod lens array, and is interposed between the CCD line image sensor 28 and the path of the transparency film M. Due to the focusing lens system 30, the monochromatic light rays, passing through the transparency film M, are focused onto a linear light-receiving surface of the CCD line image sensor 28.

The CCD line image sensor 28 includes a plurality of CCD elements aligned with each other, and the linear light-receiving surface is formed by the alignment of the CCD elements. Each of the CCD elements generates and accumulates electric charge in accordance with an amount of light rays received thereby, and a degree of accumulation of electric charge in each CCD element depends on a time of exposure of the CCD elements of the CCD line image sensor 28 to the light rays. The CCD line image sensor 28 is provided with an electronic shutter function, by which the time of exposure, i.e. a time of electric-charge-accumulation, is regulated, as stated hereinafter in detail.

Figure 2:
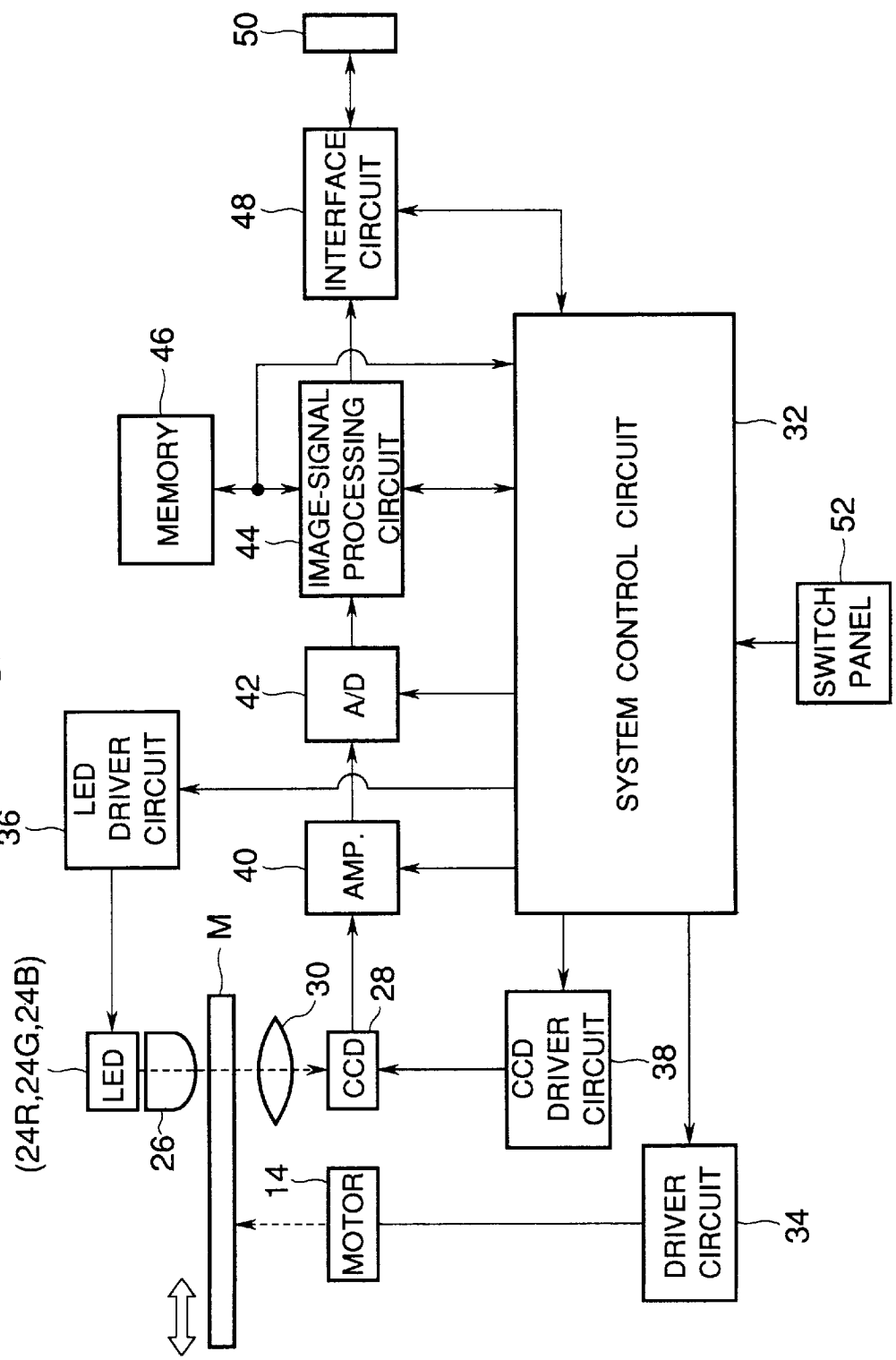
FIG. 2 is a schematic block diagram of the color-image reader shown in FIG. 1.

FIG. 2 schematically shows a block diagram of the color-image reader shown in FIG. 1. The color-image reader is provided with a system control circuit 32, which may be constituted as a microcomputer comprising a central processing unit (CPU), a read-only memory (ROM) for storing programs, constants, etc, and a random access memory (RAM) for storing temporary data.

As shown in FIG. 2, the drive motor 14 is connected to the system control circuit 32, through a driver circuit 34, and is driven on the basis of a series of drive pulses outputted from the driver circuit 34, which is operated by the system control circuit 32. During a reading operation of the color-image reader, the drive motor 14 is intermittently driven in such a manner that the plate-like carriage 10, and therefore the transparency film M, is intermittently moved to pass between the cylindrical condenser lens 26 and the focusing lens system 30, whereby the transparency film M is scanned in a step-by-step manner with the CCD line image sensor 28.

The LED's 24R, 24G and 24B of the light source 20 are connected to the system control circuit 32, via an LED driver circuit 36, and are electrically powered by the LED driver circuit 36, which is operated by the system control circuit 32. In this embodiment, the red LED's 24R, the green LED's 24G and the blue LED's 24B are cyclically and successively turned ON as mentioned previously. Namely, the emissions of the primary colors of light from the light source 20 are cyclically repeated, for example, in the order of the red-light emission, the green-light emission and the blue-light emission during the intermittent stoppage of the carriage 10. In particular, the transparency film M is subjected to one cycle of the successive emissions of the primary colors of light during each standstill of the transparency film M when being intermittently moved.

The CCD line image sensor 28 is connected to the system control circuit 32, through a CCD driver circuit 38, and is then driven by the CCD driver circuit 38. When the transparency film M is illuminated with the monochromatic light rays (red, green, blue) of the colored light emitters, the monochromatic light rays concerned, having passed through the cylindrical condenser lens 26 and the transparency film M, are focused, by the focusing lens system 30, onto the linear light-receiving surface of the CCD line image sensor 28. During the illumination of the transparency film M with the monochromatic light lays concerned, the electronic shutter of the CCD line image sensor 28 is opened by the CCD driver circuit 38 under control of the system control circuit 32, so that electrical charges are started to be generated and accumulated in the CCD elements of the CCD line image sensor 28.

Also, the accumulated electrical charges are outputted as a single-line of monochromatic image-pixel signals, from the CCD line image sensor 28, by driving the CCD driver circuit 38 under control of the system control circuit 32. The single-line of monochromatic image-pixel signals, outputted from the CCD line image sensor 28, is amplified by an amplifier 40, and is then converted into a single-line of digital monochromatic image-pixel signals by an analog-todigital (A/D) converter 42. Note, the amplifier 40 and the A/D converter 42 are operated under control of the system control circuit 32.

The single-line of digital monochromatic image-pixel signals, outputted from the A/D converter 42, is inputted to an image-signal processing circuit 44, in which the single-line of digital monochromatic image-pixel signals is subjected to various processes, such as a shading-correction, a gamma correction, a white balance correction and so on.

Figure 3:
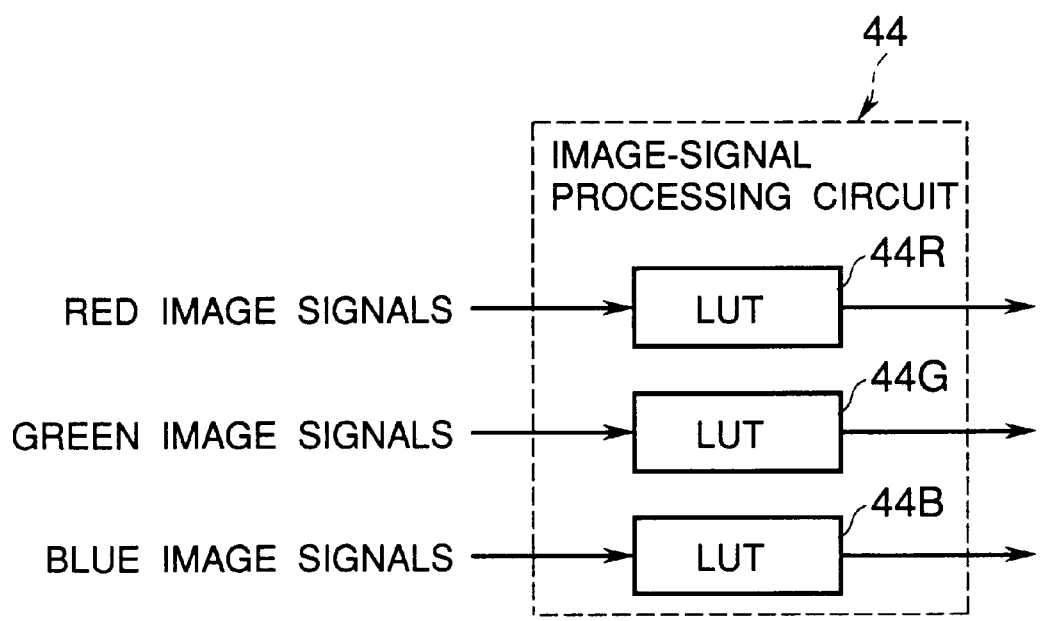
FIG. 3 is a schematic block diagram of an image-signal processing circuit shown in FIG. 2.

In particular, as shown in FIG. 3, the image-signal processing circuit 44 includes three look-up tables (LUT) 44R, 44G and 44B. A single-line of digital red image-pixel signals, a single-line of digital green image-pixel signals and a single-line of digital blue image-pixel signals, which are successively outputted from the A/D converter 42, are inputted to the LUT's 44R, 44G and 44B, respectively, and are subjected to the shading-correction, gamma correction, white balance correction and so on. Namely, the single-line of digital monochromatic image-pixel signals, inputted to the corresponding LUT (44R, 44G, 44B), is outputted as a single-line of processed or corrected digital monochromatic image-pixel signals therefrom, and is then stored in a memory 46.

When the sensing or reading of the recorded color image of the transparency film M, i.e. a scanning operation of the transparency film M with the CCD line image sensor 28, is completed, the memory 46 stores three frames of primary-color digital image-pixel signals: a frame of red digital image-pixel signals, a frame of green digital image-pixel signals and a frame of blue digital image-pixel signals.

Thereafter, the three frames of primary-color digital image-pixel signals are read out from the memory 46 under control of the system control circuit 32, and are then transferred to a peripheral image processing computer (not shown), through the intermediary of an interface circuit 48 and a terminal connector 50. In particular, when an image-data-transferring command signal is outputted from the peripheral image processing computer to the color-image reader, the three frames of primary-color digital image-pixel signals are read out, from the memory 46, and are subjected to a format-conversion processing and so on in the interface circuit 48. Then, the transfer of the three frames of primary-color digital image-pixel signals from the color-image reader to the peripheral image processing computer is carried out through the terminal connector 50.

Note, in FIG. 2, reference 52 indicates a switch panel on which switches for directly executing various operations of the color-image reader are provided.

As discussed hereinbefore, during the sensing and reading of the recorded image from the recording medium, a time of exposure, over a period of which the CCD line image sensor 28 is exposed to the light rays, should be optimally and accurately regulated before the sensed and read image can be obtained with an ideal contrast.

For a better understanding of the principle of the present invention for determining the optimal exposure time, a conventional method of determining the optimal exposure time will now be explained below.

Note, the conventional determination of the optimal exposure time can be executed in the color-image reader as shown in FIGS. 1 and 2, when necessary.

Prior to a regular reading-operation of a recorded image from the transparency film M, a pre-reading operation is executed to obtain a frame of digital image-pixel signals, which is temporarily stored in the memory 46. In the pre-reading operation, a time of exposure, which is relatively shorter than a time of exposure in the regular reading-operation, is selected. Note, the pre-reading operation may be executed with a rougher scan-pitch than that used in the regular reading-operation.

Figure 4:
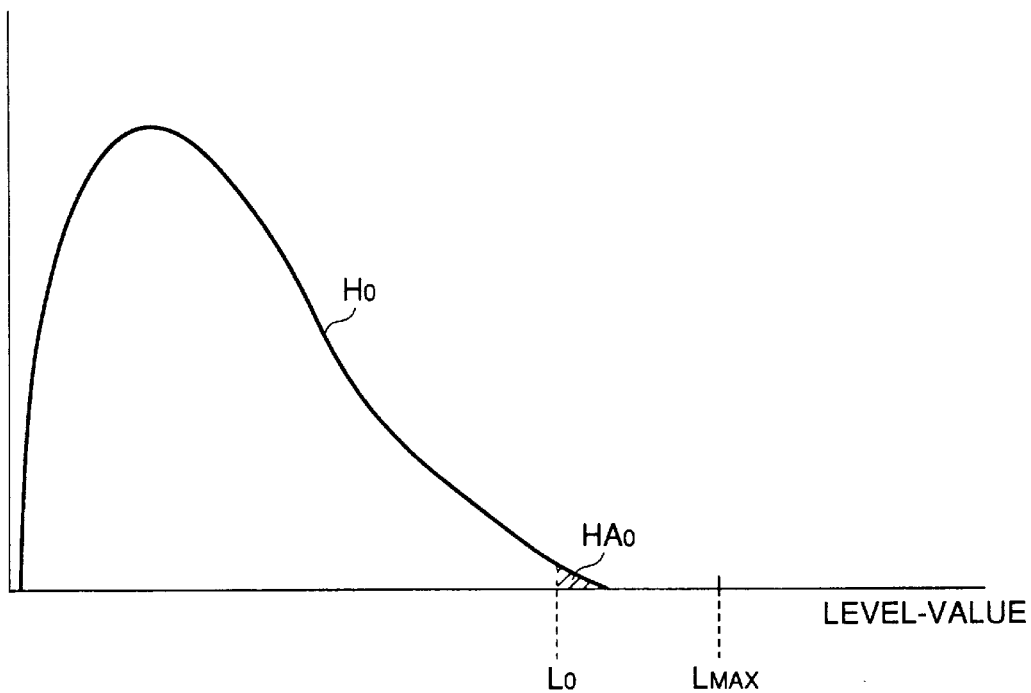
FIG. 4 is a graph showing a histogram of a frame of image-pixel signals for explaining a conventional method of determining an optimal exposure time.

Then, as shown in FIG. 4, a histogram Ho is produced on the basis of the frame of digital image-pixel signals, and is temporarily stored in the memory 46. As is well known, in the histogram $H_0$ of FIG. 4, the abscissa represents a level-value of the digital image-pixel signals included in one frame, and the ordinate represents a number of digital image-pixels having the same level-value. For example, when an analog image-pixel signal is converted into a 10-bit digital image-pixel signal by the A/D converter 42, each of the digital image-pixel signals included in one frame is classified into any one of 1,024 level-values.

Subsequently, an effective maximum level-value of the histogram $H_0$ is determined. In FIG. 4, the effective maximum level-value of the histogram $H_0$ is indicated by reference $L_0$, and may be defined as a boundary-level-value of a hatched area $HA_0$, including an actual-maximum level-value, of the histogram $H_0$, in which a number of digital image-pixel signals, corresponding to 0.5% of the total number of the digital image-pixel signals in one frame, for example, is included. Note, the digital image-pixel signals, included in the hatched area $HA_0$, are derived from the highest-transparency area of the recorded image of the transparency film M.

Figure 5:
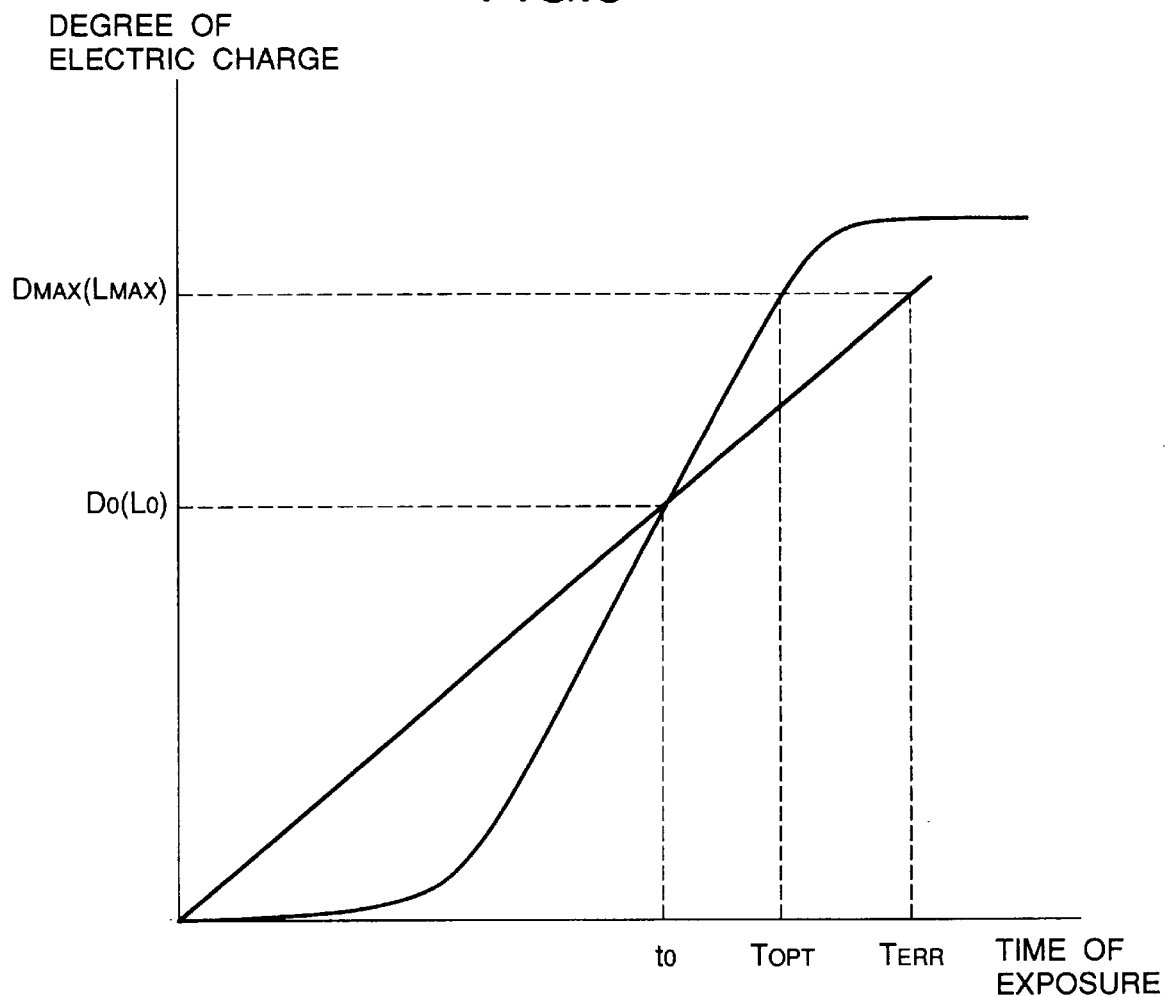
FIG. 5 is a graph showing a characteristic curve representing a relationship between a degree of electric-charge-accumulation and a time of exposure in a CCD element of a CCD line image sensor, in relation to the histogram of FIG. 4.

FIG. 5 is a graph conceptually illustrating how the optimal exposure time is determined in accordance with the conventional method. In this graph, the abscissa represents a time of electric-charge-accumulation, i.e. a time of exposure, over a period of which a specific CCD element of the CCD line image sensor 28 is exposed to the monochromatic light rays (red, green, blue), passing through the highest-transparency area of the recorded image of the transparency film M, and the ordinate represents a degree of electric charge, which is generated and accumulated in a specific CCD element of the CCD line image sensor 28.

Namely, a characteristic curve, shown in the graph of FIG. 5, represents a change in the degree of electric charge accumulation in the specific CCD element of the CCD line image sensor 28, while the specific CCD element of the CCD line image sensor 28 is exposed to the monochromatic light rays (red, green, blue), passing through the highest-transparency area of the recorded image of the transparency film M. As is apparent from the characteristic curve, as the time of exposure increases, the degree of electric charge accumulation in the specific CCD element of the CCD line image sensor 28 gradually increases, and finally becomes saturated with the generated electric charges.

In the graph of FIG. 5, reference to indicates an exposure period, over which the CCD line image sensor 28 is exposed to the monochromatic light rays at each of the scan-steps while the pre-reading operation is executed, and reference $D_0$ indicates a degree of electric charge accumulation, which is obtained at the time when the exposure period $t_0$ is completed. Accordingly, the degree of electric charge accumulation $D_0$ corresponds to the effective maximum level-value $L_0$ (FIG. 4).

In the graph of FIG. 5, the optimal exposure period, indicated by reference $T_{OPT}$, is determined such that a maximum degree of electric charge accumulation $D_{MAX}$ is obtained at the time when a period of the optimum exposure period $T_{OPT}$ is completed. Note, the maximum degree of electric charge accumulation $D_{MAX}$ is suitably predetermined in view of a dynamic range of the A/D converter 42 during manufacture of the color-image reader, and an effective maximum level-value, corresponding to the maximum degree of electric charge accumulation $D_{MAX}$, is thus indicated by reference $L_{MAX}$ in FIG. 4.

In accordance with the conventional determination method, an improper exposure period $T_{ERR}$ (FIG. 5) is calculated as the optimal exposure period $T_{OPT}$, because the calculation is based on an erroneous assumption that the characteristic curve of FIG. 5 exhibits a linear function. Namely, in the conventional determination method, it is assumed that the following formula can be approximately established:

$$T_{OPT} \approx (L_{MAX}/L)*t$$

However, in reality, the improper exposure period $T_{ERR}$, which seriously diverges from the optimal exposure period $T_{OPT}$, merely obtained using the following directly proportional calculation:

$$T_{ERR}=(L_{MAX}/L)*t$$

According to a principle of the present invention for determining the optimal exposure period, prior to a regular reading-operation of a recorded image from the transparency film M, a first pre-reading operation and a second pre-reading operation are executed to obtain a first frame of digital image-pixel signals and a second frame of digital image-pixel signals, respectively, which are stored in the memory 46. In the first and second pre-reading operations, a first exposure period and a second exposure period are set, respectively. The first exposure period is shorter than a time of exposure to be set in the regular reading-operation. Also, the second exposure period is longer than the first exposure period, but is shorter than the time of exposure to be set in the regular reading-operation.

Note, the first and second pre-reading operations also may be executed with rougher scan-pitches than that of the regular reading-operation.

Figure 6:
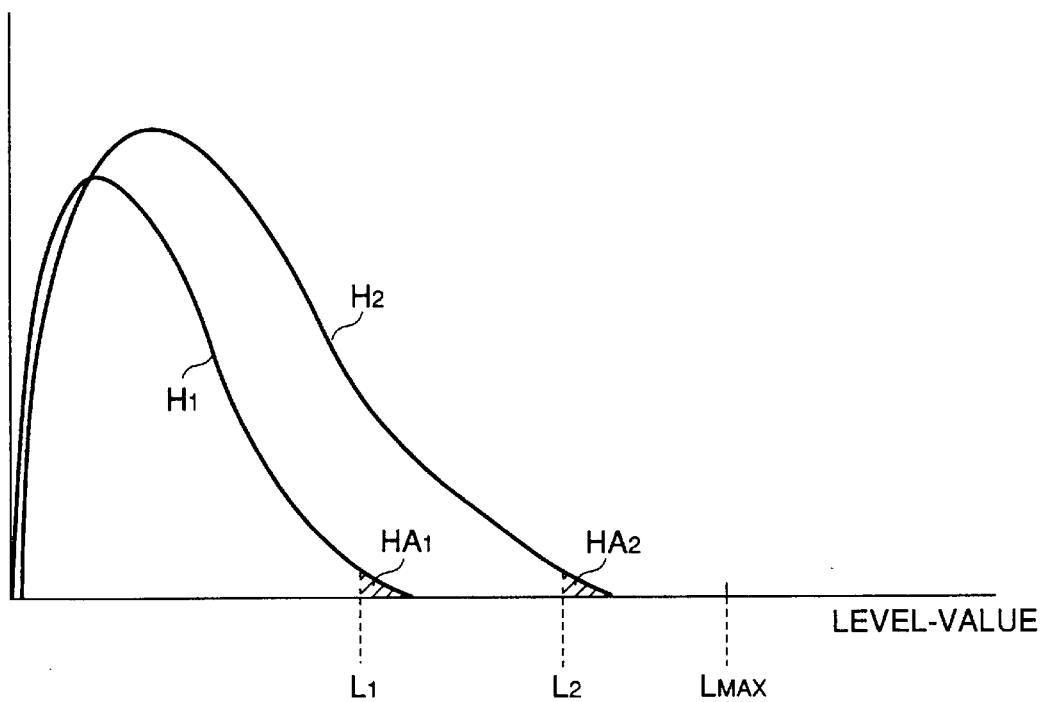
FIG. 6 is a graph showing two respective histograms of two frames of image-pixel signals, derived from two exposure periods, for explaining a principle of determination of an optimal exposure period in accordance with the present invention.

Then, as shown in FIG. 6, two histograms $H_1$ and $H_2$ are produced on the basis of the first frame of digital image-pixel signals and the second frame of digital image-pixel signals, respectively, and are stored in the memory 46. As mentioned above, since an analog image-pixel signal is converted into a 10-bit digital image-pixel signal by the A/D converter 42, each of the digital image-pixel signals included in each frame are classified into any one of 1,024 level-values.

Subsequently, a first effective maximum level-value of the digital image-pixel signals included in the first frame is determined from the first histogram $H_1$, and a second effective maximum level-value of the digital image-pixel signals included in the second frame is determined from the second histogram $H_2$. In FIG. 6, the respective first and second effective maximum level-values are indicated by references $L_1$ and $L_2$, and each effective maximum level-value ($L_1$, $L_2$) may be defined as a boundary-level-value of a corresponding hatched area ($HA_1$, $HA_2$), including an actual-maximum level-value, of the histogram ($H_1$, $H_2$), in which a number of digital image-pixel signals, corresponding to 0.5% of the total number of the digital image-pixel signals in each frame, for example, is included. Note, similar to the above-mentioned case, the digital image-pixel signals, included in each hatched area ($HA_1$, $HA_2$), are derived from the highest-transparency area of the recorded image of the transparency film M.

Figure 7:
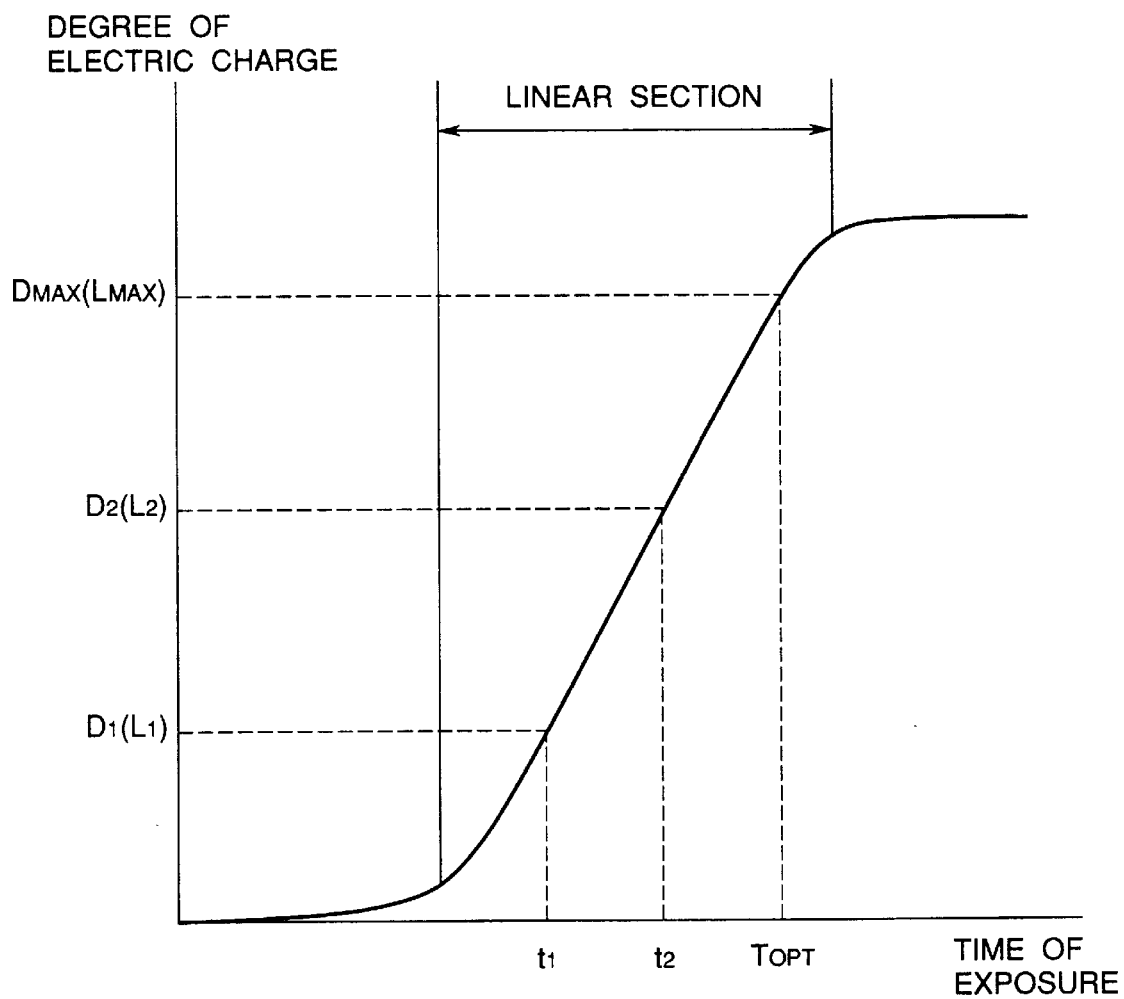
FIG. 7 is a graph showing a characteristic curve representing a relationship between a degree of electric-charge-accumulation and a time of exposure in a CCD element of a CCD line image sensor, in relation to the histograms of FIG. 6.

FIG. 7 is a graph conceptually illustrating how the optimal exposure period is determined in accordance with the principle of the present invention. This graph is essentially identical to the graph of FIG. 5. Namely, a characteristic curve, shown in the graph of FIG. 7, represents a change in the degree of electric charge accumulation in the specific CCD element of the CCD line image sensor 28, which is exposed to the monochromatic light rays (red, green, blue), passing through the highest-transparency area of the recorded image of the transparency film M.

In the graph of FIG. 7, the respective first and second exposure periods, which are set in the first and second pre-reading operations, are indicated by references $t_1$ and $t_2$. As is apparent from FIG. 7, the settings of the first and second exposure periods $t_1$ and $t_2$ are performed so that these exposure periods $t_1$ and $t_2$ are encompassed within a linear section of the characteristic curve, even though the characteristic curve may be shifted along the abscissa, due to a change in transparency of a recorded image due to a reading of another transparent film.

Similar to the above-mentioned case, a degree of electric charge accumulation $D_1$, which is obtained at the time when the exposure period $t_1$ is completed, corresponds to the first effective maximum level-value $L_1$ (FIG. 6), and a degree of electric charge accumulation $D_2$, which is obtained at the time when the exposure period $t_2$ is completed, corresponds to the second effective maximum level-value $L_2$ (FIG. 6)

In the graph of FIG. 7, the optimal exposure period $T_{OPT}$ can be accurately determined on the basis of the following proportional calculation:

$$(L_{MAX}-L_1)/(T_{OPT}-t_1)=(L_2-L_1)/(t_2-t_1)$$

Namely, this formula can be rearranged as follows:

$$T_{OPT}=[(L_{MAX}-L_1)/(L_2-L_1)]*(t_2-t_1)+t_1$$

In this rearrangement, the term "$[(L_{MAX}-L_1)/(L_2-L_1)]*(t_2-t_1)$" accurately represents the difference $(T_{OPT}-t_1)$, due to the linear section of the characteristic curve of FIG. 7. Thus, the determination of the optimal exposure period $T_{OPT}$ can be accurately achieved by adding the period $t_1$ to the term $$"[(L_{MAX}-L_1)/(L_2-L_1)]*(t_2-t_1)".$$

Figure 8:
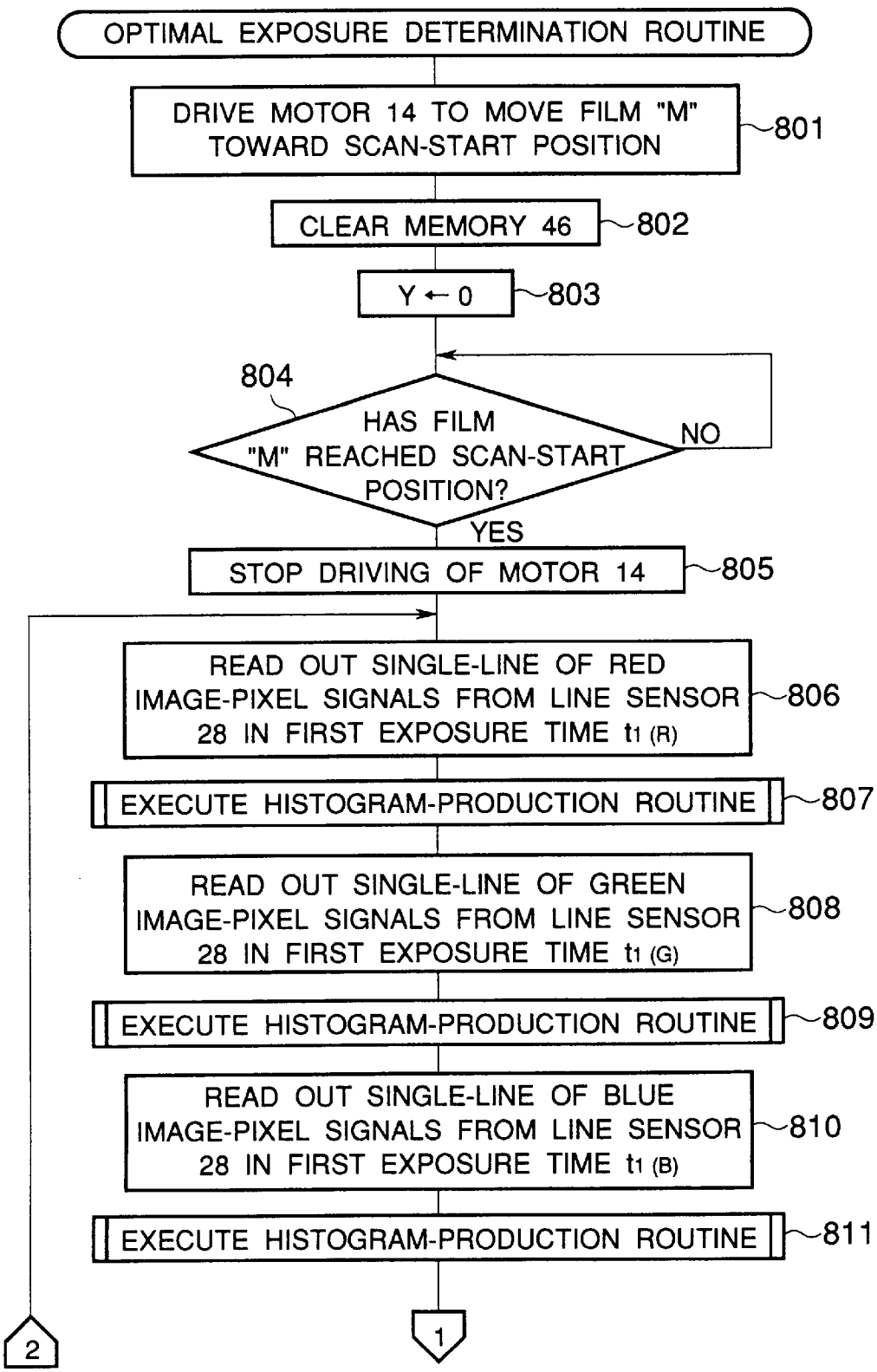
FIG. 8 is a part of a flowchart showing an optimal exposure time determination routine executed in the first embodiment of the color-image reader according to the present invention.
Figure 9:
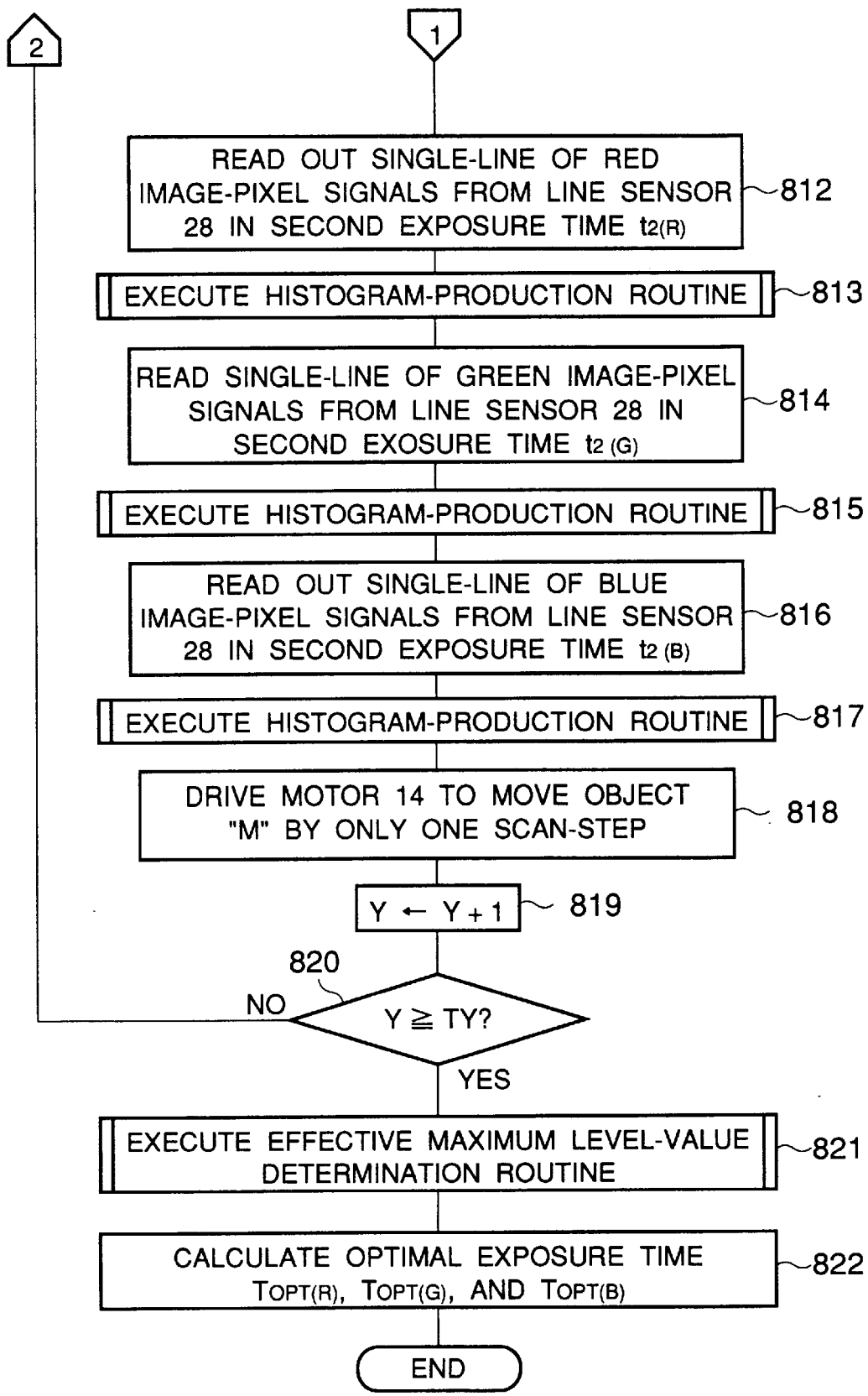
FIG. 9 is the remaining part of the flowchart showing the optimal exposure time determination routine executed in the first embodiment of the color-image reader according to the present invention.
Figure 10:
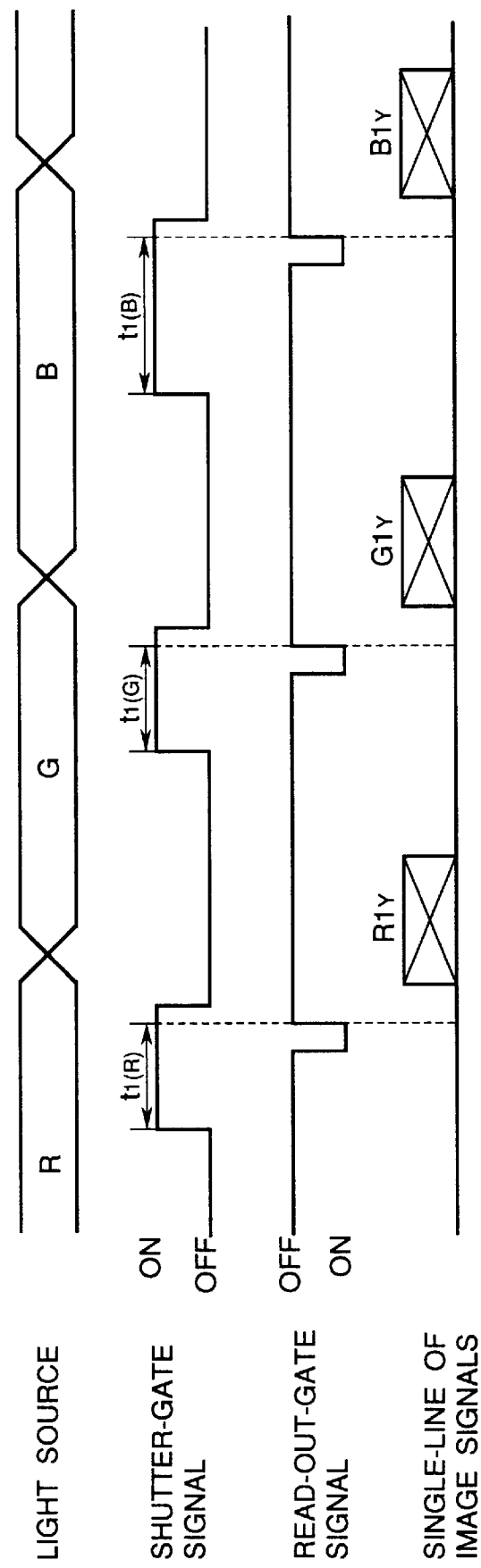
FIG. 10 is a timing chart for assisting in an explanation of the flowchart shown in FIGS. 8 and 9.
Figure 11:
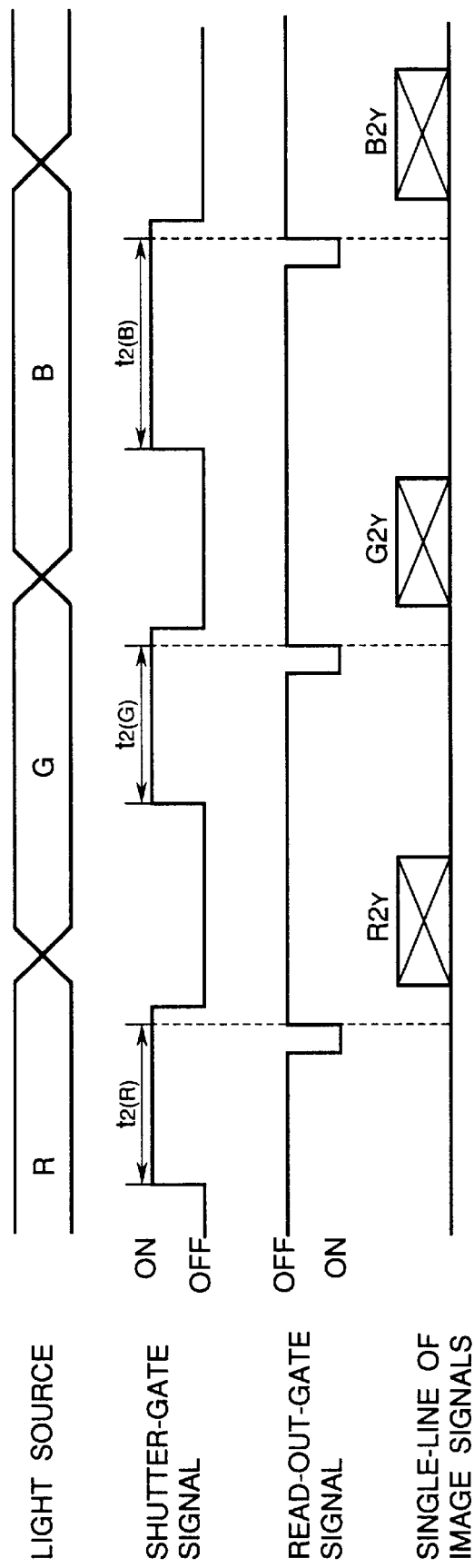
FIG. 11 is another timing chart for assisting in an explanation of the flowchart shown in FIGS. 8 and 9.

FIGS. 8 and 9 show a flowchart of a determination routine for determining an optimal exposure period, executed in the color-image reader according to the present invention. The execution is started by turning ON a first determination-start switch provided on the switch panel 52 after a power ON/OFF switch (not shown) of the color-image reader has been turned ON. Each of FIGS. 10 and 11 shows a timing chart for assisting in an explanation of the determination routine of FIGS. 8 and 9.

At step 801, the drive motor 14 is driven to move the carriage 10, and the transparency film M, toward a scan-start position. At step 802, the memory 46 is cleared, and, at step 803, a counter Y is reset. Note, the counter Y counts a number of scanning-steps or moving-steps of the transparency film M, during a pre-reading operation of a recorded image of the transparency film M.

At step 804, it is monitored whether the transparency film M, held by the frame holder F, has reached a scan-start position. When it is confirmed that the transparency film M has reached the scan-start position, the control proceeds to step 805, in which the driving of the drive motor 14 is stopped.

At step 806, the plurality of red LED's 24R is powered ON, and the CCD line image sensor 28 is illuminated by the red-light rays, passing through the transparency film M, carrying red-image information. During the illumination of the CCD line image sensor 28 by the red-light rays, the CCD elements of the CCD line image sensor 28 are exposed to the red-light rays over a first exposure period $t_{1(R)}$, which corresponds to the first exposure period $t_1$ shown in the graph of FIG. 7, and then a single-line of red image-pixel signals $R1_Y$ is read from the CCD line image sensor 28, as shown in the timing chart of FIG. 10. The read image-pixel signals $R1_Y$ are successively converted into digital red image-pixel signals by the A/D converter 42, and the single-line of digital red image-pixel signals ($R1_Y$) is then stored in the memory 46.

In particular, after the powering-ON of the red LED's 24R, a shutter-gate signal is turned ON at a given timing, as shown in the timing chart of FIG. 10, whereby the electronic shutter of the CCD line image sensor 28 is opened, enabling the exposure of the CCD elements of the CCD line image sensor 28 to the red-light rays to be started. Namely, as soon as the shutter-gate signal is turned ON, an electric charge is generated and accumulated as a red image-pixel signal in each of the CCD elements of the CCD line image sensor 28.

Then, when a read-out-gate signal is turned ON, as shown in the timing chart of FIG. 10, the single-line of red image-pixel signals $R1_Y$ is shifted from the CCD elements of the CCD line image sensor 28 to a transfer CCD path thereof. As is apparent from the timing chart of FIG. 10, when the read-out-gate signal is turned OFF, i.e. when the shifting of the single-line of red image-pixel signals $R1_Y$ from the CCD elements to the transfer CCD path thereof is completed, the first exposure period $t_{1(R)}$ ends. Just after the read-out-gate signal is turned OFF, the shutter-gate signal is also turned OFF, and thus residual electric charges are drained out from all of the CCD elements of the CCD line image sensor 28.

On the other hand, the shifted red image-pixel signals $R1_Y$ are read out from the CCD line image sensor 28, and are amplified by the amplifier 40. Then, the amplified red image-pixel signals are successively converted into digital red image-pixel signals by the A/D converter 42, and stored in the memory 46 as the single-line of digital red image-pixel signals ($R1_Y$), as already mentioned above.

Figure 12:
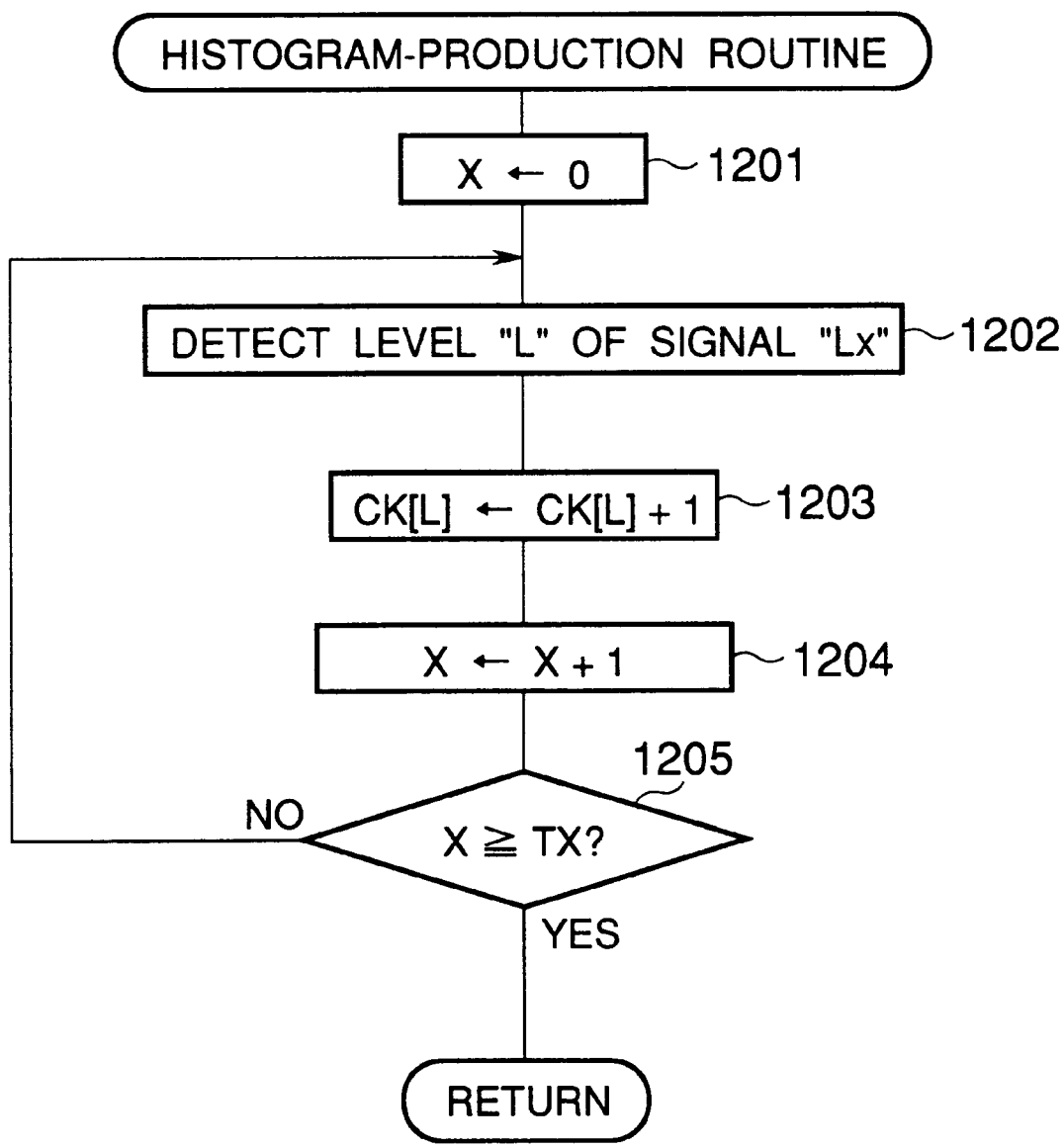
FIG. 12 is a flowchart showing a histogram-production routine executed as a sub-routine in the flowchart shown in FIGS. 8 and 9.

At step 807, a histogram-production routine, as shown in FIG. 12, is executed to partially produce a first red-histogram ($H_{1(R)}$ in FIG. 13), corresponding to the first histogram $H_1$ of FIG. 6, on the basis of the single-line of digital red image-pixel signals ($R1_Y$).

At step 808, the plurality of green LED's 24G is powered ON, and the CCD line image sensor 28 is illuminated by the green-light rays, passing through the transparency film M, carrying green-image information. During the illumination of the CCD line image sensor 28 by the green-light rays, the CCD elements of the CCD line image sensor 28 are exposed to the green-light rays over a first exposure period $t_{1(G)}$, which corresponds to the first exposure period $t_1$ shown in the graph of FIG. 7, and then a single-line of green image-pixel signals $G1_Y$ is read from the CCD line image sensor 28, as shown in the timing chart of FIG. 10. The read image-pixel signals $G1_Y$ are successively converted into digital green image-pixel signals by the A/D converter 42, and the single-line of digital green image-pixel signals ($G1_Y$) is then stored in the memory 46.

Note, the first exposure period $t_{1(G)}$ is regulated in substantially the same manner as the first exposure period $t_{1(R)}$, and the reading of the single-line of green image-pixel signals $G1_Y$ is performed in substantially the same manner as the reading of the single-line of red image-pixel signals $R1_Y$.

At step 809, the histogram-production routine, as shown in FIG. 12, is also executed to partially produce a first green-histogram ($H_{1(G)}$ in FIG. 13), corresponding to the first histogram $H_1$ of FIG. 6, on the basis of the single-line of digital green image-pixel signals ($G1_Y$).

At step 810, the plurality of blue LED's 24B is powered ON, and the CCD line image sensor 28 is illuminated by the blue-light rays, passing through the transparency film M, carrying blue-image information. During the illumination of the CCD line image sensor 28 by the blue-light rays, the CCD elements of the CCD line image sensor 28 are exposed to the blue-light rays over a first exposure period $t_{1(B)}$, which corresponds to the first exposure period $t_1$ shown in the graph of FIG. 7, and then a single-line of blue image-pixel signals $B1_Y$ is read from the CCD line image sensor 28, as shown in the timing chart of FIG. 10. The read image-pixel signals $B1_Y$ are successively converted into digital blue image-pixel signals by the A/D converter 42, and the single-line of digital blue image-pixel signals ($B1_Y$) is then stored in the memory 46.

Note, the first exposure period $t_{1(B)}$ is also regulated in substantially the same manner as the first exposure period $t_{1(R)}$, and the reading of the single-line of blue image-pixel signals $B1_Y$ is also performed in substantially the same manner as the reading of the single-line of red image-pixel signals $R1_Y$.

At step 811, the histogram-production routine, as shown in FIG. 12, is further executed to partially produce a first blue-histogram ($H_{1(B)}$ in FIG. 13), corresponding to the first histogram $H_1$ of FIG. 6, on the basis of the single-line of digital blue image-pixel signals ($B1_Y$).

At step 812, the plurality of red LED's 24R is again powered ON, and the CCD line image sensor 28 is illuminated by the red-light rays, passing through the transparency film M, carrying red-image information. During the illumination of the CCD line image sensor 28 by the red-light rays, the CCD elements of the CCD line image sensor 28 are exposed to the red-light rays over a second exposure period $t_{2(R)}$, which corresponds to the second exposure period $t_2$ shown in the graph of FIG. 7, and then a single-line of red image-pixel signals $R2_Y$ is read from the CCD line image sensor 28, as shown in the timing chart of FIG. 11. The read image-pixel signals $R2_Y$ are successively converted into digital red image-pixel signals by the A/D converter 42, and the single-line of digital red image-pixel signals ($R2_Y$) is then stored in the memory 46.

In particular, after the powering-ON of the red LED's 24R, the shutter-gate signal is turned ON at a given timing, as shown in the timing chart of FIG. 11, whereby the electronic shutter of the CCD line image sensor 28 is opened, enabling the exposure of the CCD elements of the CCD line image sensor 28 to the red-light rays to be started. Namely, as soon as the shutter-gate signal is turned ON, an electric charge is generated and accumulated as a red image-pixel signal in each of the CCD elements of the CCD line image sensor 28.

Then, when a read-out-gate signal is turned ON, as shown in the timing chart of FIG. 11, the single-line of red image-pixel signals $R2_Y$ is shifted from the CCD elements of the CCD line image sensor 28 to the transfer CCD path thereof. As is apparent from the timing chart of FIG. 11, when the read-out-gate signal is turned OFF, i.e. when the shifting of the single-line of red image-pixel signals $R2_Y$ from the CCD elements to the transfer CCD path thereof is completed, the second exposure period $t_{2(R)}$ ends. Just after the read-out-gate signal is turned OFF, the shutter-gate signal is also turned OFF, and thus residual electric charges are drained out from all of the CCD elements of the CCD line image sensor 28.

On the other hand, the shifted red image-pixel signals $R2_Y$ are read out from the CCD line image sensor 28, and are amplified by the amplifier 40. Then, the amplified red image-pixel signals are successively converted into digital red image-pixel signals by the A/D converter 42, and stored in the memory 46 as the single-line of digital red image-pixel signals ($R2_Y$), as already mentioned above.

At step 813, the histogram-production routine, as shown in FIG. 12, is executed to partially produce a second red-histogram ($H_{2(R)}$ in FIG. 13), corresponding to the second histogram $H_2$ of FIG. 6, on the basis of the single-line of digital red image-pixel signals ($R2_Y$).

At step 814, the plurality of green LED's 24G is again powered ON, and the CCD line image sensor 28 is illuminated by the green-light rays, passing through the transparency film M, carrying green-image information. During the illumination of the CCD line image sensor 28 by the green-light rays, the CCD elements of the CCD line image sensor 28 are exposed to the green-light rays over a second exposure period $t_{2(G)}$, which corresponds to the second exposure period $t_2$ shown in the graph of FIG. 7, and then a single-line of green image-pixel signals $G2_Y$ is read from the CCD line image sensor 28, as shown in the timing chart of FIG. 11. The read image-pixel signals $G2_Y$ are successively converted into digital green image-pixel signals by the A/D converter 42, and the single-line of digital green image-pixel signals ($G2_Y$) is then stored in the memory 46.

Note, the second exposure period $t_{2(G)}$ is regulated in substantially the same manner as the second exposure period $t_{2(R)}$, and the reading of the single-line of green image-pixel signals $G2_Y$ is performed in substantially the same manner as the reading of the single-line of red image-pixel signals $R2_Y$.

At step 815, the histogram-production routine, as shown in FIG. 12, is again executed to partially produce a second green-histogram ($H_{2(G)}$ in FIG. 13), corresponding to the second histogram $H_2$ of FIG. 6, on the basis of the single-line of digital green image-pixel signals ($G2_Y$).

At step 816, the plurality of blue LED's 24B is powered ON, and the CCD line image sensor 28 is illuminated by the blue-light rays, passing through the transparency film M, carrying blue-image information. During the illumination of the CCD line image sensor 28 by the blue-light rays, the CCD elements of the CCD line image sensor 28 are exposed to the blue-light rays over a second exposure period $t_{2(B)}$, which corresponds to the second exposure period $t_2$ shown in the graph of FIG. 7, and then a single-line of blue image-pixel signals $B2_Y$ is read from the CCD line image sensor 28, as shown in the timing chart of FIG. 11. The read image-pixel signals $B2_Y$ are successively converted into digital blue image-pixel signals by the A/D converter 42, and the single-line of digital blue image-pixel signals ($B2_Y$) is then stored in the memory 46.

Note, the second exposure period $t_{2(B)}$ is also regulated in substantially the same manner as the second exposure period $t_{2(R)}$, and the reading of the single-line of blue image-pixel signals $B2_Y$ is also performed in substantially the same manner as the reading of the single-line of red image-pixel signals $R2_Y$.

At step 817, the histogram-production routine, as shown in FIG. 12, is further executed to partially produce a second blue-histogram ($H2_{(B)}$ in FIG. 13), corresponding to the second histogram $H_2$ of FIG. 6, on the basis of the single-line of digital blue image-pixel signals ($B2_Y$).

At step 818, the drive motor 14 is driven to advance the carriage 10, and therefore the transparency film M, by one scan-step. Then, at step 819, the counter Y is incremented by one, and the control proceeds to step 820, in which it is determined whether a count number of the counter Y has reached TY. Note, TY represents a total number of scan-steps which is necessary for completely reading the recorded image of the transparency film M in the pre-reading operation, and the total scan-steps TY may be previously set and stored in the ROM of the system control circuit 32.

If Y<TY, the control returns from step 820 to step 806, and the routine comprising steps 806 to 820 is repeatedly executed until the count number of the counter Y reaches TY. At step 820, when the count number of the counter Y has reached TY, i.e. when the pre-reading operation is completed, the control proceeds from step 820 to step 821.

Note, at this stage, the production of the first and second red-histograms ($H_{1(R)}$ and $H_{2(R)}$) based on all of the single-lines of the digital red image-pixel signals $R1_Y$ and $R2_Y$, the production of the first and second green-histograms ($H_{1(G)}$ and $H_{2(G)}$) based on all of the single-lines of digital green image-pixel signals $G1_Y$ and $G2_Y$, and the production of the first and second blue-histograms ($H_{1(B)}$ and $H_{2(B)}$) based on all of the single-lines of digital blue image-pixel signals $B1_Y$ and $B2_Y$ have been completed.

Figure 14:
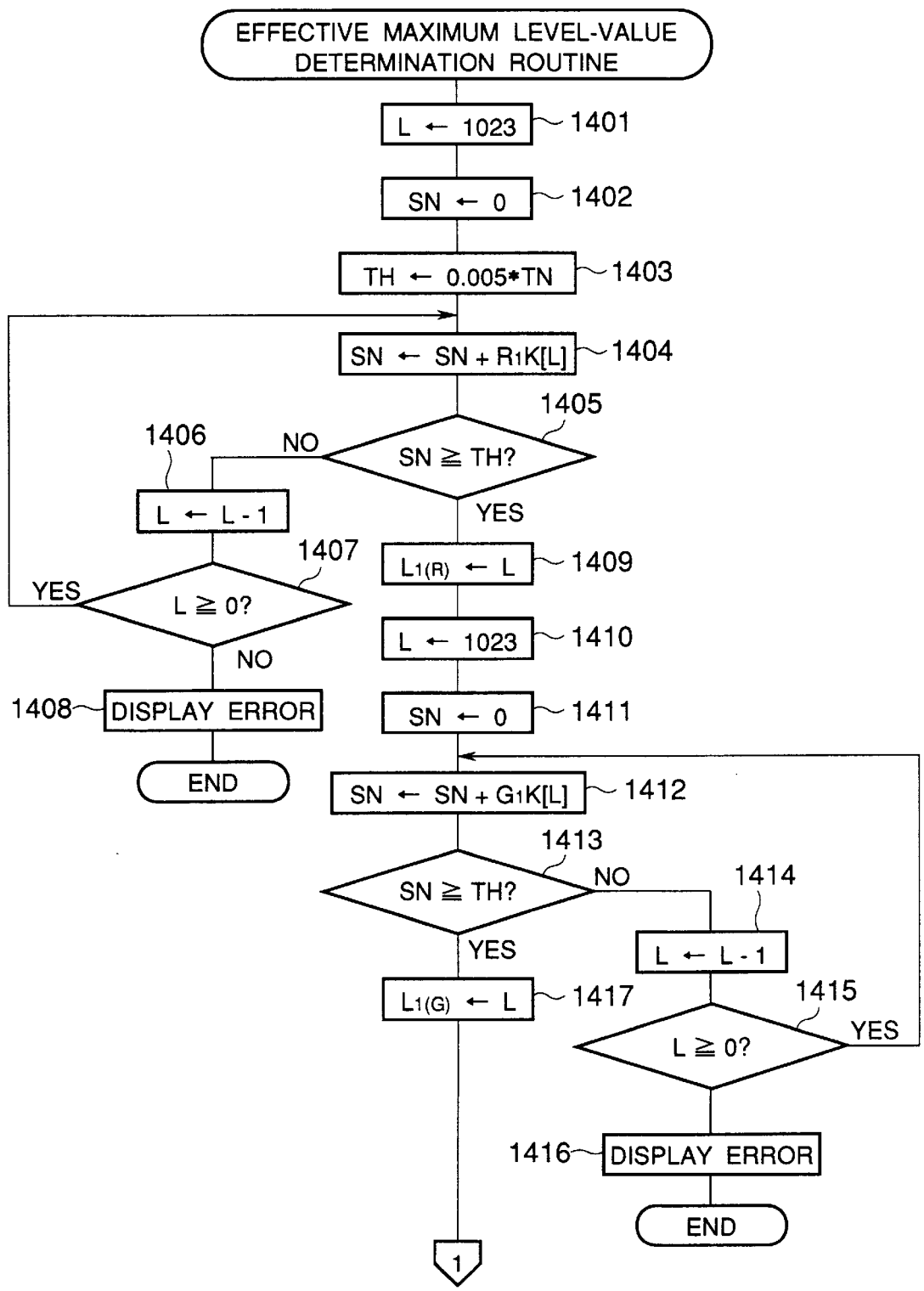
FIG. 14 is a part of a flowchart showing an effective maximum level-value determination routine executed as a sub-routine in the flowchart of FIGS. 8 and 9.
Figure 15:
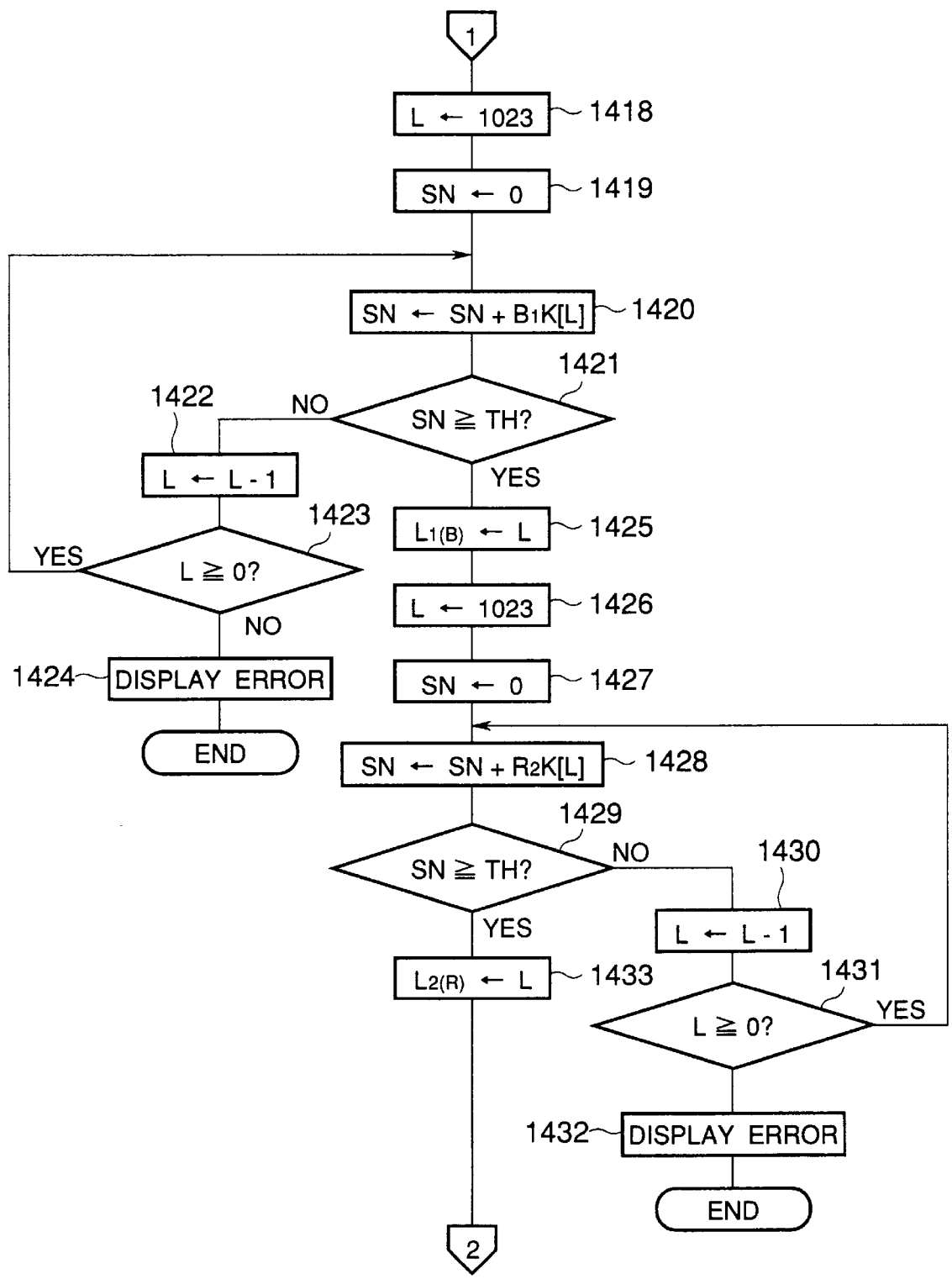
FIG. 15 is another part of the flowchart showing the effective maximum level-value determination routine executed as the sub-routine in the flowchart of FIGS. 8 and 9.
Figure 16:
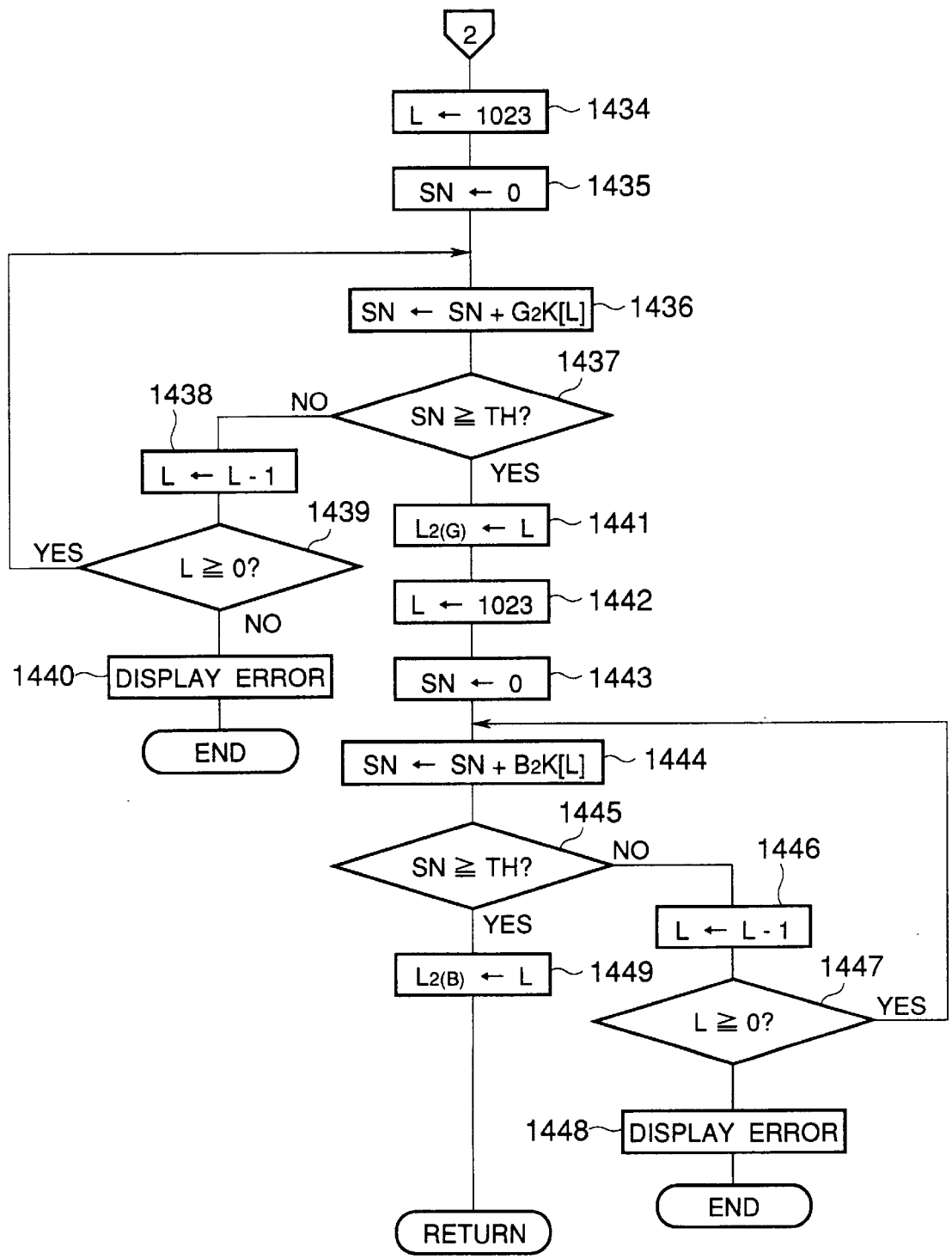
FIG. 16 is the remaining part of the flowchart showing the effective maximum level-value determination routine executed as the sub-routine in the flowchart of FIGS. 8 and 9.

At step 821, an effective maximum level-value determination routine, as shown in FIGS. 14 to 16, is executed, whereby an effective maximum level-value is determined from each of the above-mentioned histograms. Namely, respective effective maximum level-values $L_{1(R)}$, $L_{1(G)}$ and $L_{1(B)}$, each of which corresponds to $L_1$ of FIG. 6, are obtained from the first red-histogram ($H_{1(R)}$), first green-histogram ($H_{1(G)}$) and first blue-histogram ($H_{1(B)}$), and respective effective maximum level-values $L_{2(R)}$, $L_{2(G)}$ and $L_{2(B)}$, each of which corresponds to $L_2$ of FIG. 6, are obtained from the second red-histogram ($H_{2(R)}$), second green-histogram ($H_{2(G)}$) and second blue-histogram ($H_{2(B)}$).

Then, at step 822, optimal exposure periods $T_{OPT(R)}$, $T_{OPT(G)}$ and $T_{OPT(B)}$ are calculated from the following formulas:

$$T_{OPT(R)} \leftarrow [(L_{MAX(R)} + L_{1(R)})/(L_{2(R)} - L_{1(R)})] * (t_{2(R)} - t_{1(R)}) + t_{1(R)}$$

$$T_{OPT(G)} \leftarrow [(L_{MAX(G)} + L_{1(G)})/(L_{2(G)} - L_{1(G)})] * (t_{2(G)} - t_{1(G)}) + t_{1(G)}$$

$$T_{OPT(B)} \leftarrow [(L_{MAX(B)} + L_{1(B)})/(L_{2(B)} - L_{1(B)})] * (t_{2(B)} - t_{1(B)}) + t_{1(B)}$$

Herein: Each of $L_{MAX(R)}$, $L_{MAX(G)}$ and $L_{MAX(B)}$ corresponds to $L_{MAX}$ of FIG. 6.

Note, $L_{MAX(R)}$, $L_{MAX(G)}$ and $L_{MAX(B)}$ are suitably predetermined in view of the dynamic range of the A/D converter 42, and may be previously stored in the ROM of the system control circuit 32.

The calculated results, i.e. the optimal exposure periods $T_{OPT(R)}$, $T_{OPT(G)}$ and $T_{OPT(B)}$, are stored in the RAM of the system control circuit 32, and are used when a pre-reading operation for determinating color-correction parameters, as explained hereinafter, and a regular reading operation are executed in the color-image reader.

With reference to FIG. 12, the histogram-production routine, executed in each of steps 807, 809, 811, 813, 815 and 817 of the flowchart of FIGS. 8 and 9, will now be explained below.

Prior to the explanation of the histogram-production routine, the following matters are confirmed for assisting in the explanation:

1) A single-line of monochromatic (red, green, blue) image-pixel signals, read from the CCD line image sensor 28, is converted into a single-line of digital monochromatic image-pixel signals by the A/D converter 42, and these digital monochromatic image-pixel signals included in one single-line are stored in the memory 46.

2) Each of the digital monochromatic image-pixel signals is classified into any one of the 1,024 level-values due to the conversion of the analog image-pixel signal into the 10-bit digital image-pixel signal by the A/D converter 42, as already mentioned above.

3) As conceptually shown in FIG. 13, the first red-histogram, indicated by reference $H_{1(R)}$, is stored in areas defined by addresses "0000" to "1023" of the memory 46;

the first green-histogram, indicated by reference $H_{1(G)}$, is stored in areas defined by addresses "1024" to "2047" of the memory 46;

the first blue-histogram, indicated by reference $H_{1(B)}$, is stored in areas defined by addresses "2048" to "3071" of the memory 46;

the second red-histogram, indicated by reference $H_{2(R)}$, is stored in areas defined by addresses "3072" to "4095" of the memory 46;

the second green-histogram, indicated by reference $H_{2(G)}$, is stored in areas defined by addresses "4096" to "5119" of the memory 46; and the second blue-histogram, indicated by reference $H_{2(B)}$, is stored in areas defined by addresses "5120" to "6143" of the memory 46.

4) A histogram-production counter $R_1K[L]$ is defined in each of the addresses "0000" to "1023", and is used to count a number of digital red image-pixel signals having the same level-value L;

a histogram-production counter $G_1K[L]$ is defined in each of the addresses "1024" to "2047", and is used to count a number of digital green image-pixel signals having the same level-value L;

a histogram-production counter $B_1K[L]$ is defined in each of the addresses "2048" to "3071", and is used to count a number of digital blue image-pixel signals having the same level-value L;

a histogram-production counter $R_2K[L]$ is defined in each of the addresses "3072" to "4095", and is used to count a number of digital red image-pixel signals having the same level-value L;

a histogram-production counter $G_2K[L]$ is defined in each of the addresses "4096" to "5119", and is used to count a number of digital green image-pixel signals having the same level-value L; and a histogram-production counter $B_2K[L]$ is defined in each of the addresses "5120" to "6143", and is used to count a number of digital blue image-pixel signals having the same level-value L.

5) A level-value L of a digital monochromatic image-pixel signal is represented by any one of [L=0000] to [L=1023].

At step 1201, a counter X is reset. The counter X is used to count a number of the digital monochromatic image-pixel signals (red, green, blue) included in one single-line. Then, at step 1202, a level-value L is detected with respect to one ($L_X$) of the digital monochromatic image-pixel signals included in one single-line. Note, the level-value L represents one of the 1,024 level-values.

At step 1203, a count number of a histogram-production counter CK[L], representing any one of $R_1K[L]$, $G_1K[L]$, $B_1K[L]$, $R_2K[L]$, $G_2K[L]$ and $B_2K[L]$, is incremented by one. Then, at step 1204, the count number of the counter X is incremented by one. Subsequently, at step 1205, it is determined whether the count number of the counter X has reached TX. Note, "TX" represents a total number of the digital monochromatic image-pixel signals included in one single-line, which is equal to the total number of the CCD elements of the CCD line image sensor 28, and which may be previously set and stored in the ROM of the system control circuit 32.

If X<TX, the control returns from step 1205 to step 1202, and the routine comprising steps 1202 to 1205 is repeatedly executed until the count number of the counter X reaches TX. At step 1205, when the count number of the counter X has reached TX, i.e. when a partial production of a histogram based on the single-line of the digital monochromatic image-pixel signals is completed, the control returns to one of steps 807, 809, 811, 813, 815 and 817 of the flowchart of FIGS. 8 and 9.

With reference to FIGS. 14 to 16, the effective maximum level-value determination routine, executed in step 821 of the flowchart of FIGS. 8 and 9, will now be explained below.

At step 1401, a level-value L, representing any one of [0000] to [1023], is set to the maximum level-value [1023], and, at step 1402, an image-pixel-signal-number parameter SN, representing a number of digital monochromatic image-pixel signals, is initialized as 0.

At step 1403, a threshold value TH is set by the following calculation:

$$TH \leftarrow 0.005 * TN$$

Herein, TN indicates a total number of digital monochromatic image-pixel signals included in one frame. Namely, a number of digital monochromatic image-pixel signals, corresponding to 0.5% of the total number TN of the digital monochromatic image-pixel signals in one frame, is set as the threshold value TH.

At step 1404, the following calculation is executed:

$$SN \leftarrow SN + R_1K[L=1023]$$

Then, at step 1405, it is determined whether the image-pixel-signal-number parameter SN is equal to or more than the threshold value TH.

If SN<TH, the control proceeds from step 1405 to step 1406, in which the level-value L is decremented by one. Then, at step 1407, it is determined whether the level value L is greater than or equal to the minimum level-value [0000]. At this stage, since L=1023, the control returns from step 1407 to step 1404. Namely, the routine comprising steps 1404 to 1407 is repeatedly executed until the image-pixel-signal-number parameter SN reaches or exceeds the threshold value TH.

At step 1405, when SN≧TH, the control proceeds from step 1405 to step 1409, in which the level-value L, obtained at this stage, is stored, as the effective maximum level-value $L_{1(R)}$ of the first red-histogram $H_{1(R)}$, in the RAM of the system control circuit 32.

On the other hand, at step 1407, if it is determined that the level-value L is less than the minimum level-value [0000] during the execution of the routine comprising steps 1404 to 1407, without the image-pixel-signal-number parameter SN reaching or exceeding the threshold value TH, the first red-histogram $H_{1(R)}$ has been abnormally produced. In this case, the control proceeds from step 1407 to step 1408, in which an error message, announcing that the pre-reading operation should be repeated, is displayed on, for example, an LCD (liquid crystal display) panel (not shown) provided on the color-image reader.

At step 1410, the level-value L is again set to be the maximum level-value [1023], and, at step 1411, the image-pixel-signal-number parameter SN is reset to 0.

At step 1412, the following calculation is executed:

$$SN \leftarrow SN + G_1K[L=1023]$$

Then, at step 1413, it is determined whether the image-pixel-signal-number parameter SN is equal to or more than the threshold value TH.

If SN<TH, the control proceeds from step 1413 to step 1414, in which the level-value L is decremented by one. Then, at step 1415, it is determined whether the level value L is equal to or more than the minimum level-value [0000]. At this stage, since L=1023, the control returns from step 1415 to step 1412. Namely, the routine comprising steps 1412 to 1415 is repeatedly executed until the image-pixel-signal-number parameter SN reaches or exceeds the threshold value TH.

At step 1413, if SN≧TH, the control proceeds from step 1413 to step 1417, in which the level-value L, obtained at this stage, is stored, as the effective maximum level-value $L_{1(G)}$ of the first green-histogram $H_{1(G)}$, in the RAM of the system control circuit 32.

Similar to the above mentioned case, at step 1415, if it is determined that the level-value L is less than zero during the execution of the routine comprising steps 1412 to 1415, without the image-pixel-signal-number parameter SN reaching or exceeding the threshold value TH, the first green-histogram $H_{1(G)}$ has been abnormally produced. Accordingly, the control proceeds from step 1415 to step 1416, in which the error message, announcing that the pre-reading operation should be repeated, is displayed on the LCD panel of the color-image reader.

At step 1418, the level-value L is again set to the maximum level-value [1023], and, at step 1419, the image-pixel-signal-number parameter SN is again reset to 0.

At step 1420, the following calculation is executed:

$$SN \leftarrow SN + B_1 K[L=1023]$$

Then, at step 1421, it is determined whether the image-pixel-signal-number parameter SN is equal to or more than the threshold value TH.

If SN<TH, the control proceeds from step 1421 to step 1422, in which the level-value L is decremented by one. Then, at step 1423, it is determined whether the level value L is equal to or more than the minimum level-value [0000]. At this stage, since L=1023, the control returns from step 1423 to step 1420. Namely, the routine comprising steps 1420 to 1423 is repeatedly executed until the image-pixel-signal-number parameter SN reaches or exceeds the threshold value TH.

At step 1421, if SN≧TH, the control proceeds from step 1421 to step 1425, in which the level-value L, obtained at this stage, is stored, as the effective maximum level-value $L_{1(B)}$ of the first blue-histogram $H_{1(B)}$, in the RAM of the system control circuit 32.

However, at step 1423, if it is determined that the level-value L is less than the minimum level-value [0000] during the execution of the routine comprising steps 1420 to 1423, without the image-pixel-signal-number parameter SN reaching or exceeding the threshold value TH, the first blue-histogram $H_{1(B)}$ has been abnormally produced. Accordingly, the control proceeds from step 1423 to step 1424, in which the error message, announcing that the pre-reading operation should be repeated, is displayed on the LCD panel of the color-image reader.

At step 1426, the level-value L is set to the maximum level-value [1023], and, at step 1427, the image-pixel-signal-number parameter SN is initialized as 0.

At step 1428, the following calculation is executed:

$$SN \leftarrow SN + R_2 K[L=1023]$$

Then, at step 1429, it is determined whether the image-pixel-signal-number parameter SN is equal to or more than the threshold value TH.

If SN<TH, the control proceeds from step 1429 to step 1430, in which the level-value L is decremented by one. Then, at step 1431, it is determined whether the level value L is equal to or more than the minimum level-value [0000]. At this stage, since L=1023, the control returns from step 1431 to step 1428. Namely, the routine comprising steps 1428 to 1431 is repeatedly executed until the image-pixel-signal-number parameter SN reaches or exceeds the threshold value TH.

At step 1429, if SN≧TH, the control proceeds from step 1429 to step 1433, in which the level-value L, obtained at this stage, is stored, as the effective maximum level-value $L_{2(R)}$ of the second red-histogram $H_{2(R)}$, in the RAM of the system control circuit 32.

However, at step 1431, if it is determined that the level-value L is less than the minimum level-value [0000] during the execution of the routine comprising steps 1428 to 1431, without the image-pixel-signal-number parameter SN reaching or exceeding the threshold value TH, the second red-histogram $L_{2(R)}$ has been abnormally produced. Accordingly, the control proceeds from step 1431 to step 1432, in which the error message, announcing that the pre-reading operation should be repeated, is displayed on the LCD panel of the color-image reader.

At step 1434, the level-value L is reset to the maximum level-value [1023], and, at step 1435, the image-pixel-signal-number parameter SN is again initialized as 0.

At step 1436, the following calculation is executed:

$$SN \leftarrow SN + G_2 K[L=1023]$$

Then, at step 1437, it is determined whether the image-pixel-signal-number parameter SN is equal to or more than the threshold value TH.

If SN<TH, the control proceeds from step 1437 to step 1438, in which the level-value L is decremented by one. Then, at step 1439, it is determined whether the level value L is equal to or more than the minimum level-value [0000]. At this stage, since L=1023, the control returns from step 1439 to step 1436. Namely, the routine comprising steps 1436 to 1439 is repeatedly executed until the image-pixel-signal-number parameter SN reaches or exceeds the threshold value TH.

At step 1437, if SN≧TH, the control proceeds from step 1437 to step 1441, in which the level-value L, obtained at this stage, is stored, as the effective maximum level-value $L_{2(G)}$ of the second green-histogram $H_{2(G)}$, in the RAM of the system control circuit 32.

However, at step 1439, if it is determined that the level-value L is less than the minimum level-value [0000] during the execution of the routine comprising steps 1436 to 1439, without the image-pixel-signal-number parameter SN reaching or exceeding the threshold value TH, the second green-histogram $H_{2(G)}$ has been abnormally produced. Accordingly, the control proceeds from step 1439 to step 1440, in which the error message, announcing that the pre-reading operation should be repeated, is displayed on the LCD panel of the color-image reader.

At step 1442, the level-value L is set to the maximum level-value [1023], and, at step 1443, the image-pixel-signal-number parameter SN is initialized as 0.

At step 1444, the following calculation is executed:

$$SN \leftarrow SN + B_2 K[L=1023]$$

Then, at step 1445, it is determined whether the image-pixel-signal-number parameter SN is equal to or more than the threshold value TH.

If SN<TH, the control proceeds from step 1445 to step 1446, in which the level-value L is decremented by one. Then, at step 1447, it is determined whether the level value L is equal to or more than the minimum level-value [0000]. At this stage, since L=1023, the control returns from step 1447 to step 1444. Namely, the routine comprising steps 1444 to 1447 is repeatedly executed until the image-pixel-signal-number parameter SN reaches or exceeds the threshold value TH.

At step 1445, if SN≧TH, the control proceeds from step 1445 to step 1449, in which the level-value L, obtained at this stage, is stored, as the effective maximum level-value $L_{2(B)}$ of the second blue-histogram $H_{2(B)}$, in the RAM of the system control circuit 32.

However, at step 1447, if it is determined that the level-value L is less than the minimum level-value [0000] during the execution of the routine comprising steps 1444 to 1447, without the image-pixel-signal-number parameter SN reaching or exceeding the threshold value TH, the second blue-histogram $H_{2(B)}$ has been abnormally produced. Accordingly, the control proceeds from step 1447 to step 1448, in which the error message, announcing that the pre-reading operation should be repeated, is displayed on the LCD panel of the color-image reader.

After the determination of the effective maximum level-values $L_{1(R)}$, $L_{(G)}$, $L_{1(B)}$, $L_{2(R)}$, $L_{2(G)}$ and $L_{2(B)}$ is completed, the control returns to step 822 of the flowchart of FIGS. 8 and 9, in which the exposure periods $T_{OPT(R)}$, $T_{OPT(G)}$ and $T_{OPT(B)}$ are calculated as mentioned above.

Figure 17:
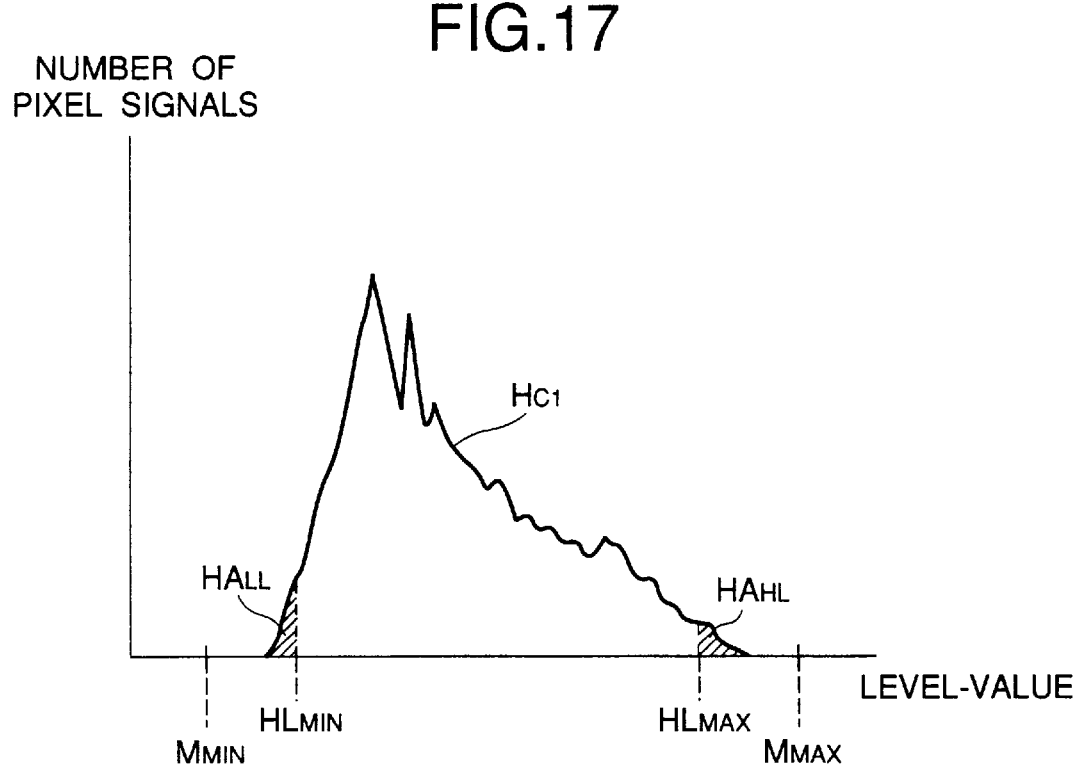
FIG. 17 is a graph showing a histogram produced on the basis of a frame of monochromatic image-pixel signals, derived from an optimal exposure period, for explaining a principle of color balance in accordance with the present invention.
Figure 18:
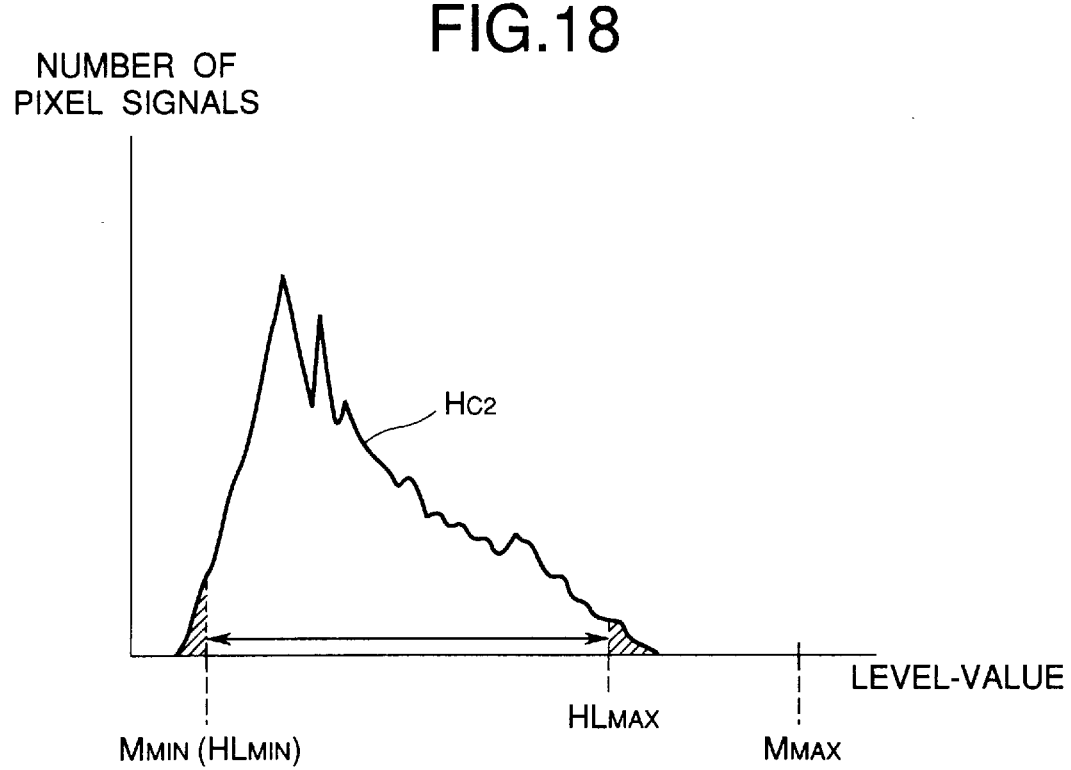
FIG. 18 is a graph showing a histogram shifted from the position of the histogram, shown in FIG. 17, along the abscissa of the graph of FIG. 17.
Figure 19:
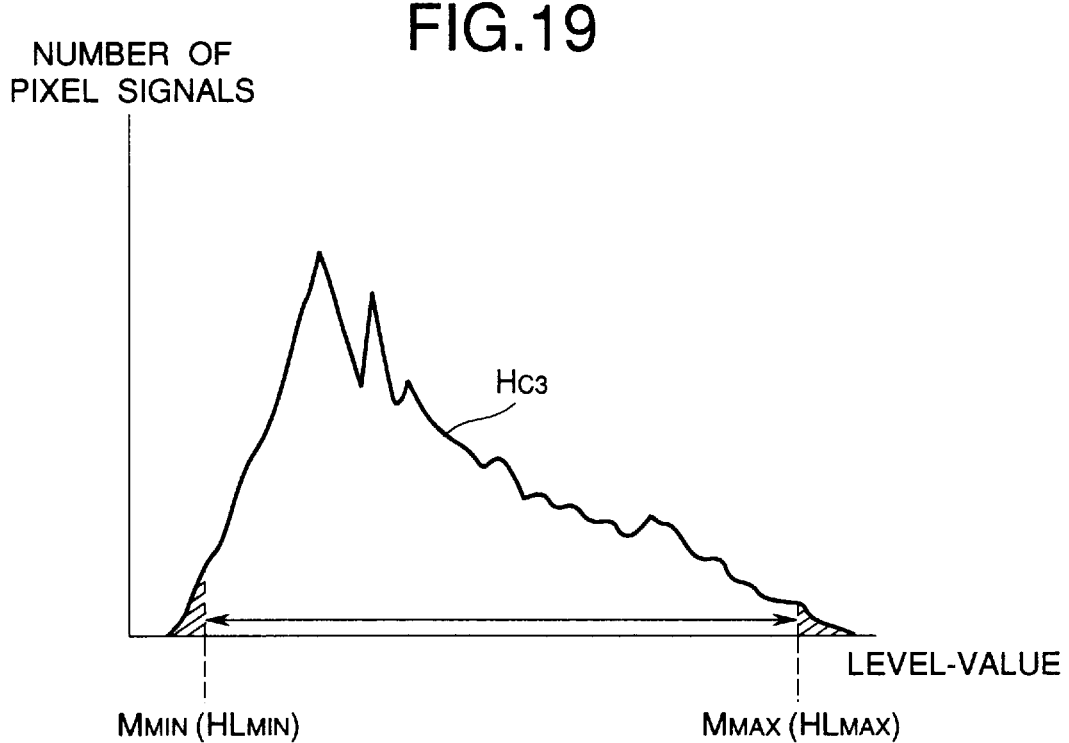
FIG. 19 is a graph showing a histogram expanded from the histogram shown in FIG. 18.

FIGS. 17 to 19 show graphs conceptually illustrating how three frames of read monochromatic (red, green, blue) image-pixel signals are processed to obtain the best color balance in accordance with the present invention.

After the determination of the optimal exposure periods $T_{OPT(R)}$, $T_{OPT(G)}$ and $T_{OPT(B)}$, a further pre-reading operation is executed to determine color-correction parameters for the color-correction, prior to a regular reading-operation of the recorded image from the transparency film M. Namely, in this further pre-reading operation, a frame of red image-pixel signals, a frame of green image-pixel signals, and a frame of blue image-pixel signals, derived from the optimal exposure periods $T_{OPT(R)}$, $T_{OPT(G)}$ and $T_{OPT(B)}$, respectively, are obtained. Then, three respective histograms are produced on the basis of the frame of red image-pixel signals, the frame of green image-pixel signals, and the frame of blue image-pixel signals. With reference to FIG. 17, the above-mentioned three histograms are represented by a conceptual histogram $H_{C1}$.

Note, the pre-reading operation for determining the color-correction parameters also may be executed with a rougher scan-pitch than that used in the regular reading-operation.

Subsequently, an effective minimum level-value $HL_{MIN}$ and an effective maximum level-value $HL_{MAX}$ are determined from the histogram $H_{C1}$. The effective minimum level-value $HL_{MIN}$ may be defined as a boundary-level-value of a hatched area $HA_{LL}$, including an actual-minimum level-value, of the histogram $H_{C1}$, in which a number of digital image-pixel signals, corresponding to 0.5% of the total number of the digital image-pixel signals in one frame, for example, is included. The effective maximum level-value $H_{MAX}$ may be defined as a boundary-level-value of a hatched area $HA_{HL}$, including an actual-maximum level-value, of the histogram $H_{C1}$, in which a number of digital image-pixel signals, corresponding to 0.5% of the total number of the digital image-pixel signals in one frame, for example, is included.

Note, of course, the digital image-pixel signals, included in the hatched area $HA_{LL}$, are derived from the lowest-transparency area of the recorded image of the transparency film M, and the digital image-pixel signals, included in the hatched area $HA_{HL}$, are derived from the highest-transparency area of the recorded image of the transparency film M.

Also, in FIG. 17, respective references $M_{MIN}$ and $M_{MAX}$ indicate a minimum level-value and a maximum level-value, which may be defined by an input-range of the look-up tables (LUT) 44R, 44G and 44B of the image-signal processing circuit 44. Namely, the minimum level-value coincides with a minimum level-value of an image-pixel signal, which is allowed to be inputted to the LUT (44R, 44G, 44B), and the maximum level-value $M_{MAX}$ coincides with a maximum level-value of an image-pixel signal, which is allowed to be inputted to the LUT (44R, 44G, 44B). Note, although the minimum level-value $M_{MIN}$ and the maximum level-value are commonly set with respect to the LUT 44R, 44G and 44B, respective minimum level-values and respective maximum level-values may be individually set with respect to the LUT's 44R, 44G and 44B, if necessary.

In principle, the color balance is carried out among the three frames of monochromatic (red, green, blue) image-pixel signals as follows:

First, the histogram $H_{C1}$ is shifted along the abscissa of the graph of FIG. 17, until the effective minimum level-value $HL_{MIN}$ coincides with the minimum level-value $M_{MIN}$, as shown in a graph of FIG. 18. Namely, in this graph, the shifted histogram is indicated by reference $H_{C2}$. The shifting of the histogram is achieved by converting a level-value $L_i$ each of the image-pixel signals included in one frame, on the basis of the following formula:

$$CL1_i = (L_i - HL_{MIN}) + M_{MIN}$$

Herein: $CL1_i$ indicates a converted level-value.

Then, the shifted histogram $H_{C2}$ is expanded such that the effective maximum level-value $HL_{MAX}$ coincides with the maximum level-value $M_{MAX}$, as shown in a graph of FIG. 19. Namely, in this graph, the expanded histogram is indicated by reference $H_{C3}$ The expansion of the histogram is achieved by further converting a level-value $CL1_i$ of each of the image-pixel signals, on the basis of the following formula:

$$CL2_i = CL1_i * [(M_{MAX} - M_{MIN})/(HL_{MAX} - HL_{MIN})]$$

Herein: $CL2_i$ indicates a further converted level-value.

In short, a red histogram, a green histogram and a blue histogram are individually processed to be subjected to the above-mentioned conversion-processes, whereby a color balance can be carried out among the three frames of monochromatic (red, green, blue) image-pixel signals.

Note, in actuality, the above-mentioned conversion-processes are all at once achieved on the basis of the following formula:

$$CL2_i = (L_i - HL_{MIN}) * [(M_{MAX} - M_{MIN})/(HL_{MAX} - HL_{MIN})] + M_{MIN}$$

Namely, the effective minimum level-value $HL_{MIN}$ and the coefficient "$(M_{MAX} - M_{MIN})/(HL_{MAX} - HL_{MIN})$" are utilized as color-correction parameters in a regular reading-operation of the recorded color image from the transparency film M.

In this embodiment, since the transparency film M is a negative transparency film, the negative color image may be converted into a positive color image, if necessary. The conversion of the negative color image into the positive color image is carried out on the basis of the following formula:

$$PL_i = M_{MAX} - CL2_i + M_{MIN}$$

Herein: $PL_i$ indicates a level-value of an image-pixel signal subjected to the negative-to-positive conversion process.

Figure 20:
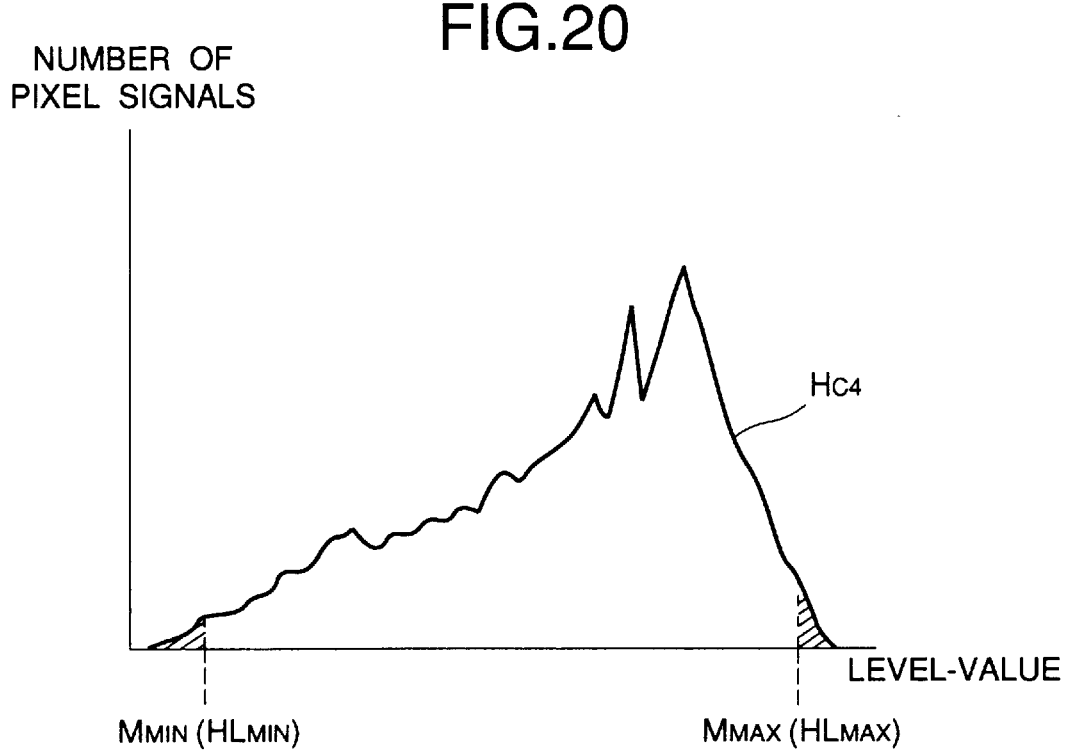
FIG. 20 is a graph showing a histogram negative-to-positive-converted from the histogram shown in FIG. 19.

Referring to FIG. 20, a histogram, which is produced on the basis of the frame of monochromatic positive image-pixel signals subjected to the negative-to-positive conversion process, is indicated by reference $H_{C4}$.

Figure 21:
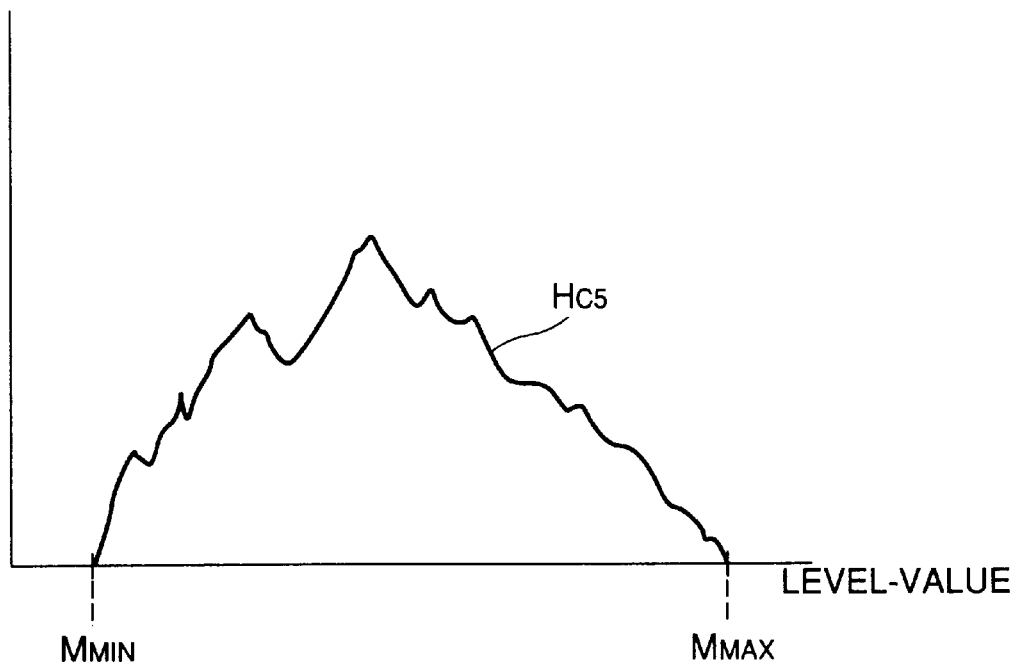
FIG. 21 is a graph showing a histogram obtained from image-processes to the histogram of FIG. 20.

The frame of monochromatic positive image-pixel signals is then inputted to the corresponding LUT (44R, 44G, 44B) of the image-signal processing circuit 44, and is processed to be subjected to the shading-correction, gamma correction, white balance correction and so on. With reference to FIG. 21, a histogram, which is produced on the basis of the frame of monochromatic positive image-pixel signals processed in the image-signal processing circuit 44, is indicated by reference $H_{C5}$.

Note, as can be easily understood, if the transparency film M is a positive transparency film, the positive color image can be converted into the negative color image. In this case, the conversion of the positive color image into the positive color image is carried out on the basis of the same formula "$P1_i = M_{MAX} - CL2_i + M_{MIN}$" as mentioned above.

Figure 22:
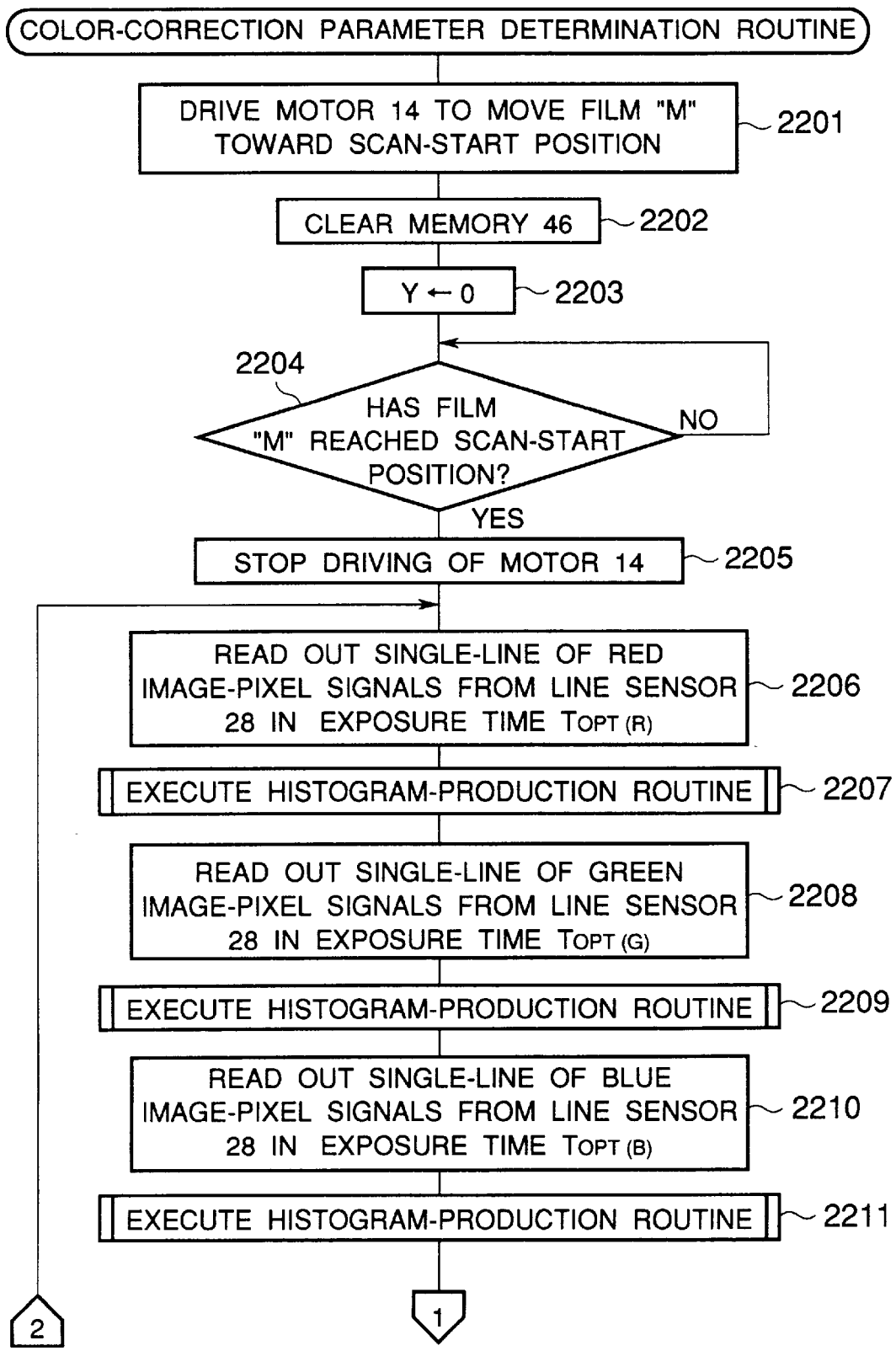
FIG. 22 is a part of a flowchart showing a color-correction parameter determination routine executed in the color-image reader according to the present invention.
Figure 23:
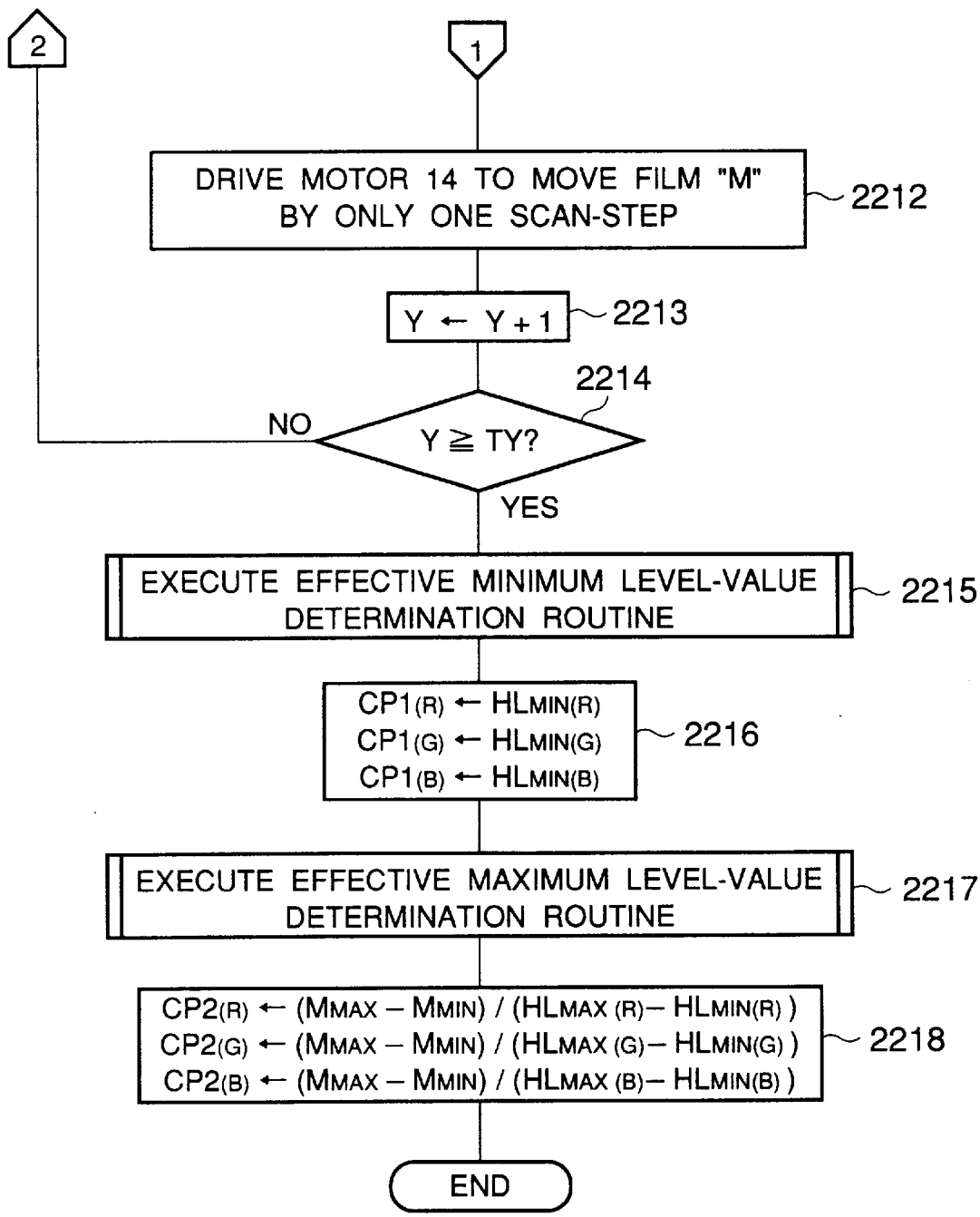
FIG. 23 is the remaining part of the flowchart showing the color-correction parameter determination routine executed in the color-image reader according to the present invention.
Figure 24:
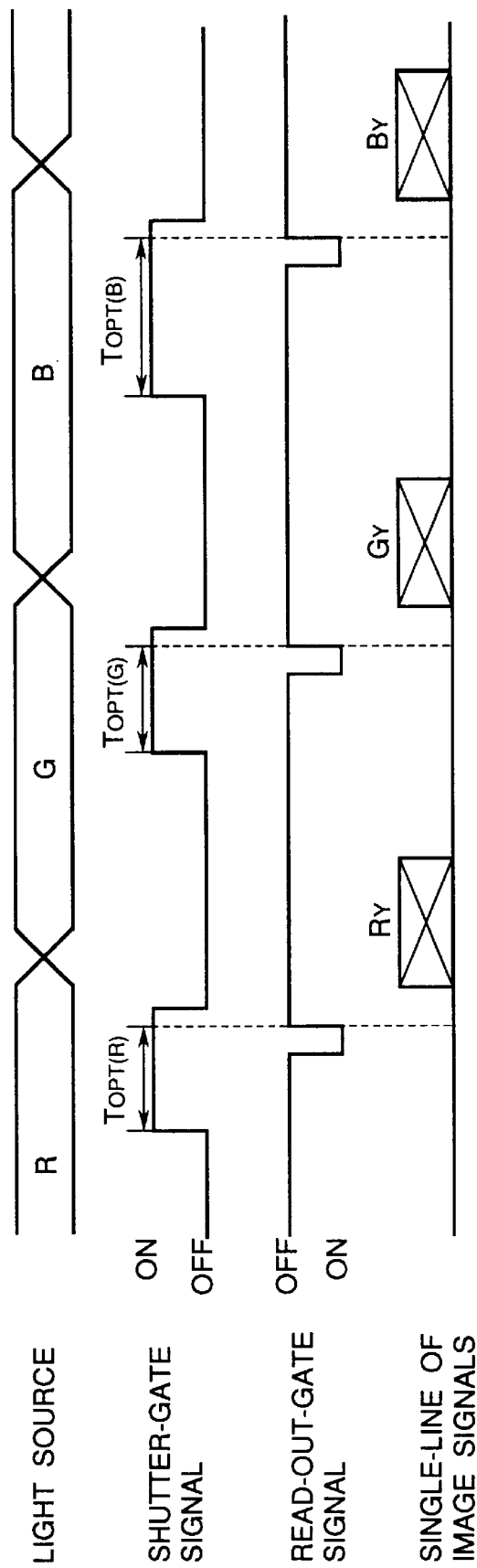
FIG. 24 is a timing chart for assisting in an explanation of the flowchart shown in FIGS. 22 and 23.

FIGS. 22 and 23 show a flowchart of a color-correction parameter determination routine for determining color-correction parameters, executed in the color-image reader according to the present invention. The execution is started by turning ON a second determination-start switch provided on the switch panel 52. FIG. 24 shows a timing chart for assisting in an explanation of the color-correction parameter determination routine of FIGS. 22 and 23.

At step 2201, the drive motor 14 is driven to move the carriage 10, and the transparency film M, toward a scan-start position. At step 2202, the memory 46 is cleared, and, at step 2203, a counter Y is reset. Note, the counter Y counts a number of scanning-steps or moving-steps of the transparency film M, during a pre-reading operation of a recorded image of the transparency film M.

At step 2204, it is monitored whether the transparency film M, held by the frame holder F, has reached a scan-start position. When it is confirmed that the transparency film M has reached the scan-start position, the control proceeds to step 2205, in which the driving of the drive motor 14 is stopped.

At step 2206, the plurality of red LED's 24R is powered ON, and the CCD line image sensor 28 is illuminated by the red-light rays, passing through the transparency film M, carrying red-image information. During the illumination of the CCD line image sensor 28 by the red-light rays, the CCD elements of the CCD line image sensor 28 are exposed to the red-light rays over the optimal exposure period $T_{OPT(R)}$, and then a single-line of red image-pixel signals $R_Y$ is read from the CCD line image sensor 28, as shown in the timing chart of FIG. 24. The read image-pixel signals $R_Y$ are successively converted into digital red image-pixel signals by the A/D converter 42, and the single-line of digital red image-pixel signals ($R_Y$) is then stored in the memory 46.

At step 2207, the histogram-production routine, as shown in FIG. 12, is executed to partially produce a red-histogram ($H_{C1(R)}$ in FIG. 25), corresponding to the histogram $H_{C1}$ of FIG. 17, on the basis of the single-line of digital red image-pixel signals ($R_Y$).

At step 2208, the plurality of green LED's 24G is powered ON, and the CCD line image sensor 28 is illuminated by the green-light rays, passing through the transparency film M, carrying green-image information. During the illumination of the CCD line image sensor 28 by the green-light rays, the CCD elements of the CCD line image sensor 28 are exposed to the green-light rays over the optimal exposure period $T_{OPT(G)}$, and then a single-line of green image-pixel signals $G_Y$ is read from the CCD line image sensor 28, as shown in the timing chart of FIG. 24. The read image-pixel signals $G_Y$ are successively converted into digital green image-pixel signals by the A/D converter 42, and the single-line of digital green image-pixel signals ($G_Y$) is then stored in the memory 46.

At step 2209, the histogram-production routine, as shown in FIG. 12, is executed to partially produce a green-histogram ($H_{C1(G)}$ in FIG. 25), corresponding to the histogram $H_{C1}$ of FIG. 17, on the basis of the single-line of digital red image-pixel signals ($G_Y$).

At step 2210, the plurality of blue LED's 24B is powered ON, and the CCD line image sensor 28 is illuminated by the blue-light rays, passing through the transparency film M, carrying blue-image information. During the illumination of the CCD line image sensor 28 by the blue-light rays, the CCD elements of the CCD line image sensor 28 are exposed to the blue-light rays over the optimal exposure period $T_{OPT(B)}$, and then a single-line of blue image-pixel signals $B_Y$ is read from the CCD line image sensor 28, as shown in the timing chart of FIG. 24. The read image-pixel signals $B_Y$ are successively converted into digital blue image-pixel signals by the A/D converter 42, and the single-line of digital blue image-pixel signals ($B_Y$) is then stored in the memory 46.

At step 2211, the histogram-production routine, as shown in FIG. 12, is further executed to partially produce a blue-histogram ($H_{C1(B)}$ in FIG. 25), corresponding to the histogram $H_{C1}$ of FIG. 17, on the basis of the single-line of digital blue image-pixel signals ($B_Y$).

Note, the regulation of the optimal exposure periods ($T_{OPT(R)}$, $T_{OPT(G)}$, $T_{OPT(B)}$) and the reading of the image-pixel signals ($R_Y$, $G_Y$, $B_Y$) from the CCD image sensor 28 are carried out in substantially the same manner as in the optimal exposure period determination routine of FIGS. 8 and 9.

At step 2212, the drive motor 14 is driven to advance the carriage 10, and therefore the transparency film M, by one scan-step. Then, at step 2213, the counter Y is incremented by one, and the control proceeds to step 2214, in which it is determined whether a count number of the counter Y has reached TY. Note, "TY" represents a total number of scan-steps which is necessary for completely reading the recorded image of the transparency film M in the pre-reading operation, and the total scan-steps TY may be previously set and stored in the ROM of the system control circuit 32.

If Y<TY, the control returns from step 2214 to step 2206, and the routine comprising steps 2206 to 2214 is repeatedly executed until the count number of the counter Y reaches TY. At step 2214, when the count number of the counter Y has reached TY, i.e. when the pre-reading operation is completed, the control proceeds to step 2215.

Note, at this stage, the production of the red-histogram ($H_{C1(R)}$) based on all of the single-lines of the digital red image-pixel signals $R_Y$, the production of the green-histogram ($H_{C1(G)}$) based on all of the single-lines of digital green image-pixel signals $G_Y$, and the production of the blue-histogram ($H_{C1(B)}$) based on all of the single-lines of digital blue image-pixel signals $B_Y$ have been completed, and these monochromatic histograms ($H_{C1(R)}$, $H_{C1(G)}$ and $H_{C1(B)}$) are stored in the memory 46, as conceptually shown in FIG. 25, in a similar fashion as previously described with respect to FIG. 13. Namely, "RK[L]" indicates a histogram-production counter defined in each of the addresses "0000" to "1023" of the memory 46, and is used to count a number of digital red image-pixel signals having the same level-value L; "GK[L]" indicates a histogram-production counter defined in each of the addresses "1024" to "2047", and is used to count a number of digital green image-pixel signals having the same level-value L; and "BK[L]" indicates a histogram-production counter defined in each of the addresses "2048" to "3071", and is used to count a number of digital blue image-pixel signals having the same level-value L.

Figure 26:
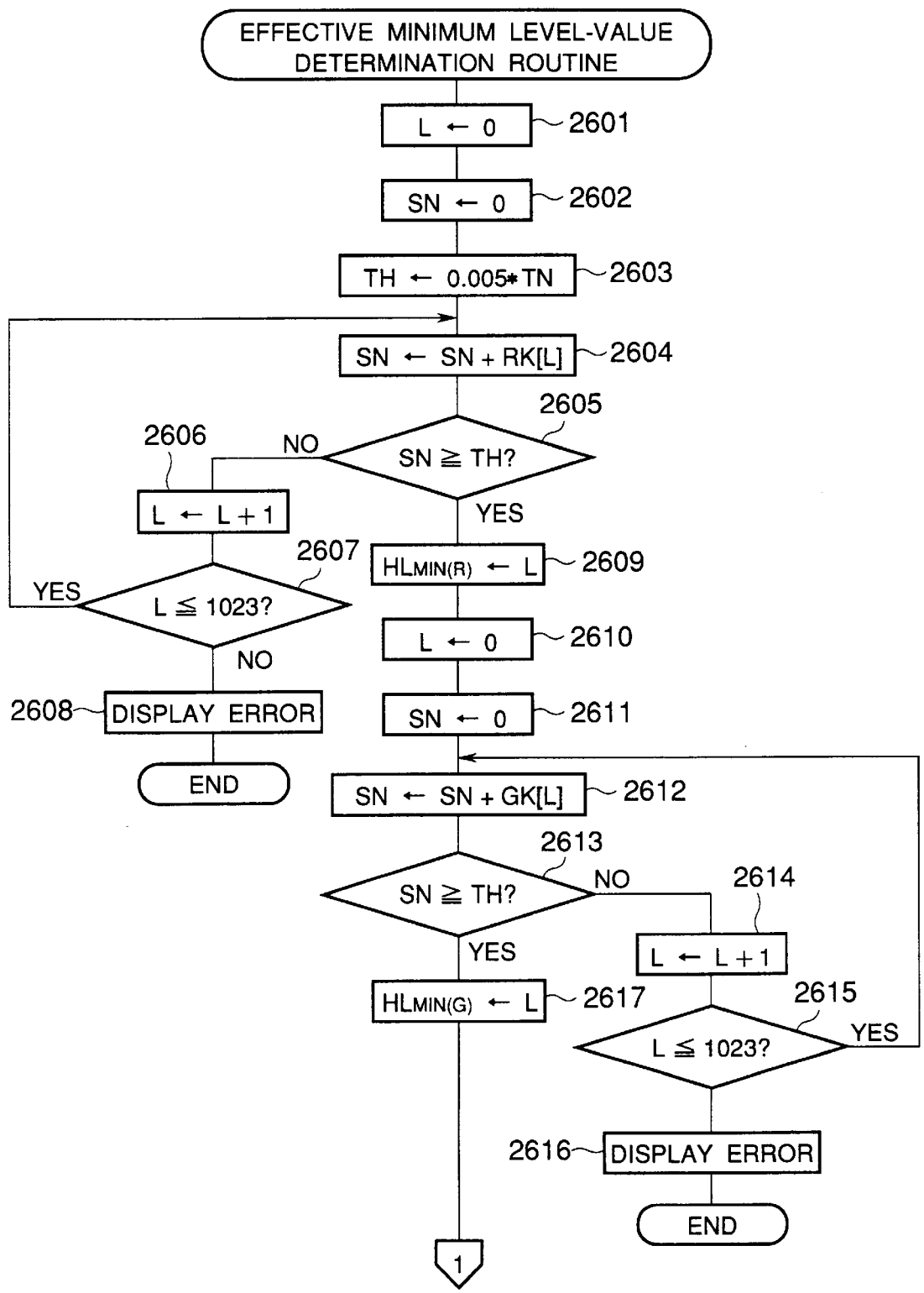
FIG. 26 is a part of a flowchart showing an effective minimum level-value determination routine executed as a sub-routine in the flowchart of FIGS. 22 and 23.
Figure 27:
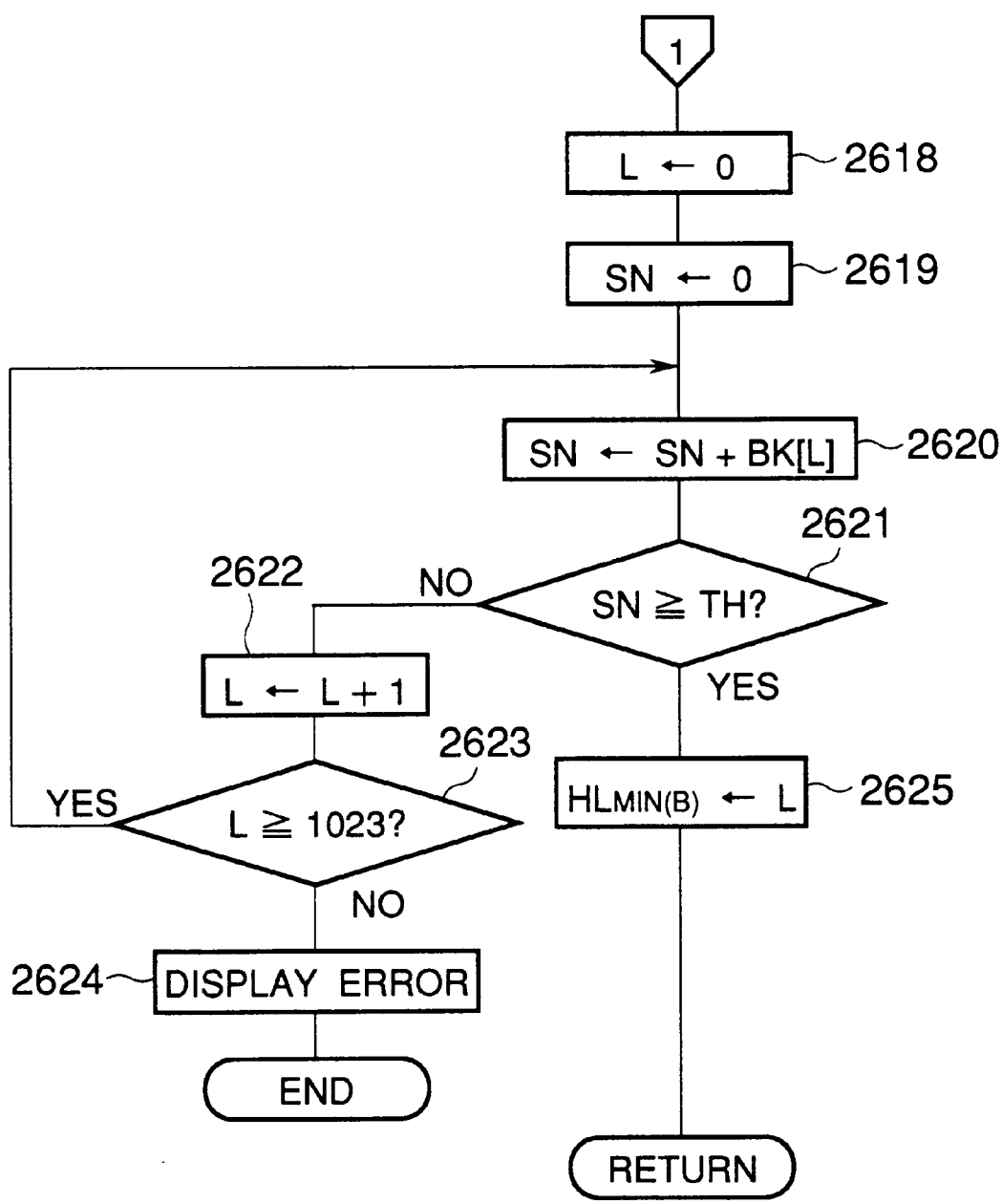
FIG. 27 is the remaining part of the flowchart showing the effective minimum level-value determination routine executed as the sub-routine in the flowchart of FIGS. 22 and 23.

At step 2215, an effective minimum level-value determination routine, as shown in FIGS. 26 and 27, is executed, whereby an effective minimum level-value is determined from each of the above-mentioned histograms. Namely, effective minimum level-values $HL_{MIN(R)}$, $HL_{MIN(G)}$ and $HL_{MIN(B)}$, each of which corresponds to $HL_{MIN}$ of FIG. 17, are obtained from the red-histogram $H_{C1(R)}$, green-histogram $H_{C1(G)}$ and blue-histogram $H_{C1(B)}$, respectively. Note, the effective minimum level-value determination routine is explained in detail hereinafter with reference to FIGS. 26 and 27.

At step 2216, each of the respective effective minimum level-values ($HL_{MIN(R)}$, $HL_{MIN(G)}$ and $HL_{MIN(B)}$) is stored as a first color-correction parameter ($CP1_{(R)}$, $CP1_{(G)}$, $CP1_{(B)}$) in the RAM of the system control circuit 32.

Figure 28:
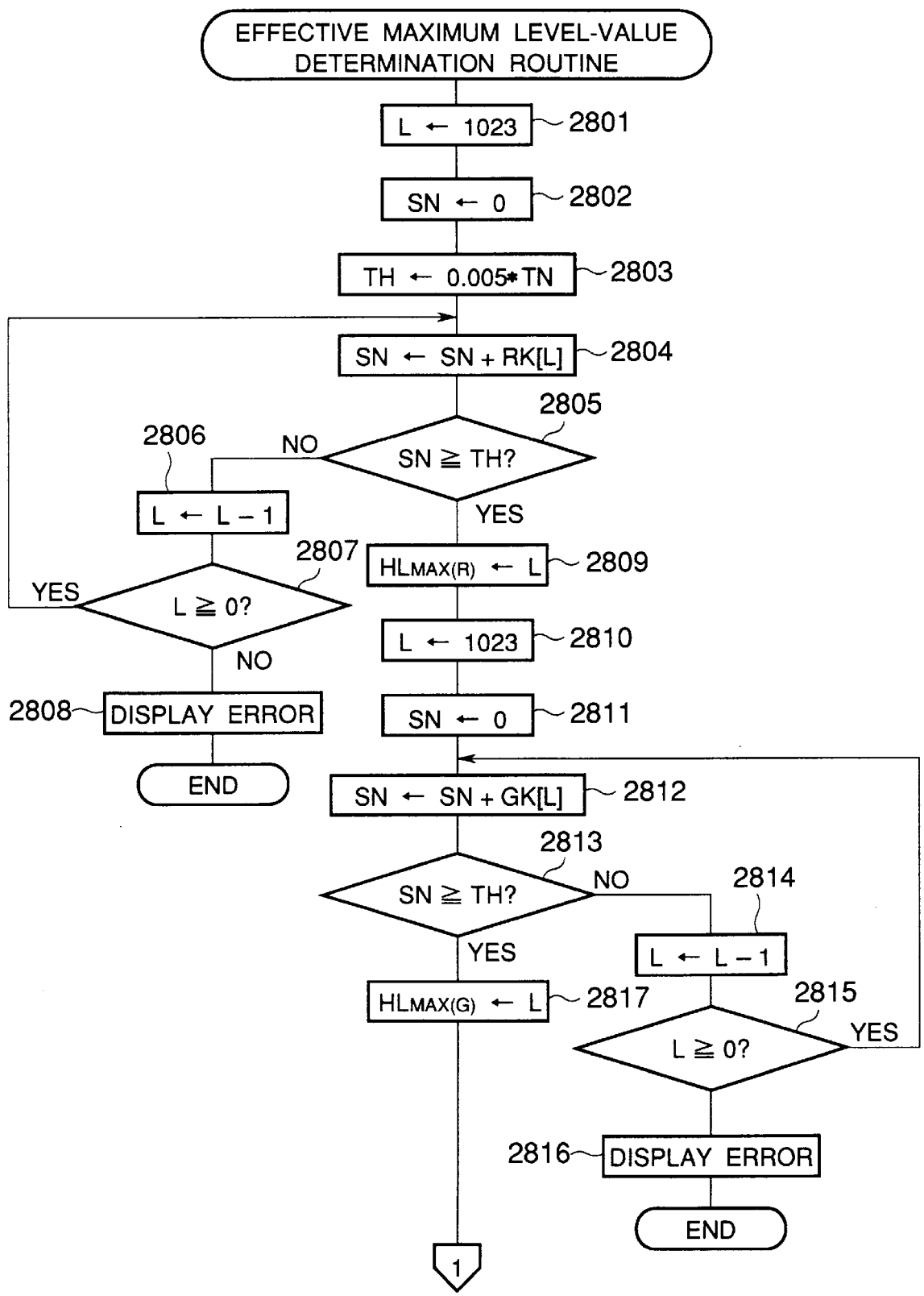
FIG. 28 is a part of a flowchart showing an effective maximum level-value determination routine executed as a sub-routine in the flowchart of FIGS. 22 and 23.
Figure 29:
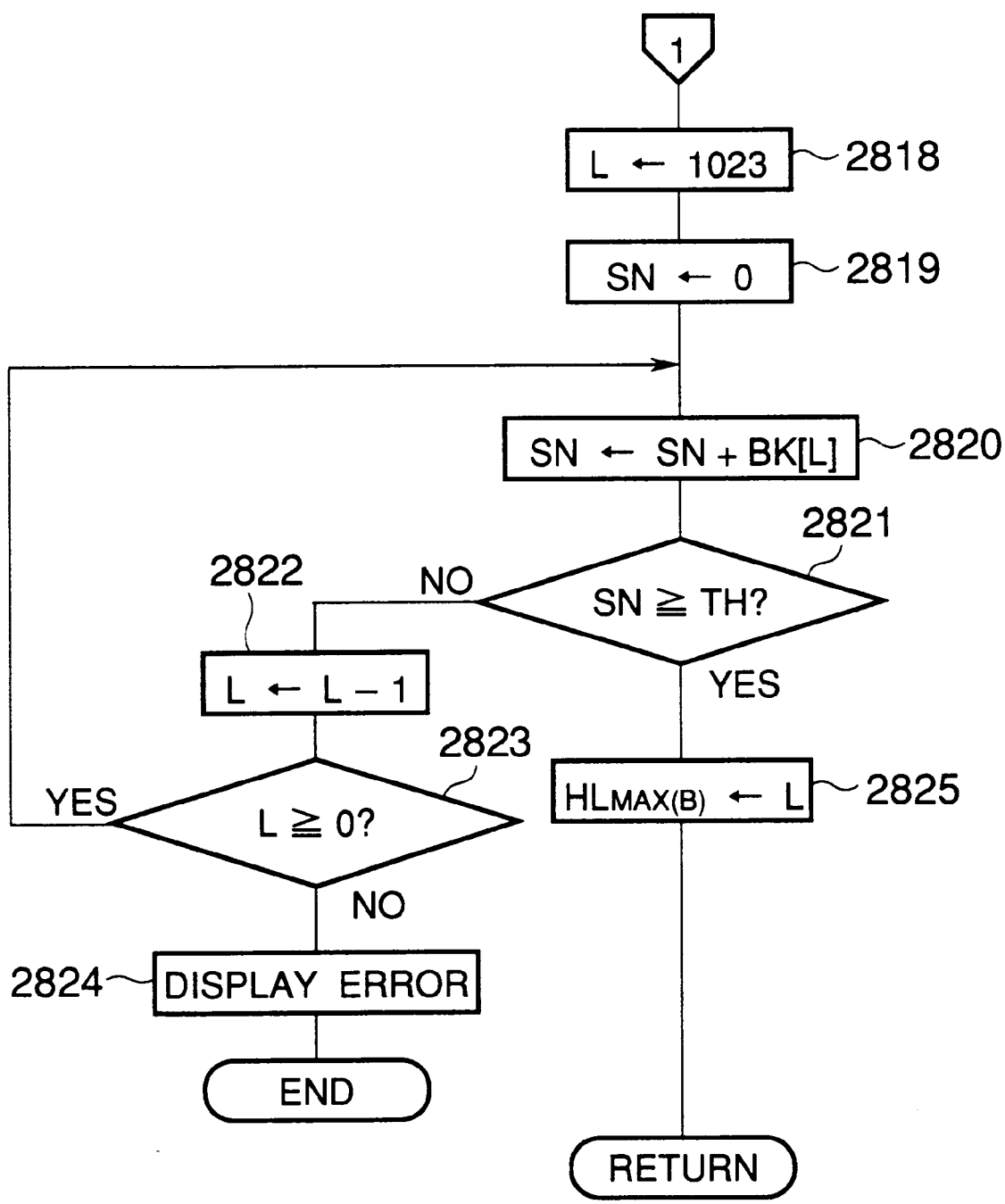
FIG. 29 is the remaining part of the flowchart showing the effective maximum level-value determination routine executed as the sub-routine in the flowchart of FIGS. 22 and 23.
Figure 30:
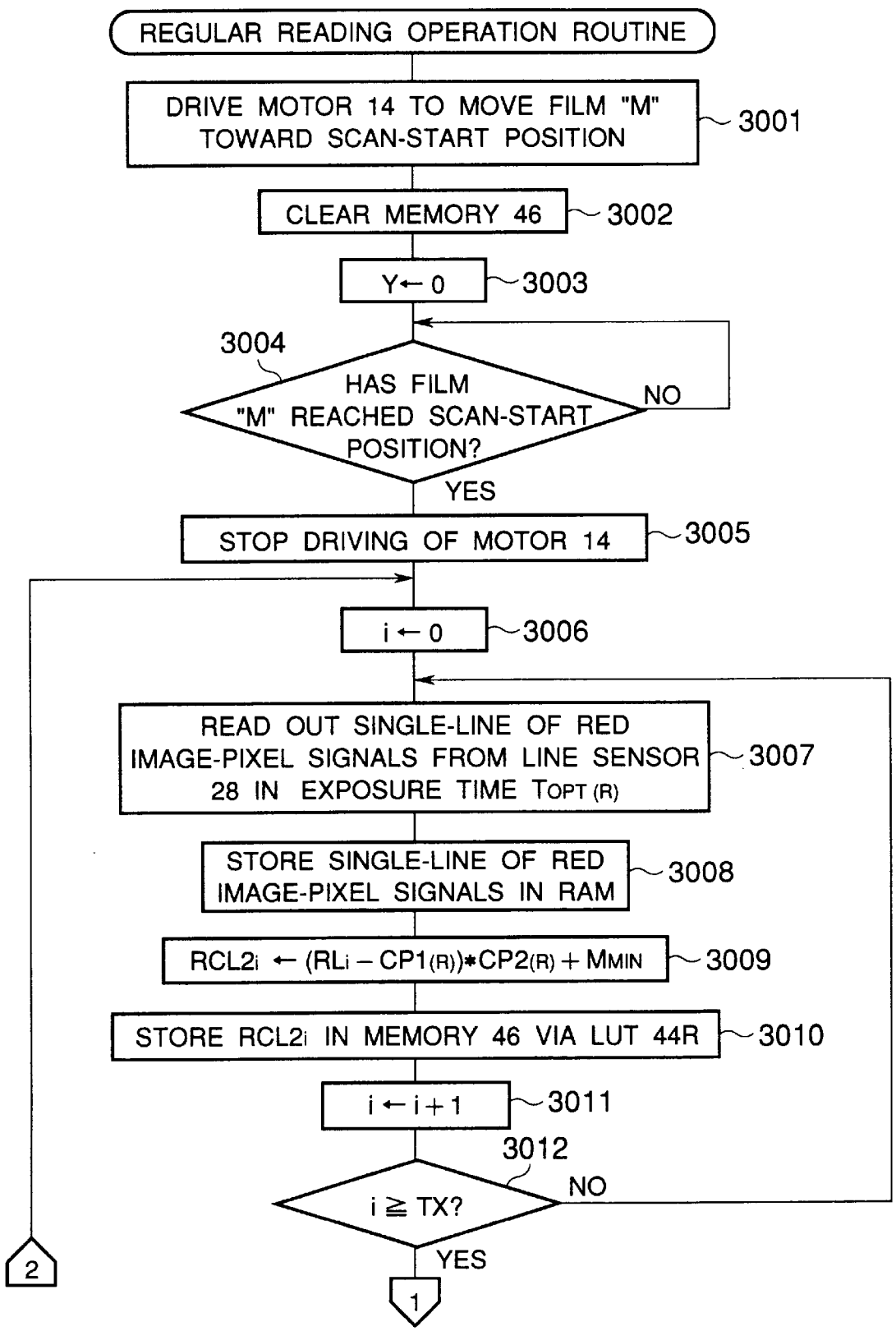
FIG. 30 is a part of a flowchart showing a regular reading operation routine executed in the color image reader according to the present invention.
Figure 31:
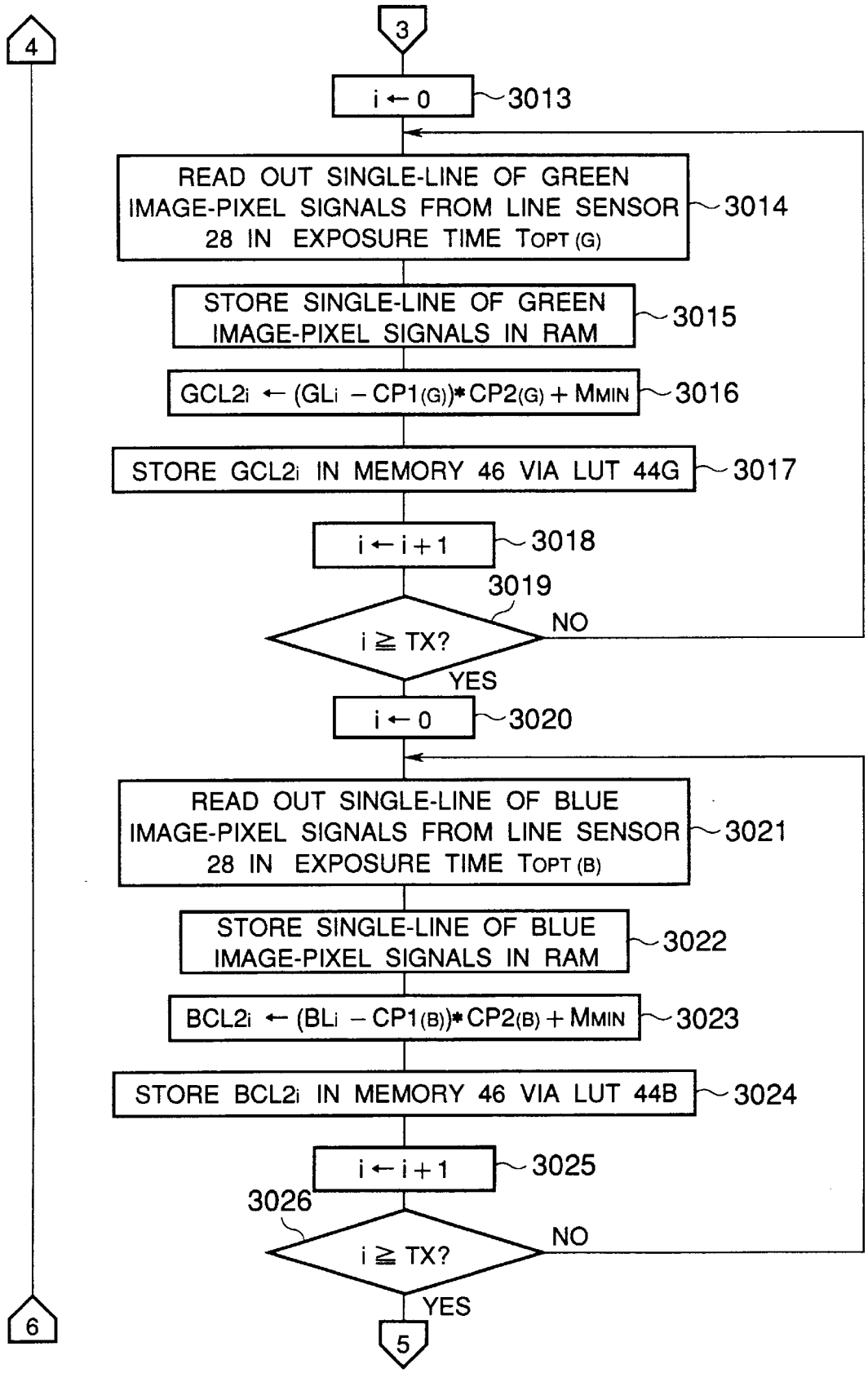
FIG. 31 is another part of the flowchart showing the regular reading operation routine executed in the color image reader according to the present invention.
Figure 32:
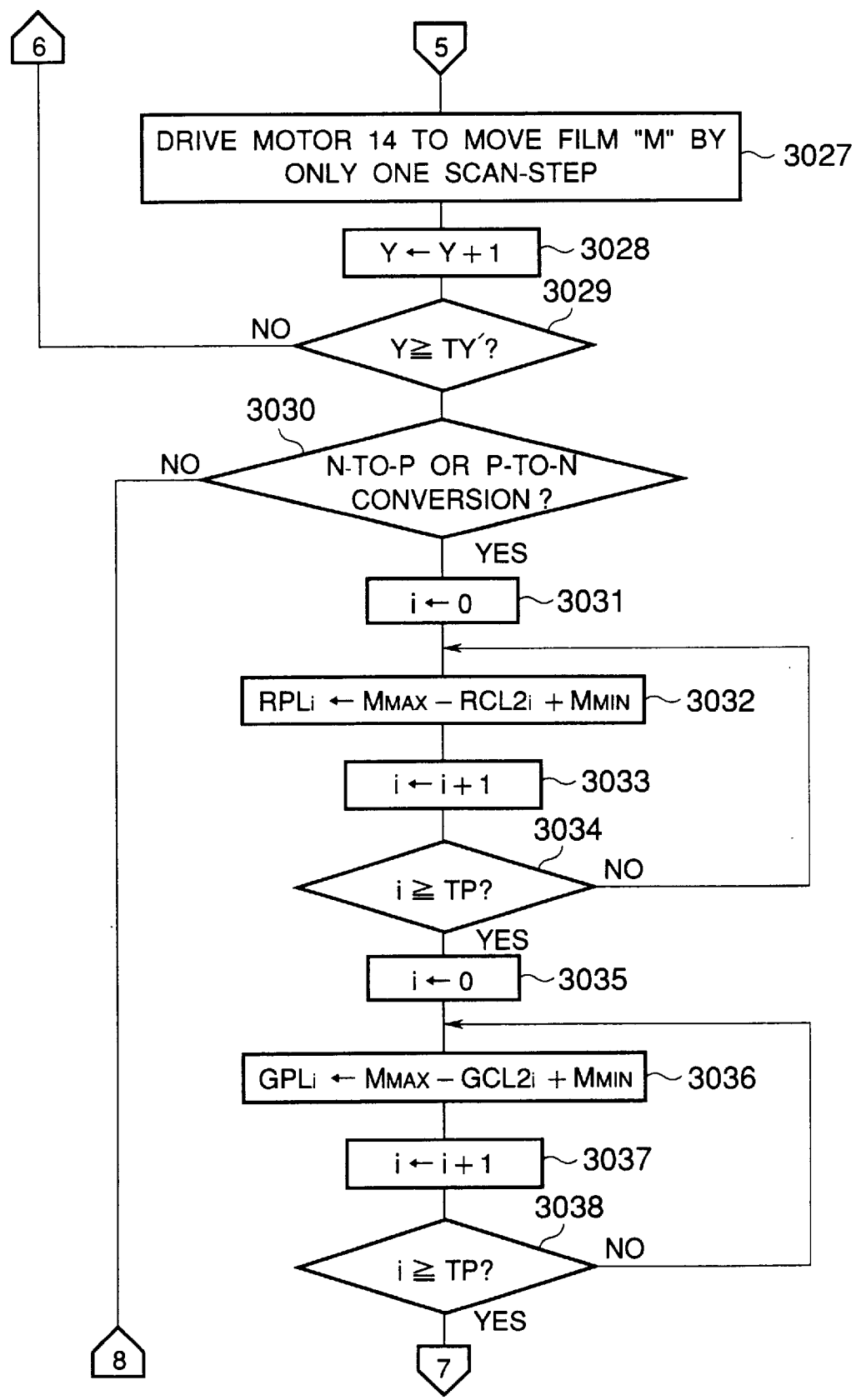
FIG. 32 is yet another part of the flowchart showing the regular reading operation routine executed in the color image reader according to the present invention.
Figure 33:
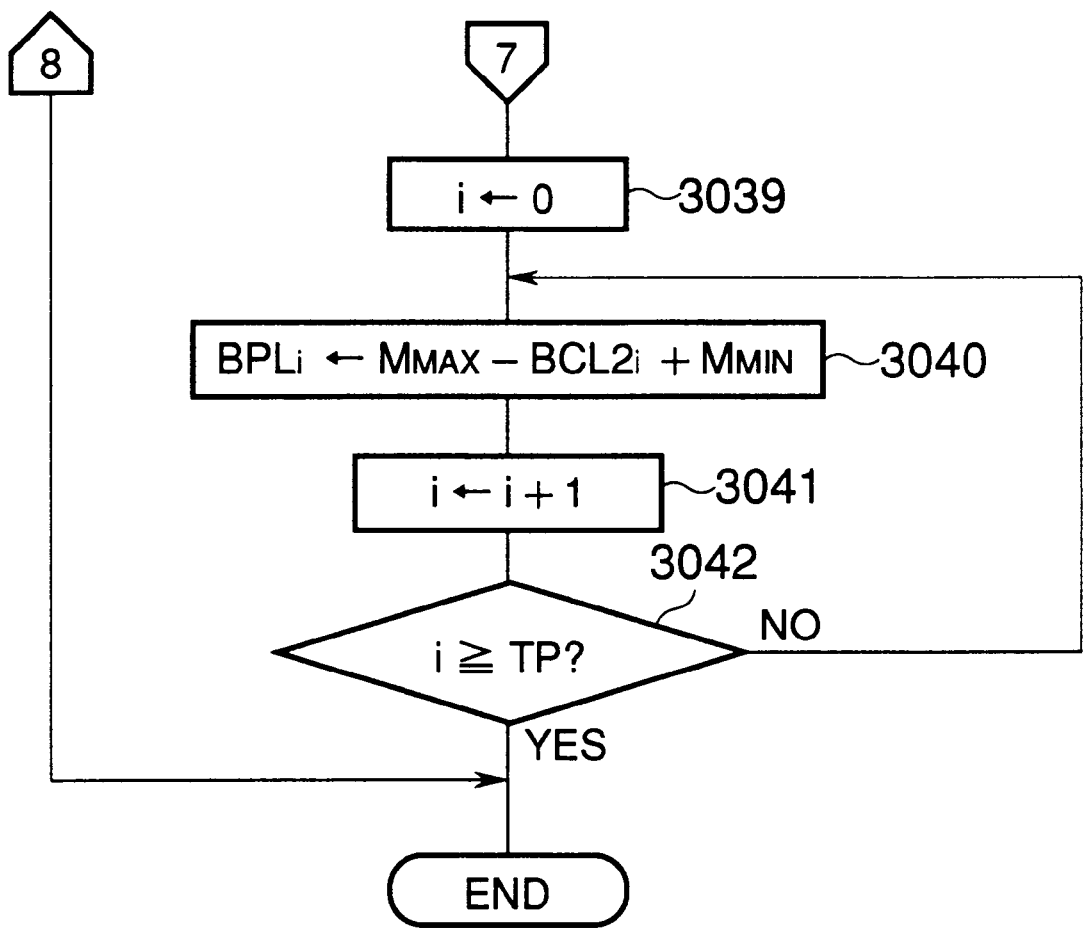
FIG. 33 is the remaining part of the flowchart showing the regular reading operation routine executed in the color image reader according to the present invention.

At step 2217, an effective maximum level-value determination routine, as shown in FIGS. 28 and 29, is executed, whereby an effective maximum level-value is determined from each of the above-mentioned histograms. Namely, effective maximum level-values $H_{MAX(R)}$, $HL_{(G)}$ and $HL_{MAX(B)}$, each of which corresponds to $HL_{MAX}$ of FIG. 17, are obtained from the red-histogram $H_{C1(R)}$, green-histogram $H_{C1(G)}$ and blue-histogram $H_{C1(B)}$, respectively. Note, the effective maximum level-value determination routine is explained in detail hereinafter with reference to FIGS. 28 and 29.

At step 2218, the following calculations are executed:

$$CP2_{(R)} \leftarrow (M_{MAX} - M_{MIN})/(HL_{MAX(R)} - HL_{MIN(R)})$$

$$CP2_{(G)} \leftarrow (M_{MAX} - M_{MIN})/(HL_{MAX(G)} - HL_{MIN(G)})$$

$$CP2_{(R)} \leftarrow (M_{MAX} - M_{MIN})/(HL_{MAX(B)} - HL_{MIN(B)})$$

Namely, each of the calculated results ($CP2_{(R)}$, $CP2_{(G)}$ and $CP2_B$)) is stored as a second color-correction parameter in the RAM of the system control circuit 32.

Note, as mentioned above, the respective minimum level-values $M_{MIN(R)}$, $M_{MIN(G)}$ and $M_{MIN(B)}$ and the respective maximum level-values $M_{MAX(R)}$, $M_{MAX(G)}$ and $M_{MAX(B)}$ may be suitably pre-determined in view of the critical minimum and maximum limits of the input ranges of the LUT's 44R, 44G and 44B of the image-signal processing circuit 44, and may be previously stored in the ROM of the system control circuit 32.

The first color-correction parameters $CP1_{(R)}$, $CP1_{(G)}$ and $CP1_{(B)}$ and the second color-correction parameters $CP2_{(R)}$, $CP2_{(G)}$, $CP2_{(B)}$ are used in a regular reading operation executed in the color-image reader.

With reference to FIGS. 26 to 27, the effective minimum level-value determination routine, executed in step 2215 of the flowchart of FIGS. 22 and 23, will now be explained below.

At step 2601, a level-value L, representing any one of [0000] to [1023], is set to the minimum level-value [0000], and, at step 2602, an image-pixel-signal-number parameter SN, representing a number of digital monochromatic (red, green, blue) image-pixel signals, is initialized as 0.

At step 2603, a threshold value TH is set by the following calculation:

$$TH \leftarrow 0.005*TN$$

Herein, TN indicates a total number of digital monochromatic image-pixel signals included in one frame. Namely, a number of digital monochromatic image-pixel signals, corresponding to 0.5% of the total number TN of the digital monochromatic image-pixel signals in one frame, is set as the threshold value TH.

At step 2604, the following calculation is executed:

$$SN \leftarrow SN + RK[L=0000]$$

Then, at step 2605, it is determined whether the image-pixel-signal-number parameter SN is equal to or more than the threshold value TH.

If SN<TH, the control proceeds from step 2605 to step 2606, in which the level-value L is incremented by one. Then, at step 2607, it is determined whether the level value L is smaller than or equal to the maximum level-value [1023]. At this stage, since L=0001, the control returns from step 2607 to step 2604. Namely, the routine comprising steps 2604 to 2607 is repeatedly executed until the image-pixel-signal-number parameter SN reaches or exceeds the threshold value TH.

At step 2605, when SN≧TH, the control proceeds from step 2605 to step 2609, in which the level-value L, obtained at this stage, is stored, as the effective minimum level-value $HL_{MIN(R)}$ of the red-histogram $H_{C1(R)}$, in the RAM of the system control circuit 32.

On the other hand, at step 2607, if it is determined that the level-value L is more than the maximum level-value [1023] during the execution of the routine comprising steps 2604 to 2607, without the image-pixel-signal-number parameter SN reaching or exceeding the threshold value TH, the red-histogram $H_{C1(R)}$ has been abnormally produced. In this case, the control proceeds from step 2607 to step 2608, in which an error message, announcing that the pre-reading operation for determining the color-correction parameters should be repeated, is displayed on, for example, the LCD panel (not shown) provided on the color-image reader.

At step 2610, the level-value L is again set to be the minimum level-value [0000], and, at step 2611, the image-pixel-signal-number parameter SN is reset to 0.

At step 2612, the following calculation is executed:

$$SN \leftarrow SN + GK[L=0000]$$

Then, at step 2613, it is determined whether the image-pixel-signal-number parameter SN is equal to or more than the threshold value TH.

If SN<TH, the control proceeds from step 2613 to step 2614, in which the level-value L is incremented by one. Then, at step 2615, it is determined whether the level value L is equal to or less than the maximum level-value [1023]. At this stage, since L=0001, the control returns from step 2615 to step 2612. Namely, the routine comprising steps 2612 to 2615 is repeatedly executed until the image-pixel-signal-number parameter SN reaches or exceeds the threshold value TH.

At step 2613, if SN≧TH, the control proceeds from step 2613 to step 2617, in which the level-value L, obtained at this stage, is stored, as the effective minimum level-value $HL_{MIN(G)}$ of the green-histogram $H_{C1(G)}$, in the RAM of the system control circuit 32.

Similar to the above mentioned case, at step 2615, if it is determined that the level-value L is more than the maximum level-value [1023] during the execution of the routine comprising steps 2612 to 2615, without the image-pixel-signal-number parameter SN reaching or exceeding the threshold value TH, the green-histogram $H_{C1(G)}$ has been abnormally produced. Accordingly, the control proceeds from step 2615 to step 2616, in which the error message, announcing that the pre-reading operation for determining the color-correction parameters should be repeated, is displayed on the LCD panel of the color-image reader.

At step 2618, the level-value L is again set to the minimum level-value [0000], and, at step 2619, the image-pixel-signal-number parameter SN is again reset to 0.

At step 2620, the following calculation is executed:

$$SN \leftarrow SN+BK[L=0000]$$

Then, at step 2621, it is determined whether the image-pixel-signal-number parameter SN is equal to or more than the threshold value TH.

If SN<TH, the control proceeds from step 2621 to step 2622, in which the level-value L is incremented by one. Then, at step 2623, it is determined whether the level value L is equal to or less than the maximum level-value [1023]. At this stage, since L=0001, the control returns from step 2623 to step 2620. Namely, the routine comprising steps 2620 to 2623 is repeatedly executed until the image-pixel-signal-number parameter SN reaches or exceeds the threshold value TH.

At step 2621, if SN≧TH, the control proceeds from step 2621 to step 2625, in which the level-value L, obtained at this stage, is stored, as the effective minimum level-value $HL_{MIN(B)}$ of the blue-histogram $H_{C1(B)}$, in the RAM of the system control circuit 32.

However, at step 2623, if it is determined that the level-value L is more than the maximum level-value [1023] during the execution of the routine comprising steps 2620 to 2623, without the image-pixel-signal-number parameter SN reaching or exceeding the threshold value TH, the blue-histogram $H_{C1(B)}$ has been abnormally produced. Accordingly, the control proceeds from step 2623 to step 2624, in which the error message, announcing that the pre-reading operation for determining the color-correction parameters should be repeated, is displayed on the LCD panel of the color-image reader.

After the determination of the effective minimum level-values $HL_{MIN(R)}$, $HL_{MIN(G)}$ and $HL_{MIN(B)}$ is completed, the control returns to step 2216 of the flowchart of FIGS. 22 and 23.

With reference to FIGS. 28 to 29, the effective maximum level-value determination routine, executed in step 2217 of the flowchart of FIGS. 22 and 23, will now be explained below.

At step 2801, a level-value L, representing any one of level-values [0000] to [1023], is set to the maximum level-value [1023], and, at step 2802, an image-pixel-signal-number parameter SN, representing a number of digital monochromatic (red, green, blue) image-pixel signals, is initialized as 0.

At step 2803, a threshold value TH is set by the following calculation:

$$TH \leftarrow 0.005*TN$$

Herein, TN indicates a total number of digital monochromatic image-pixel signals included in one frame. Namely, a number of digital monochromatic image-pixel signals, corresponding to 0.5% of the total number TN of the digital monochromatic image-pixel signals in one frame, is set as the threshold value TH.

At step 2804, the following calculation is executed:

$$SN \leftarrow SN+RK[L=1023]$$

Then, at step 2805, it is determined whether the image-pixel-signal-number parameter SN is equal to or more than the threshold value TH.

If SN<TH, the control proceeds from step 2805 to step 2806, in which the level-value L is decremented by one. Then, at step 2807, it is determined whether the level value L is smaller than or equal to the minimum level-value [0000]. At this stage, since L=1022, the control returns from step 2807 to step 2804. Namely, the routine comprising steps 2804 to 2807 is repeatedly executed until the image-pixel-signal-number parameter SN reaches or exceeds the threshold value TH.

At step 2805, when SN≧TH, the control proceeds from step 2805 to step 2809, in which the level-value L, obtained at this stage, is stored, as the effective maximum level-value $HL_{MAX(R)}$ of the red-histogram $H_{C1(R)}$, in the RAM of the system control circuit 32.

On the other hand, at step 2807, if it is determined that the level-value L is less than the minimum level-value [0000] during the execution of the routine comprising steps 2804 to 2807, without the image-pixel-signal-number parameter SN reaching or exceeding the threshold value TH, the red-histogram $H_{C1(R)}$ has been abnormally produced. In this case, the control proceeds from step 2807 to step 2808, in which an error message, announcing that the pre-reading operation for determining the color-correction parameters should be repeated, is displayed on, for example, the LCD panel (not shown) provided on the color-image reader.

At step 2810, the level-value L is again set to be the maximum level-value [1023], and, at step 2811, the image-pixel-signal-number parameter SN is reset to 0.

At step 2812, the following calculation is executed:

$$SN \leftarrow SN+GK[L=1023]$$

Then, at step 2813, it is determined whether the image-pixel-signal-number parameter SN is equal to or more than the threshold value TH.

If SN<TH, the control proceeds from step 2813 to step 2814, in which the level-value L is decremented by one. Then, at step 2815, it is determined whether the level value L is equal to or more than the minimum level-value [0000]. At this stage, since L=1022, the control returns from step 2815 to step 2812. Namely, the routine comprising steps 2812 to 2815 is repeatedly executed until the image-pixel-signal-number parameter SN reaches or exceeds the threshold value TH.

At step 2813, if SN≧TH, the control proceeds from step 2813 to step 2817, in which the level-value L, obtained at this stage, is stored, as the effective minimum level-value $HL_{MAX(G)}$ of the green-histogram $H_{C1(G)}$, in the RAM of the system control circuit 32.

Similar to the above mentioned case, at step 2815, if it is determined that the level-value L is less than the minimum level-value [0000] during the execution of the routine comprising steps 2812 to 2815, without the image-pixel-signal-number parameter SN reaching or exceeding the threshold value TH, the green-histogram $H_{C1(G)}$ has been abnormally produced. Accordingly, the control proceeds from step 2815 to step 2816, in which the error message, announcing that the pre-reading operation for determining the color-correction parameters should be repeated, is displayed on the LCD panel of the color-image reader.

At step 2818, the level-value L is again set to the maximum level-value [1023], and, at step 2819, the image-pixel-signal-number parameter SN is again reset to 0.

At step 2820, the following calculation is executed:

$$SN \leftarrow SN + BK[L=1023]$$

Then, at step 2821, it is determined whether the image-pixel-signal-number parameter SN is equal to or more than the threshold value TH.

If SN<TH, the control proceeds from step 2821 to step 2822, in which the level-value L is decremented by one. Then, at step 2823, it is determined whether the level value L is equal to or more than the minimum level-value [0000]. At this stage, since L=1022, the control returns from step 2823 to step 2820. Namely, the routine comprising steps 2820 to 2823 is repeatedly executed until the image-pixel-signal-number parameter SN reaches or exceeds the threshold value TH.

At step 2821, if SN≧TH, the control proceeds from step 2821 to step 2825, in which the level-value L, obtained at this stage, is stored, as the effective minimum level-value $HL_{MAX(B)}$ of the blue-histogram $H_{C1(B)}$, in the RAM of the system control circuit 32.

However, at step 2823, if it is determined that the level-value L is less than the minimum level-value [0000] during the execution of the routine comprising steps 2820 to 2823, without the image-pixel-signal-number parameter SN reaching or exceeding the threshold value TH, the blue-histogram $H_{C1(B)}$ has been abnormally produced. Accordingly, the control proceeds from step 2823 to step 2824, in which the error message, announcing that the pre-reading operation for determining the color-correction parameters should be repeated, is displayed on the LCD panel of the color-image reader.

After the determination of the effective maximum level-values $HL_{MAX(R)}$, $HL_{MAX(G)}$ and $HL_{MAX(B)}$ is completed, the control returns to step 2218 of the flowchart of FIGS. 22 and 23.

FIGS. 30, 31, 32 and 33 show a flowchart of a regular reading operation routine, executed in the color-image reader according to the present invention. The execution is started by turning ON a regular-reading-operation-start switch provided on the switch panel 52. FIG. 34 shows a timing chart for assisting in an explanation of the regular reading operation routine of FIGS. 30 to 33.

At step 3001, the drive motor 14 is driven to move the carriage 10, and the transparency film M, toward a scan-start position. At step 3002, the memory 46 is cleared, and, at step 3003, a counter Y is reset. Note, the counter Y counts a number of scanning-steps or moving-steps of the transparency film M, during a regular reading operation of a recorded image of the transparency film M.

At step 3004, it is monitored whether the transparency film M, held by the frame holder F, has reached a scan-start position. When it is confirmed that the transparency film M has reached the scan-start position, the control proceeds to step 3005, in which the driving of the drive motor 14 is stopped.

At step 3006, a counter i is reset. Note, the counter i counts a number of processed image-pixel signals. Then, at step 3007, the plurality of red LED's 24R is powered ON, and the CCD line image sensor 28 is illuminated by the red-light rays, passing through the transparency film M, carrying red-image information. During the illumination of the CCD line image sensor 28 by the red-light rays, the CCD elements of the CCD line image sensor 28 are exposed to the red-light rays over the optimal exposure period $T_{OPT(R)}$, and then a single-line of red image-pixel signals $R_Y$ is read from the CCD line image sensor 28, as shown in the timing chart of FIG. 34. Note, a level-value of each of the red image-pixel signals $R_Y$, is indicated by reference $RL_i$ in FIG. 34. The read red image-pixel signals $R_Y$ are successively converted into digital red image-pixel signals by the A/D converter 42.

At step 3008, the single-line of digital red image-pixel signals ($R_Y$), outputted from the A/D converter 42, is temporarily stored in the RAM of the system control circuit 32. Then, at step 3009, the following calculation is executed:

$$RCL2_i \leftarrow (RL_i - CP1_{(R)}) * CP2_{(R)} + M_{MIN}$$

Namely, each red image-pixel signal ($RL_i$) is subjected to the color balance process.

At step 3010, each red image-pixel signal ($RCL2_i$), subjected to the color balance process, is stored in the memory 46 via the LUT 44R of the image-signal processing circuit 44. Namely, each red image-pixel signal ($RCL2_i$) is stored in the memory 46, after being further subjected to the shading-correction, gamma correction, white balance correction and so on.

At step 3011, the counter i is incremented by one, and the control proceeds to step 3012, in which it is determined whether a count number of the counter i has reached TX. Note, as already mentioned above, "TX" represents the total number of the digital red image-pixel signals ($RL_i$) included in one single-line. If i<TX, the control returns from step 3012 to step 3007, and the routine comprising steps 3007 to 3012 is repeatedly executed until the count number of the counter i reaches TX.

At step 3012, when the count number of the counter i has reached TX, i.e. when all of the digital red image-pixel signals ($R_Y$) included in one single-line have been subjected to the color balance process, the control proceeds from step 3012 to step 3013, in which the counter i is reset.

At step 3014, the plurality of green LED's 24G is powered ON, and the CCD line image sensor 28 is illuminated by the green-light rays, passing through the transparency film M, carrying green-image information. During the illumination of the CCD line image sensor 28 by the green-light rays, the CCD elements of the CCD line image sensor 28 are exposed to the green-light rays over the optimal exposure period $T_{OPT(G)}$, and then a single-line of green image-pixel signals $G_Y$ is read from the CCD line image sensor 28, as shown in the timing chart of FIG. 34. Note, a level-value of each of the green image-pixel signals $G_Y$, is indicated by reference $GL_1$ in FIG. 34. The read green image-pixel signals $G_Y$ are successively converted into digital green image-pixel signals by the A/D converter 42.

At step 3015, the single-line of digital green image-pixel signals ($G_Y$), outputted from the A/D converter 42, is temporarily stored in the RAM of the system control circuit 32. Then, at step 3016, the following calculation is executed:

$$GCL2_i \leftarrow (GL_i - CP1_{(G)}) * CP2_{(G)} + M_{MIN}$$

Namely, each green image-pixel signal ($GL_i$) is subjected to the color balance process.

At step 3017, each green image-pixel signal ($GCL2_i$), subjected to the color balance process, is stored in the memory 46 via the LUT 44G of the image-signal processing circuit 44. Namely, each green image-pixel signal ($GCL2_i$) is stored in the memory 46, after being further subjected to the shading-correction, gamma correction, white balance correction and so on.

At step 3018, the counter i is incremented by one, and the control proceeds to step 3019, in which it is determined whether a count number of the counter i has reached TX. If i<TX, the control returns from step 3019 to step 3014, and the routine comprising steps 3014 to 3019 is repeatedly executed until the count number of the counter i reaches TX.

At step 3019, when the count number of the counter i has reached TX, i.e. when all of the digital green image-pixel signals ($G_Y$) included in one single-line have been subjected to the color balance process, the control proceeds from step 3019 to step 3020, in which the counter i is reset.

At step 3021, the plurality of blue LED's 24B is powered ON, and the CCD line image sensor 28 is illuminated by the blue-light rays, passing through the transparency film M, carrying blue-image information. During the illumination of the CCD line image sensor 28 by the blue-light rays, the CCD elements of the CCD line image sensor 28 are exposed to the blue-light rays over the optimal exposure period $T_{OPT(B)}$, and then a single-line of blue image-pixel signals $B_Y$ is read from the CCD line image sensor 28, as shown in the timing chart of FIG. 34. Note, a level-value of each of the blue image-pixel signals $B_Y$, is indicated by reference $BL_i$ in FIG. 34. The read blue image-pixel signals $B_Y$ are successively converted into digital blue image-pixel signals by the A/D converter 42.

At step 3022, the single-line of digital blue image-pixel signals ($B_Y$), outputted from the A/D converter 42, is temporarily stored in the RAM of the system control circuit 32. Then, at step 3023, the following calculation is executed:

$$BCL2_i \leftarrow (BL_i - CP1_{(B)}) * CP2_{(B)} + M_{MIN}$$

Namely, each blue image-pixel signal ($BL_i$) is subjected to the color balance process.

At step 3024, each blue image-pixel signal ($BCL2_i$), subjected to the color balance process, is stored in the memory 46 via the LUT 44B of the image-signal processing circuit 44. Namely, each blue image-pixel signal ($BCL2_i$) is stored in the memory 46, after being further subjected to the shading-correction, gamma correction, white balance correction and so on.

At step 3025, the counter i is incremented by one, and the control proceeds to step 3026, in which it is determined whether a count number of the counter i has reached TX. If i<TX, the control returns from step 3026 to step 3021, and the routine comprising steps 3021 to 3026 is repeatedly executed until the count number of the counter i reaches TX.

At step 3026, when the count number of the counter i has reached TX, i.e. when all of the digital blue image-pixel signals ($B_Y$) included in one single-line have been subjected to the color balance process, the control proceeds from step 3026 to step 3027, in which the drive motor 14 is driven to advance the carriage 10, and therefore the transparency film M, by one scan-step.

Then, at step 3028, the counter Y is incremented by one, and the control proceeds to step 3029, in which it is determined whether a count number of the counter Y has reached TY'. Note, "TY'" represents a total number of scan-steps which is necessary for completely reading the recorded image of the transparency film M in the regular reading operation, and the total scan-steps TY' may be previously set and stored in the ROM of the system control circuit 32. Also, note, the total scan-steps TY' is larger than the total scan-steps TY used in the optimal exposure determination routine of FIGS. 8 and 9 and the color-correction parameter determination routine of FIGS. 22 and 23.

If Y<TY', the control returns from step 3029 to step 3006, and the routine comprising steps 3006 to 3029 is repeatedly executed until the count number of the counter Y reaches TY'. At step 3029, when the count number of the counter Y has reached TY', i.e. when the regular reading operation is completed, the control proceeds from step 3029 to step 3030.

Note, at this stage, a storage of the three frames of digital monochromatic image-pixel signals ($RCL2_i$, $GCL2_i$ and $BCL2_i$) in the memory 46 is completed. Also, note, the regulation of the optimal exposure periods ($T_{OPT(R)}$, $T_{OPT(G)}$, $T_{OPT(B)}$, and the reading of the image-pixel signals ($R_Y$, $G_Y$, $B_Y$) from the CCD image sensor 28 are carried out in substantially the same manner as in the optimal exposure period determination routine of FIGS. 8 and 9.

At step 3030, it is determined whether either of a negative-to-positive conversion or a positive-to-negative conversion should be executed. Note, a command signal for the negative-to-positive conversion or the positive-to-negative conversion may be inputted to the system control circuit 32 by operating a selective command switch provided on the switch panel 52. If there is no inputting of the command signal for either the negative-to-positive conversion or the positive-to-negative conversion, the regular reading operation immediately ends.

On the other hand, if there is an inputting of the command signal for, for example, the negative-to-positive conversion, the control proceeds from step 3030 to step 3031, in which the counter i is reset.

At step 3032, the following calculation is executed:

$$RPL_i \leftarrow M_{MAX} - RCL2_i + M_{MIN}$$

Namely, the digital image pixel signal $RCL2_i$ is retrieved from the memory 46 to the RAM of the system control circuit 32, and is subjected to the negative-to-positive conversion. Then, the converted digital image pixel signal $RPL_i$ is stored in the memory 46.

At step 3033, the counter i is incremented by one, and the control proceeds to step 3034, in which it is determined whether a count number of the counter i has reached TP. Note, "TP" represents the total number of the digital red image-pixel signals ($RCL2_i$) included in one frame. If i<TP, the control returns from step 3034 to step 3032, and the routine comprising steps 3032 to 3034 is repeatedly executed until the count number of the counter i reaches TP.

At step 3034, when the count number of the counter i has reached TP, i.e. when the negative-to-positive conversion of the digital red image-pixel signals ($RCL2_i$) is completed, the control proceeds from step 3034 to step 3035, in which the counter i is reset.

At step 3036, the following calculation is executed:

$$GPL_i \leftarrow M_{MAX} - GCL2i + M_{MIN}$$

Namely, the digital image pixel signal $GCL2_i$ is retrieved from the memory 46 to the RAM of the system control circuit 32, and is subjected to the negative-to-positive conversion. Then, the converted digital image pixel signal $GPL_i$ is stored in the memory 46.

At step 3037, the counter i is incremented by one, and the control proceeds to step 3038, in which it is determined whether a count number of the counter i has reached TP. If i<TP, the control returns from step 3038 to step 3036, and the routine comprising steps 3036 to 3038 is repeatedly executed until the count number of the counter i reaches TP.

At step 3038, when the count number of the counter i has reached TP, i.e. when the negative-to-positive conversion of the digital green image-pixel signals ($GCL2_i$) is completed, the control proceeds from step 3038 to step 3039, in which the counter i is reset.

At step 3040, the following calculation is executed:

$$BPL_i \leftarrow M_{MAX} - BCL2_i + M_{MIN}$$

Namely, the digital image pixel signal $BCL2_i$ is retrieved from the memory 46 to the RAM of the system control circuit 32, and is subjected to the negative-to-positive conversion. Then, the converted digital image pixel signal $BPL_i$ is stored in the memory 46.

At step 3041, the counter i is incremented by one, and the control proceeds to step 3042, in which it is determined whether a count number of the counter i has reached TP. If i<TP, the control returns from step 3042 to step 3040, and the routine comprising steps 3040 to 3042 is repeatedly executed until the count number of the counter i reaches TP.

At step 3042, when the count number of the counter i has reached TP, i.e. when the negative-to-positive conversion of the digital blue image-pixel signals ($BCL2_i$) is completed, this routine ends.

The three frames of digital monochromatic negative image-pixel signals ($RCL2_i$, $GCL2_i$ and $BCL2_i$) or the three frames of digital monochromatic positive image-pixel signals ($RPL_i$, $GPL_i$ and $BPL_i$) are read from the memory 46, and are then transferred to a peripheral image processing computer (not shown), through the intermediary of the interface circuit 48 and the terminal connector 50.

Note, of course, the positive-to-negative conversion can be executed in substantially the same manner as the above-mentioned negative-to-positive conversion.

Finally, it will be understood by those skilled in the art that the foregoing description is of the preferred embodiments of the device and that various changes and modifications may be made to the present invention without departing from the spirit and scope thereof.

The present disclosure relates to subject matter contained in Japanese Patent Application No. 9-176474 (filed on Jun. 17, 1997), which is expressly incorporated herein, by reference, in its entirety.

I claim:

1. A color-image reader that optically and electronically reads a recorded color image from a recording medium, said color-image reader comprising:

an image sensor that senses said recorded color image as at least a first regular series of monochromatic image-pixel signals and a second regular series of monochromatic image-pixel signals during a regular reading operation;

a first optimal-exposure-period determiner that determines a first optimal exposure period with respect to said first regular series of monochromatic image-pixel signals;

a second optimal-exposure-period determiner that determines a second optimal exposure period with respect to said second regular series of monochromatic image-pixel signals;

a first color-correction-parameter determiner that determines a first set of color-correction parameters on the basis of a first provisional series of monochromatic image-pixel signals, which is sensed from said recorded color image by said image sensor over said first optimal exposure period determined by said first optimal-exposure-period determiner; and a second color-correction-parameter determiner that determines a second set of color-correction parameters on the basis of a second provisional series of monochromatic image-pixel signals, which is sensed from said recorded color image by said image sensor over said second optimal exposure period determined by said second optimal-exposure-period determiner, wherein said first regular series of monochromatic image-pixel signals is processed by said first set of color-correction parameters such that a first regular histogram, which is produced on the basis of said first regular series of monochromatic image-pixel signals, is generated over a first predetermined level-value range, and said second regular series of monochromatic image-pixel signals is processed by said second set of color-correction parameters such that a second regular histogram, which is produced on the basis of said second regular series of monochromatic image-pixel signals, is generated over a second predetermined level-value range.

2. A color-image reader as set forth in claim 1, wherein said first predetermined level-value range and said second predetermined level-value range substantially coincide with each other.

3. A color-image reader as set forth in claim 1, wherein said first predetermined level-value range is defined by an input range of a first image-signal processor that processes said first regular series of monochromatic image-pixel signals, and said second predetermined level-value range is defined by an input range of a second image-signal processor that processes said second regular series of monochromatic image-pixel signals.

4. A color-image reader as set forth in claim 1, wherein said first color-correction-parameter determiner comprises a first histogram-producer that produces a first histogram from said first provisional series of monochromatic image-pixel signals, a first effective minimum level-value calculator that calculates an effective minimum level-value from said first histogram, and a first effective maximum level-value calculator that calculates an effective maximum level value from said first histogram, said first regular series of monochromatic image-pixel signals being precessed by said first set of color-correction parameters such that a range, defined by said first effective minimum level-value and said first effective maximum level-value, substantially coincides with said first predetermined level-value range.

5. A color-image reader as set forth in claim 4, wherein said first effective minimum level-value is defined as a boundary-level-value of a predetermined area, which includes an actual minimum level-value, of said first histogram, and said first effective maximum level-value is defined as a boundary-level-value of a predetermined area, which includes an actual maximum level-value, of said first histogram.

6. A color-image reader as set forth in claim 4, wherein one of the color-correction parameters in said first set is defined as $CP1_{(1)}$, representing said first effective minimum level-value, and another one of the color-correction parameters in said first set is defined as $CP2_{(1)}$, representing a result of the following calculation:

$$CP2_{(1)}=(M_{MAX(1)}-M_{MIN(1)})/(HL_{MAX(1)}-HL_{MIN(1)}) \text{ where } CP1_{(1)}=HL_{MIN(1)}$$

Herein: $M_{MIN(1)}$ indicates a minimum level-value of said first predetermined level-value range;

$M_{MAX(1)}$ indicates a maximum level-value of said first predetermined level-value range;

$HL_{MIN(1)}$ indicates the effective minimum level-value of said first histogram; and $HL_{MAX(1)}$ indicates the effective maximum level-value of said first histogram.

7. A color-image reader as set forth in claim 6, wherein the processing of said first regular series of monochromatic image-pixel signals by said first set of color parameters $CP1_{(1)}$ and $CP2_{(1)}$ is executed on the basis of the following formula:

$$FCL2_i=(FL_i-CP1_{(1)})*CP2_{(1)}+M_{MIN(1)}$$

Herein: $FL_i$ represents each of the monochromatic image-pixel signals included in said first regular series; and $FCL2_i$ represents each of the monochromatic image-pixel signals processed by said formula.

8. A color-image reader as set forth in claim 7, wherein said recording medium is a negative transparency film carrying a negative color image, and said first regular series of monochromatic image-pixel signals is derived from said negative color image.

9. A color-image reader as set forth in claim 8, further comprising a negative-to-positive converter that converts said first regular series of monochromatic image-pixel signals into a first regular series of positive monochromatic image-pixel signals, wherein said negative-to-positive conversion is executed on the basis of the following formula:

$$FPL_i = M_{MAX(1)} - FCL2_i + M_{MIN(1)}$$

Herein: $FPL_i$ represents each of said first regular series of positive monochromatic image-pixel signals.

10. A color-image reader as set forth in claim 7, wherein said recording medium is a positive transparency film carrying a positive color image, and said first regular series of monochromatic image-pixel signals is derived from said positive color image.

11. A color-image reader as set forth in claim 10, further comprising a positive-to-negative converter that converts said first regular series of monochromatic image-pixel signals into a first regular series of negative monochromatic image-pixel signals, wherein said positive-to-negative conversion is executed on the basis of the following formula:

$$FPL_i = M_{MAX(1)} - FCL2_i + M_{MIN(1)}$$

Herein: $FPL_i$ represents each of said first regular series of negative monochromatic image-pixel signals.

12. A color-image reader as set forth in claim 1, wherein said second color-correction-parameter determiner comprises a second histogram-producer that produces a second histogram from said second provisional series of monochromatic image-pixel signals, a second effective minimum level-value calculator that calculates an effective minimum level-value from said second histogram, and a second effective maximum level-value calculator that calculates an effective maximum level value from said second histogram, said second regular series of monochromatic image-pixel signals being processed by said second set of color-correction parameters such that a range, defined by said second effective minimum level-value and said second effective maximum level-value, substantially coincides with said second predetermined level-value range.

13. A color-image reader as set forth in claim 12, wherein said second effective minimum level-value is defined as a boundary-level-value of a predetermined area, which includes an actual minimum level-value, of said second histogram, and said second effective maximum level-value is defined as a boundary-level-value of a predetermined area, which includes an actual maximum level-value, of said second histogram.

14. A color-image reader as set forth in claim 12, wherein one of the color-correction parameters in said second set is defined as $CP1_{(2)}$, representing said second effective minimum level-value, and another one of the color-correction parameters in said second set is defined as $CP2_{(2)}$, where $$CP1_{(1)} = HL_{MIN(1)}$$

representing a result of the following calculation:

$$CP2_{(2)} = (M_{MAX(2)} - M_{MIN(2)})/(HL_{MAX(2)} - HL_{MIN(2)})$$

Herein: $M_{MIN(2)}$ indicates a minimum level-value of said second predetermined level-value range;

$M_{MAX(2)}$ indicates a maximum level-value of said second predetermined level-value range;

$HL_{MIN(2)}$ indicates the effective minimum level-value of said second histogram; and $HL_{MAX(2)}$ indicates the effective maximum level-value of said second histogram.

15. A color-image reader as set forth in claim 14, wherein the processing of said second regular series of monochromatic image-pixel signals by said second set of color parameters $CP1_{(2)}$ and $CP2_{(2)}$ is executed on the basis of the following formula:

$$SCL2_i = (SL_i - CP1_{(2)}) * CP2_{(2)} + M_{MIN(2)}$$

Herein: $SL_i$ represents each of the monochromatic image-pixel signals included in said second regular series; and $SCL2_i$ represents each of the monochromatic image-pixel signals processed by said formula.

16. A color-image reader as set forth in claim 15, wherein said recording medium is a negative transparency film carrying a negative color image, and said second regular series of monochromatic image-pixel signals is derived from said negative color image.

17. A color-image reader as set forth in claim 16, further comprising a negative-to-positive converter that converts said second regular series of monochromatic image-pixel signals into a second regular series of positive monochromatic image-pixel signals, wherein said negative-to-positive conversion is executed on the basis of the following formula:

$$SPL_i = M_{MAX(2)} - SCL2_i + M_{MIN(2)}$$

Herein; $SPL_i$ represents each of said second regular series of positive monochromatic image-pixel signals.

18. A color-image reader as set forth in claim 15, wherein said recording medium is a positive transparency film carrying a positive color image, and said second regular series of monochromatic image-pixel signals is derived from said positive color image.

19. A color-image reader as set forth in claim 18, further comprising a positive-to-negative converter that converts said second regular series of monochromatic image-pixel signals into a second regular series of negative monochromatic image-pixel signals, wherein said positive-to-negative conversion is executed on the basis of the following formula:

$$SPL_i = M_{MAX(2)} - SCL2_i + M_{MIN(2)}$$

Herein: $SPL_i$ represents each of said second regular series of negative monochromatic image-pixel signals.

20. A color-image reader as set forth in claim 1, wherein said recording medium is a negative transparency film carrying a negative color image, and said first regular series of monochromatic image-pixel signals and said second regular series of monochromatic image-pixel signals are derived from said negative color image.

21. A color-image reader as set forth in claim 20, further comprising a negative-to-positive converter that converts said first regular series of monochromatic image-pixel signals and said second regular series of monochromatic image-pixel signals into a first regular series of positive monochromatic image-pixel signals and a second regular series of positive monochromatic image-pixel signals, respectively.

22. A color-image reader as set forth in claim 1, wherein said recording medium is a positive transparency film carrying a positive color image, and said first regular series of monochromatic image-pixel signals and said second regular series of monochromatic image-pixel signals are derived from said positive color image.

23. A color-image reader as set forth in claim 22, further comprising a positive-to-negative converter that converts said first regular series of monochromatic image-pixel signals and said second regular series of monochromatic image-pixel signals into a first regular series of negative monochromatic image-pixel signals and a second regular series of negative monochromatic image-pixel signals, respectively.

24. A color-image reader as set forth in claim 1, wherein said image sensor exhibits a characteristic curve, having at least a partial linear section, which describes a relationship between a level-value of an image-pixel signal and an exposure period over which said image sensor is exposed to each of a first type of monochromatic light rays and a second type of monochromatic light rays, which correspond to said first regular series of monochromatic image-pixel signals and said second regular series of monochromatic image-pixel signals, respectively.

25. A color-image reader as set forth in claim 24, wherein said first optimal-exposure-period determiner comprises:

a first sub-determiner that determines a first effective maximum level value from a first further-provisional series of monochromatic image-pixel signals, which is further sensed from said recorded color image with said image-sensor by exposing said image sensor to said first type of monochromatic light rays over a first exposure period; and a second sub-determiner that determines a second effective maximum level-value from a second further-provisional series of monochromatic image-pixel signals, which is further sensed from said recorded color image with said image-sensor by exposing said image sensor to said first type of monochromatic rays over a second exposure period, which is longer than said first exposure period, said first exposure period and said second exposure period being encompassed within the partial linear section of said characteristic curve, thereby determining said first optimal exposure period from a proportional calculation based on said first effective maximum level-value corresponding to said first exposure period, said second effective maximum level-value corresponding to said second exposure period, and an effective maximum level-value corresponding to said first optimal exposure period.

26. A color-image reader as set forth in claim 25, wherein said proportional calculation is based on the following formula:

$$T_{OPT} = [(L_{MAX}-L_1)/(L_2-L_1)]*(t_2-t_1)+t_1$$

Herein:

$T_{OPT}$ indicates said first optimal exposure period;

$L_1$ indicates said effective maximum level-value corresponding to said first optimal exposure period;

$t_1$ indicates said first exposure period;

$L_1$ indicates said first effective maximum level-value corresponding to said first exposure period;

$t_2$ indicates said second exposure period; and $L_2$ indicates said second effective maximum level-value corresponding to said second exposure period.

27. An image reader as set forth in claim 25, wherein said first sub-determiner comprises a first histogram-producer that produces a first histogram on the basis of said first further-provisional series of monochromatic image-pixel signals and determines said first effective maximum level-value from said first histogram, and said second sub-determiner comprises a second histogram-producer that produces a second histogram on the basis of said second further-provisional series of image-pixel signals and determines said second effective maximum level-value from said second histogram.

28. An image reader as set forth in claim 27, wherein each of said first effective maximum level-value and said second effective maximum level-value is defined as a boundary-level-value of a predetermined area, which includes an actual-maximum level-value, of the corresponding histogram.

29. A color-image reader as set forth in claim 24, wherein said second optimal-exposure-period determiner comprises:

a first sub-determiner that determines a first effective maximum level value from a first further-provisional series of monochromatic image-pixel signals, which is further sensed from said recorded color image with said image-sensor by exposing said image sensor to said second type of monochromatic light rays over a first exposure period; and a second sub-determiner that determines a second effective maximum level-value from a second further-provisional series of monochromatic image-pixel signals, which is further sensed from said recorded color image with said image-sensor by exposing said image sensor to said second type of monochromatic rays over a second exposure period, which is longer than said first exposure period, said first exposure period and said second exposure period being encompassed within the partial linear section of said characteristic curve, thereby determining said first optimal exposure period from a proportional calculation based on said first effective maximum level-value corresponding to said first exposure period, said second effective maximum level-value corresponding to said second exposure period, and an effective maximum level-value corresponding to said first optimal exposure period.

30. A color-image reader as set forth in claim 29, wherein said proportional calculation is based on the following formula:

$$T_{OPT} = [(i\ L_{MAX}-L_1)/(L_2-L_1)]*(t_2-t_1)+t_1$$

Herein: $T_{OPT}$ indicates said first optimal exposure period;

$L_{MAX}$ indicates said effective maximum level-value corresponding to said first optimal exposure period;

$t_1$ indicates said first exposure period;

$L_1$ indicates said first effective maximum level-value corresponding to said first exposure period;

$t_2$ indicates said second exposure period; and $L_2$ indicates said second effective maximum level-value corresponding said second exposure period.

31. A color image reader as set forth in claim 29, wherein said first sub-determiner comprises a first histogram-producer that produces a first histogram on the basis of said first further-provisional series of monochromatic image-pixel signals and determines said first effective maximum level-value from said first histogram, and said second sub-determiner comprises a second histogram-producer that produces a second histogram on the basis of said second further-provisional series of image-pixel signals and determines said second effective maximum level-value from said second histogram.

32. A color image reader as set forth in claim 31, wherein each of said first effective maximum level-value and said second effective maximum level-value is defined as a boundary-level-value of a predetermined area, which includes an actual-maximum level-value, of the corresponding histogram.

33. A color-image reader that optically and electronically reads a recorded color image from a recording medium, said color-image reader comprising:

an image sensor that senses said recorded color image as plural regular series of monochromatic image-pixel signals during a regular reading operation;

an optimal-exposure-period determiner that determines an optimal exposure period with respect to each of said plural regular series of monochromatic image-pixel signals;

a color-correction-parameter determiner that determines a set of color-correction parameters on the basis of each of plural provisional series of monochromatic image-pixel signals, which are sensed from said recorded color image by said image sensor over said optimal exposure period determined by said optimal-exposure-period determiner; and wherein each of said plural regular series of monochromatic image-pixel signals is processed by said set of color-correction parameters such that a regular histogram, which is produced on the basis of each of said regular series of monochromatic image-pixel signals, is generated over a predetermined level-value range.

34. A color-image reader as set forth in claim 33, wherein said image sensor is constituted such that a series of red image-pixel signals, a series of green image-pixel signals and a series of blue image-pixel signals are read from said recorded color image from said recording medium.

35. A color-image reader as set forth in claim 34, wherein said predetermined level-value range is individually defined with respect to each of said series of red image-pixel signals, said series of green image-pixel signals and said series of blue image-pixel signals.

36. A color-image reader as set forth in claim 35, wherein said predetermined level-value range is common with respect to each of said series of red image-pixel signals, said series of green image-pixel signals and said series of blue image-pixel signals.

37. A color-image reader as set forth in claim 33, wherein said color-correction-parameter determiner comprises a histogram-producer that produces a histogram from each of said plural provisional series of monochromatic image-pixel signals, an effective minimum level-value calculator that calculates an effective minimum level-value from said regular histogram, and an effective maximum level-value calculator that calculates an effective maximum level value from said regular histogram, each of said plural regular series of monochromatic image-pixel signals being processed by said set of color-correction parameters such that a range, defined by said effective minimum level-value and said effective maximum level-value, substantially coincides with said predetermined level-value range.

38. A color-image reader as set forth in claim 37, wherein said effective minimum level-value is defined as a boundary-level-value of a predetermined area, which includes an actual minimum level-value, of said regular histogram, and said effective maximum level-value is defined as a boundary-level-value of a predetermined area, which includes an actual maximum level-value, of said regular histogram.

39. A color-image reader as set forth in claim 37, wherein one of the color-correction parameters in said set of color-correction parameters is defined as $CP1_{(1)}$, representing said effective minimum level-value, and another one of the color-correction parameters in said set of color-correction parameters is defined as $CP2_{(1)}$ representing a result of the following calculation:

$$CP2_{(1)} = (M_{MAX(1)} - M_{MIN(1)}) / (HL_{MAX(1)} - HL_{MIN(1)}) \text{ where } CP1_{(1)} = HL_{MIN(1)}$$

Herein: $M_{MIN(1)}$ indicates a minimum level-value of said predetermined level-value range;

$M_{MAX(1)}$ indicates a maximum level-value of said predetermined level-value range;

$HL_{MIN(1)}$ indicates the effective minimum level-value of said histogram; and $HL_{MAX(1)}$ indicates the effective maximum level-value of said histogram.

40. A color-image reader as set forth in claim 39, wherein the processing of each of said plural regular series of monochromatic image-pixel signals by said set of color-correction parameters $CP1_{(1)}$ and $CP2_{(1)}$ is executed on the basis of the following formula:

$$FCL2_i = (FL_i - CP1_{(1)}) * CP2_{(1)} + M_{MIN(1)}$$

Herein: $FL_i$ represents each of the monochromatic image-pixel signals included in each of said plural regular series; and $FCL2_i$ represents each of the monochromatic image-pixel signals processed by said formula.

41. A color-image reader as set forth in claim 40, wherein said recording medium is a negative transparency film carrying a negative color image, and said plural regular series of monochromatic image-pixel signals are derived from said negative color image.

42. A color-image reader as set forth in claim 41, further comprising a negative-to-positive converter that converts said plural regular series of monochromatic image-pixel signals into regular series of positive monochromatic image-pixel signals, wherein said negative-to-positive conversion is executed on the basis of the following formula:

$$FPL_i = M_{MAX(1)} - FCL2_i + M_{MIN(1)}$$

Herein: $FPL_i$ represents each of said regular series of positive monochromatic image-pixel signals.

43. A color-image reader as set forth in claim 40, wherein said recording medium is a positive transparency film carrying a positive color image, and said regular series of monochromatic image-pixel signals is derived from said positive color image.

44. A color-image reader as set forth in claim 43, further comprising a positive-to-negative converter that converts said plural regular series of monochromatic image-pixel signals into regular series of negative monochromatic image-pixel signals, wherein said positive-to-negative conversion is executed on the basis of the following formula:

$$FPL_i = M_{MAX(1)} - FCL2_i + M_{MIN(1)}$$

Herein: $FPL_i$ represents each of said regular series of negative monochromatic image-pixel signals.

* * * * *

UNITED STATES PATENT AND TRADEMARK OFFICE
CERTIFICATE OF CORRECTION

PATENT NO. : 6,069,716
DATED : May 30, 2000
INVENTOR(S) : Y. YAMAMOTO

It is certified that error appears in the above-identified patent and that said Letters Patent is hereby corrected as shown below:

On the cover of the printed patent, at Item [73], Assignee, after "Asahi" insert ---Kogaku---.

Signed and Sealed this

Twenty-fourth Day of April, 2001

Attest:

NICHOLAS P. GODICI

Attesting Officer

Acting Director of the United States Patent and Trademark Office